(12) United States Patent
Björsell et al.

(10) Patent No.: US 10,880,721 B2
(45) Date of Patent: Dec. 29, 2020

(54) MOBILE GATEWAY

(71) Applicant: VOIP-PAL.COM, INC., Bellevue, WA (US)

(72) Inventors: Johan Emil Viktor Björsell, Vancouver (CA); Maksym Sobolyev, Westminster (CA); Pentti Kalevi Huttunen, Vancouver (CA); Emil Malak, Vancouver (CA)

(73) Assignee: VoIP-Pal.com, Inc., Bellevue, WA (US)

( * ) Notice: Subject to any disclaimer, the term of this patent is extended or adjusted under 35 U.S.C. 154(b) by 504 days.

(21) Appl. No.: 14/035,806

(22) Filed: Sep. 24, 2013

(65) Prior Publication Data

US 2014/0024367 A1    Jan. 23, 2014

Related U.S. Application Data

(63) Continuation of application No. 13/056,277, filed as application No. PCT/CA2009/001062 on Jul. 28, 2009, now Pat. No. 8,630,234.

(Continued)

(51) Int. Cl.
*H04W 8/02* (2009.01)
*H04W 76/11* (2018.01)
*H04W 76/15* (2018.01)

(52) U.S. Cl.
CPC .............. *H04W 8/02* (2013.01); *H04W 76/11* (2018.02); *H04W 76/15* (2018.02)

(58) Field of Classification Search
CPC .... H04W 76/021; H04W 76/025; H04W 8/02
See application file for complete search history.

(56) References Cited

U.S. PATENT DOCUMENTS

| 4,661,974 A | 4/1987 | Bales et al. |
| 4,747,124 A | 5/1988 | Ladd |

(Continued)

FOREIGN PATENT DOCUMENTS

| BR | PI 0718312-7 A2 | 11/2013 |
| BR | PI 0719682-2 A2 | 1/2014 |

(Continued)

OTHER PUBLICATIONS

ETSI TS 122 173 V12.7.0 (Oct. 2014) Digital cellular telecommunications system (Phase 2+); Technical Specification 8.2.2.3—Interoperability with PSTN/ISDN and mobile CS Networks, Contents and Forward, pp. 1-9; Sec. 8, pp. 14-17.

(Continued)

*Primary Examiner* — Andrew Lai
*Assistant Examiner* — M Mostazir Rahman
(74) *Attorney, Agent, or Firm* — Thorpe North & Western, LLP.

(57) ABSTRACT

A method of initiating a call to a callee using a mobile telephone involves: receiving, from a user of the mobile telephone, a callee identifier associated with the callee; transmitting an access code request message to an access server, the access code request message including the callee identifier; receiving an access code reply message from the access server in response to the access code request message, the access code reply message including an access code different from the callee identifier and associated with the callee identifier; and initiating a call with the mobile telephone using the access code to identify the callee.

141 Claims, 17 Drawing Sheets

Related U.S. Application Data

(60) Provisional application No. 61/129,898, filed on Jul. 28, 2008.

(56) References Cited

U.S. PATENT DOCUMENTS

| | | | |
|---|---|---|---|
| 4,799,255 | A | 1/1989 | Billinger et al. |
| 4,916,491 | A | 4/1990 | Katoh |
| 4,992,971 | A | 2/1991 | Hayashi |
| 5,146,491 | A | 9/1992 | Silver et al. |
| 5,247,571 | A | 9/1993 | Kay et al. |
| 5,303,297 | A | 4/1994 | Hillis |
| 5,325,421 | A | 6/1994 | Hou et al. |
| 5,359,642 | A | 10/1994 | Castro |
| 5,425,085 | A | 6/1995 | Weinberger et al. |
| 5,440,621 | A | 8/1995 | Castro |
| 5,454,030 | A | 9/1995 | de Oliveira et al. |
| 5,469,497 | A | 11/1995 | Pierce et al. |
| 5,506,893 | A | 4/1996 | Buscher et al. |
| 5,519,769 | A | 5/1996 | Weinberger et al. |
| 5,559,871 | A | 9/1996 | Smith |
| 5,572,583 | A | 11/1996 | Wheeler, Jr. et al. |
| 5,590,133 | A | 12/1996 | Billstrom et al. |
| 5,602,907 | A | 2/1997 | Hata et al. |
| 5,608,786 | A | 3/1997 | Gordon |
| 5,621,787 | A | 4/1997 | McKoy et al. |
| 5,633,913 | A | 5/1997 | Talarmo |
| 5,661,790 | A | 8/1997 | Hsu |
| 5,677,955 | A | 10/1997 | Doggett et al. |
| 5,712,907 | A | 1/1998 | Wegner et al. |
| 5,719,926 | A | 2/1998 | Hill |
| 5,722,067 | A | 2/1998 | Fougnies et al. |
| 5,724,355 | A | 3/1998 | Bruno et al. |
| 5,726,984 | A | 3/1998 | Kubler et al. |
| 5,737,414 | A | 4/1998 | Walker et al. |
| 5,742,596 | A | 4/1998 | Baratz et al. |
| 5,751,961 | A | 5/1998 | Smyk |
| 5,768,521 | A | 6/1998 | Dedrick |
| 5,778,187 | A | 7/1998 | Monteiro et al. |
| 5,793,762 | A | 8/1998 | Penners et al. |
| 5,799,072 | A | 8/1998 | Vulcan et al. |
| 5,802,502 | A | 9/1998 | Gell et al. |
| 5,825,863 | A | 10/1998 | Walker |
| 5,828,740 | A | 10/1998 | Khuc et al. |
| 5,838,682 | A | 11/1998 | Dekelbaum et al. |
| 5,845,267 | A | 12/1998 | Ronen |
| 5,850,433 | A | 12/1998 | Rondeau |
| 5,864,610 | A | 1/1999 | Ronen |
| 5,867,495 | A | 2/1999 | Elliott et al. |
| 5,875,240 | A | 2/1999 | Silverman |
| 5,883,810 | A | 3/1999 | Franklin et al. |
| 5,883,891 | A | 3/1999 | Williams et al. |
| 5,889,774 | A | 3/1999 | Mirashrafi et al. |
| 5,905,736 | A | 5/1999 | Ronen et al. |
| 5,907,547 | A | 5/1999 | Foladare et al. |
| 5,910,946 | A | 6/1999 | Csapo |
| 5,915,005 | A | 6/1999 | He |
| 5,915,093 | A | 6/1999 | Berlin et al. |
| 5,917,899 | A | 6/1999 | Moss et al. |
| 5,923,659 | A | 7/1999 | Curry et al. |
| 5,930,343 | A | 7/1999 | Vasquez |
| 5,937,045 | A | 8/1999 | Yaoya et al. |
| 5,937,053 | A | 8/1999 | Lee et al. |
| 5,940,598 | A | 8/1999 | Strauss et al. |
| 5,953,504 | A | 9/1999 | Sokal et al. |
| 5,956,391 | A | 9/1999 | Melen et al. |
| 5,970,477 | A | 10/1999 | Roden |
| 5,974,043 | A | 10/1999 | Solomon |
| 5,991,291 | A | 11/1999 | Asai et al. |
| 5,991,378 | A | 11/1999 | Apel |
| 6,005,870 | A | 12/1999 | Leung et al. |
| 6,005,926 | A | 12/1999 | Mashinsky |
| 6,014,379 | A | 1/2000 | White et al. |
| 6,021,126 | A | 2/2000 | White et al. |
| 6,029,062 | A | 2/2000 | Hanson |
| 6,036,090 | A | 3/2000 | Rahman et al. |
| 6,052,445 | A | 4/2000 | Bashoura et al. |
| 6,058,300 | A | 5/2000 | Hanson |
| 6,069,890 | A | 5/2000 | White et al. |
| 6,073,013 | A | 6/2000 | Agre et al. |
| 6,073,142 | A | 6/2000 | Geiger et al. |
| 6,078,647 | A | 6/2000 | D'Eletto |
| 6,104,704 | A | 8/2000 | Buhler et al. |
| 6,104,711 | A | 8/2000 | Voit |
| 6,115,737 | A | 9/2000 | Ely et al. |
| 6,122,357 | A | 9/2000 | Farris et al. |
| 6,128,304 | A | 10/2000 | Gardell et al. |
| 6,137,869 | A | 10/2000 | Voit et al. |
| 6,141,404 | A | 10/2000 | Westerlage et al. |
| 6,151,385 | A | 11/2000 | Reich et al. |
| 6,173,272 | B1 | 1/2001 | Thomas et al. |
| 6,185,414 | B1 | 2/2001 | Brunner et al. |
| 6,185,565 | B1 | 2/2001 | Meubus et al. |
| 6,188,752 | B1 | 2/2001 | Lesley |
| 6,192,123 | B1 | 2/2001 | Grunsted et al. |
| 6,205,135 | B1 | 3/2001 | Chinni et al. |
| 6,236,851 | B1 | 5/2001 | Fougnies et al. |
| 6,240,449 | B1 | 5/2001 | Nadeau |
| 6,243,689 | B1 | 6/2001 | Norton |
| 6,249,573 | B1 | 6/2001 | Hudson |
| 6,282,574 | B1 | 8/2001 | Voit |
| 6,289,010 | B1 | 9/2001 | Voit et al. |
| 6,292,547 | B1 | 9/2001 | Katz |
| 6,292,553 | B1 | 9/2001 | Fellingham et al. |
| 6,298,062 | B1 | 10/2001 | Gardell et al. |
| 6,298,250 | B1 | 10/2001 | Nilsson |
| 6,310,859 | B1 | 10/2001 | Morita et al. |
| 6,324,280 | B2 | 11/2001 | Dunn et al. |
| 6,327,351 | B1 | 12/2001 | Walker et al. |
| 6,351,464 | B1 | 2/2002 | Galvin et al. |
| 6,359,880 | B1 | 3/2002 | Curry et al. |
| 6,363,065 | B1 | 3/2002 | Thornton et al. |
| 6,430,275 | B1 | 8/2002 | Voit et al. |
| 6,434,143 | B1 | 8/2002 | Donovan |
| 6,445,694 | B1 | 9/2002 | Swartz |
| 6,449,353 | B1 | 9/2002 | Hynes, Jr. |
| 6,460,050 | B1 | 10/2002 | Pace et al. |
| 6,480,885 | B1 | 11/2002 | Olivier |
| 6,498,791 | B2 | 12/2002 | Pickett et al. |
| 6,507,644 | B1 | 1/2003 | Henderson et al. |
| 6,553,025 | B1 | 4/2003 | Kung et al. |
| 6,560,224 | B1 | 5/2003 | Kung et al. |
| 6,574,328 | B1 | 6/2003 | Wood et al. |
| 6,594,254 | B1 | 7/2003 | Kelly |
| 6,597,686 | B1 | 7/2003 | Smyk |
| 6,597,783 | B1 | 7/2003 | Tada et al. |
| 6,603,977 | B1 | 8/2003 | Walsh et al. |
| 6,608,831 | B1 | 8/2003 | Beckstrom et al. |
| 6,636,833 | B1 | 10/2003 | Flitcroft et al. |
| 6,650,641 | B1 | 11/2003 | Albert et al. |
| 6,674,745 | B1 | 1/2004 | Schuster et al. |
| 6,674,850 | B2 | 1/2004 | Vu et al. |
| 6,707,901 | B1 | 3/2004 | Hodges et al. |
| 6,714,793 | B1 | 3/2004 | Carey et al. |
| 6,718,032 | B1 | 3/2004 | Vrenjak |
| 6,724,860 | B2 | 4/2004 | Stumer et al. |
| 6,744,858 | B1 | 6/2004 | Ryan et al. |
| 6,754,181 | B1 | 6/2004 | Elliott et al. |
| 6,760,324 | B1 | 7/2004 | Scott et al. |
| 6,766,159 | B2 | 7/2004 | Lindholm |
| 6,772,188 | B1 | 8/2004 | Cheng-Sheng et al. |
| 6,772,210 | B1 | 8/2004 | Edholm |
| 6,775,269 | B1 | 8/2004 | Kaczmarczyk et al. |
| 6,775,534 | B2 | 8/2004 | Lindgren et al. |
| 6,785,266 | B2 | 8/2004 | Swartz |
| 6,798,767 | B1 | 9/2004 | Alexander et al. |
| 6,804,346 | B1 | 10/2004 | Mewhinney |
| 6,819,929 | B2 | 11/2004 | Antonucci et al. |
| 6,870,827 | B1 | 3/2005 | Voit et al. |
| 6,873,599 | B1 | 3/2005 | Han |
| 6,892,184 | B1 | 5/2005 | Komen et al. |
| 6,928,479 | B1 | 8/2005 | Meyer et al. |
| 6,934,279 | B1 | 8/2005 | Sollee et al. |
| 6,937,713 | B1 | 8/2005 | Kung et al. |
| 6,944,272 | B1 | 9/2005 | Thomas |

(56) References Cited

U.S. PATENT DOCUMENTS

| | | |
|---|---|---|
| 6,947,531 B1 | 9/2005 | Lewis et al. |
| 6,954,453 B1 | 10/2005 | Schindler |
| 6,954,455 B1 | 10/2005 | Al Hakim et al. |
| 6,961,334 B1 | 11/2005 | Kaczmarczyk |
| 6,963,557 B2 | 11/2005 | Knox |
| 6,963,739 B2 | 11/2005 | Dorenbosch et al. |
| 6,985,440 B1 | 1/2006 | Albert et al. |
| 6,993,015 B2 | 1/2006 | Kobayashi |
| 7,006,508 B2 | 2/2006 | Bondy et al. |
| 7,010,727 B1 | 3/2006 | Stucker |
| 7,016,343 B1 | 3/2006 | Mermel et al. |
| 7,027,564 B2 | 4/2006 | James |
| 7,042,985 B1 | 5/2006 | Wright |
| 7,046,658 B1 | 5/2006 | Kundaje |
| 7,047,561 B1 | 5/2006 | Lee |
| 7,051,072 B2 | 5/2006 | Stewart et al. |
| 7,055,174 B1 | 5/2006 | Cope et al. |
| 7,068,668 B2 | 6/2006 | Feuer |
| 7,068,772 B1 | 6/2006 | Widger et al. |
| 7,079,526 B1 | 7/2006 | Wipliez et al. |
| 7,110,523 B2 | 9/2006 | Gagle et al. |
| 7,120,682 B1 | 10/2006 | Salama |
| 7,151,772 B1 | 12/2006 | Kalmanek, Jr. et al. |
| 7,174,156 B1 | 2/2007 | Mangal |
| 7,177,399 B2 | 2/2007 | Dawson et al. |
| 7,203,478 B2 | 4/2007 | Benco et al. |
| 7,212,522 B1 | 5/2007 | Shankar et al. |
| 7,218,722 B1 | 5/2007 | Turner et al. |
| 7,277,528 B2 | 10/2007 | Rao et al. |
| 7,330,835 B2 | 2/2008 | Deggendorf |
| 7,346,156 B1 | 3/2008 | Choupak et al. |
| 7,359,368 B1 | 4/2008 | Pearce |
| 7,366,157 B1 | 4/2008 | Valentine et al. |
| 7,400,881 B2 | 7/2008 | Kallio |
| 7,412,049 B1 | 8/2008 | Koch |
| 7,426,492 B1 | 9/2008 | Bishop et al. |
| 7,436,835 B2 | 10/2008 | Castleberry et al. |
| 7,437,665 B2 | 10/2008 | Perham |
| 7,440,441 B2 | 10/2008 | Lakhani et al. |
| 7,440,442 B2 | 10/2008 | Grabelsky et al. |
| 7,447,707 B2 | 11/2008 | Gaurav et al. |
| 7,453,990 B2 | 11/2008 | Welenson et al. |
| 7,454,200 B2 | 11/2008 | Cai et al. |
| 7,454,510 B2 | 11/2008 | Kleyman et al. |
| 7,457,865 B2 | 11/2008 | Ramakrishnan et al. |
| 7,477,843 B1 | 1/2009 | Peeters et al. |
| 7,486,664 B2 | 2/2009 | Swartz |
| 7,486,667 B2 | 2/2009 | Feuer |
| 7,486,684 B2 | 2/2009 | Chu et al. |
| 7,512,117 B2 | 3/2009 | Swartz |
| 7,545,761 B1 | 6/2009 | Kalbag |
| 7,567,131 B2 | 7/2009 | Rollender et al. |
| 7,573,982 B2 | 8/2009 | Breen et al. |
| 7,580,886 B1 | 8/2009 | Schulz |
| 7,587,036 B2 | 9/2009 | Wood et al. |
| 7,593,390 B2 | 9/2009 | Lebizay |
| 7,593,884 B2 | 9/2009 | Rothman et al. |
| 7,599,944 B2 | 10/2009 | Gaurav et al. |
| 7,616,753 B2 | 11/2009 | Cope et al. |
| 7,639,792 B2 | 12/2009 | Qiu et al. |
| 7,644,037 B1 | 1/2010 | Ostrovsky |
| 7,647,500 B2 | 1/2010 | Machiraju et al. |
| 7,657,011 B1 | 2/2010 | Zielinski et al. |
| 7,664,495 B1 | 2/2010 | Bonner et al. |
| 7,676,215 B2 | 3/2010 | Chin et al. |
| 7,676,431 B2 | 3/2010 | O'Leary et al. |
| 7,680,114 B2 | 3/2010 | Yazaki et al. |
| 7,680,737 B2 | 3/2010 | Smith et al. |
| 7,702,308 B2 | 4/2010 | Rollender |
| 7,715,413 B2 | 5/2010 | Vaziri et al. |
| 7,715,821 B2 | 5/2010 | Rollender |
| 7,734,544 B2 | 6/2010 | Schleicher |
| 7,738,384 B2 | 6/2010 | Pelletier |
| 7,764,777 B2 | 7/2010 | Wood et al. |
| 7,764,944 B2 | 7/2010 | Rollender |
| 7,765,261 B2 | 7/2010 | Kropivny |
| 7,765,263 B1 | 7/2010 | Alfke |
| 7,765,266 B2 | 7/2010 | Kropivny |
| 7,774,711 B2 | 8/2010 | Valeski |
| 7,797,459 B1 | 9/2010 | Roy et al. |
| 7,822,188 B1 | 10/2010 | Kirchhoff et al. |
| 7,836,136 B1 | 11/2010 | Alfke |
| 7,882,011 B2 | 2/2011 | Sandhu et al. |
| 7,894,441 B2 | 2/2011 | Yazaki et al. |
| 7,899,742 B2 | 3/2011 | Berkert et al. |
| 7,907,551 B2 | 3/2011 | Croy et al. |
| 7,907,714 B2 | 3/2011 | Baniak et al. |
| 7,916,846 B1 | 3/2011 | Farah |
| 7,929,955 B1 | 4/2011 | Bonner |
| 7,944,909 B2 | 5/2011 | James |
| 7,950,046 B2 | 5/2011 | Kropivny |
| 7,958,233 B2 | 6/2011 | Gutierrez |
| 7,965,645 B2 | 6/2011 | Pelletier |
| 7,979,529 B2 | 7/2011 | Kreusch et al. |
| 7,995,589 B2 | 8/2011 | Sollee et al. |
| 8,024,785 B2 | 9/2011 | Andress et al. |
| 8,027,333 B2 | 9/2011 | Grabelsky et al. |
| 8,036,362 B1 | 10/2011 | Skinner |
| 8,036,366 B2 | 10/2011 | Chu |
| 8,041,022 B1 | 10/2011 | Andreasen et al. |
| 8,050,273 B2 | 11/2011 | Gass |
| 8,060,887 B2 | 11/2011 | Kropivny |
| 8,078,164 B2 | 12/2011 | Ganesan |
| 8,111,690 B2 | 2/2012 | Hussain et al. |
| 8,116,307 B1 | 2/2012 | Thesayi et al. |
| 8,125,982 B2 | 2/2012 | Feuer |
| 8,127,005 B2 | 2/2012 | Gutierrez |
| 8,145,182 B2 | 3/2012 | Rudolf et al. |
| 8,161,078 B2 | 4/2012 | Gaurav et al. |
| 8,166,533 B2 | 4/2012 | Yuan |
| 8,166,547 B2 | 4/2012 | Bevan et al. |
| 8,189,568 B2 | 5/2012 | Qiu et al. |
| 8,190,739 B2 | 5/2012 | Gutierrez |
| 8,200,575 B2 | 6/2012 | Torres et al. |
| 8,204,044 B2 | 6/2012 | Lebizay |
| 8,219,115 B1 | 7/2012 | Nelissen |
| 8,223,927 B2 | 7/2012 | Di Serio et al. |
| 8,228,837 B2 | 7/2012 | Sheriff et al. |
| 8,228,897 B2 | 7/2012 | Mitchell |
| 8,243,730 B1 | 8/2012 | Wong et al. |
| 8,244,204 B1 | 8/2012 | Chen et al. |
| 8,275,404 B2 | 9/2012 | Berger et al. |
| 8,300,632 B2 | 10/2012 | Davis et al. |
| 8,306,021 B2 | 11/2012 | Lawson et al. |
| 8,306,063 B2 | 11/2012 | Erdal et al. |
| 8,315,521 B2 | 11/2012 | Leiden et al. |
| 8,339,997 B2 | 12/2012 | Dye et al. |
| 8,351,591 B2 | 1/2013 | Kirchhoff et al. |
| 8,363,647 B2 | 1/2013 | Fangman et al. |
| 8,364,172 B2 | 1/2013 | Guanfeng et al. |
| 8,396,445 B2 | 3/2013 | Crawford et al. |
| 8,410,907 B2 | 4/2013 | Twitchell, Jr. |
| 8,417,791 B1 | 4/2013 | Peretz et al. |
| 8,422,507 B2 | 4/2013 | Björsell et al. |
| 8,423,791 B1 | 4/2013 | Yu et al. |
| 8,427,981 B2 | 4/2013 | Wyss et al. |
| 8,437,340 B2 | 5/2013 | James |
| 8,462,915 B2 | 6/2013 | Breen et al. |
| 8,468,196 B1 | 6/2013 | Roskind et al. |
| 8,493,931 B1 | 7/2013 | Nix |
| 8,509,225 B2 | 8/2013 | Grabelsky et al. |
| 8,526,306 B2 | 9/2013 | Jungck et al. |
| 8,532,075 B2 | 9/2013 | Rassool et al. |
| 8,537,805 B2 | 9/2013 | Björsell et al. |
| 8,542,815 B2 | 9/2013 | Perreault et al. |
| 8,543,477 B2 | 9/2013 | Love et al. |
| 8,594,298 B2 | 11/2013 | Klein et al. |
| 8,599,747 B1 | 12/2013 | Saleem et al. |
| 8,599,837 B2 | 12/2013 | Kyle |
| 8,605,714 B2 | 12/2013 | Lebizay |
| 8,605,869 B1 | 12/2013 | Mobarak et al. |
| 8,607,323 B2 | 12/2013 | Yuan |
| 8,611,354 B2 | 12/2013 | Keränen et al. |
| 8,625,578 B2 | 1/2014 | Roy et al. |

(56) References Cited

U.S. PATENT DOCUMENTS

| | | |
|---|---|---|
| 8,627,211 B2 | 1/2014 | Kropivny |
| 8,630,234 B2 | 1/2014 | Björsell et al. |
| 8,634,838 B2 | 1/2014 | Hellwig et al. |
| 8,675,566 B2 | 3/2014 | Huttunen et al. |
| 8,682,919 B1 | 3/2014 | Golliher |
| 8,702,505 B2 | 4/2014 | Kropivny |
| 8,713,098 B1 | 4/2014 | Adya et al. |
| 8,724,643 B2 | 5/2014 | Feuer |
| 8,749,610 B1 | 6/2014 | Gossweiler et al. |
| 8,750,290 B2 | 6/2014 | Vance et al. |
| 8,763,081 B2 | 6/2014 | Bogdanovic et al. |
| 8,767,717 B2 | 7/2014 | Siegel et al. |
| 8,768,951 B2 | 7/2014 | Crago |
| 8,774,171 B2 | 7/2014 | Mitchell |
| 8,774,378 B2 | 7/2014 | Björsell et al. |
| 8,774,721 B2 | 7/2014 | Hertel et al. |
| 8,780,703 B1 | 7/2014 | Eidelson et al. |
| 8,792,374 B1 | 7/2014 | Jain et al. |
| 8,792,905 B1 | 7/2014 | Li et al. |
| 8,804,705 B2 | 8/2014 | Fangman et al. |
| 8,805,345 B2 | 8/2014 | Ling et al. |
| 8,810,392 B1 | 8/2014 | Teller et al. |
| 8,819,566 B2 | 8/2014 | Mehin et al. |
| 8,837,360 B1 | 9/2014 | Mishra et al. |
| 8,838,539 B1 | 9/2014 | Ashcraft et al. |
| 8,848,887 B2 | 9/2014 | Willman et al. |
| 8,862,701 B2 | 10/2014 | Havriluk |
| 8,885,609 B2 | 11/2014 | Nix |
| 8,903,051 B2 | 12/2014 | Li et al. |
| 8,903,360 B2 | 12/2014 | Celi, Jr. et al. |
| 8,909,556 B2 | 12/2014 | Huxham |
| 8,938,209 B2 | 1/2015 | Crawford et al. |
| 8,938,534 B2 | 1/2015 | Le et al. |
| 8,948,061 B2 | 2/2015 | Sridhar |
| 8,972,612 B2 | 3/2015 | Le et al. |
| 8,982,719 B2 | 3/2015 | Seetharaman et al. |
| 8,995,428 B2 | 3/2015 | Haster |
| 9,003,306 B2 | 4/2015 | Mehin et al. |
| 9,094,525 B2 | 7/2015 | Dye et al. |
| 9,179,005 B2 | 11/2015 | Perreault et al. |
| 9,253,332 B2 | 2/2016 | Dye et al. |
| 9,432,830 B2 | 8/2016 | Lahtiranta et al. |
| 9,537,762 B2 | 1/2017 | Perreault et al. |
| 9,549,071 B2 | 1/2017 | Björsell et al. |
| 9,565,307 B2 | 2/2017 | Björsell et al. |
| 9,813,330 B2 | 11/2017 | Perreault et al. |
| 9,826,002 B2 | 11/2017 | Perreault et al. |
| 9,935,872 B2 | 4/2018 | Perreault et al. |
| 9,948,549 B2 | 4/2018 | Perreault et al. |
| 10,218,606 B2 | 2/2019 | Perreault et al. |
| 2001/0027478 A1 | 10/2001 | Meier et al. |
| 2001/0028642 A1 | 10/2001 | Veschi |
| 2001/0052081 A1 | 12/2001 | McKibben et al. |
| 2002/0002041 A1 | 1/2002 | Lindgren et al. |
| 2002/0018445 A1 | 2/2002 | Kobayashi |
| 2002/0051518 A1 | 5/2002 | Bondy et al. |
| 2002/0057764 A1 | 5/2002 | Salvucci et al. |
| 2002/0068545 A1 | 6/2002 | Oyama et al. |
| 2002/0101974 A1 | 8/2002 | Zbib |
| 2002/0116464 A1 | 8/2002 | Mak |
| 2002/0122391 A1 | 9/2002 | Shalit |
| 2002/0122547 A1 | 9/2002 | Hinchey et al. |
| 2002/0141352 A1 | 10/2002 | Fangman et al. |
| 2002/0150080 A1 | 10/2002 | Bhattacharya et al. |
| 2003/0008635 A1 | 1/2003 | Ung et al. |
| 2003/0012196 A1 | 1/2003 | Ramakrishnan |
| 2003/0043974 A1 | 3/2003 | Emerson, III |
| 2003/0091028 A1 | 5/2003 | Chang et al. |
| 2003/0095539 A1 | 5/2003 | Feuer |
| 2003/0095541 A1 | 5/2003 | Chang et al. |
| 2003/0114145 A1* | 6/2003 | Boda ............... H04L 67/04 455/412.1 |
| 2003/0121967 A1 | 7/2003 | Goldberg et al. |
| 2003/0179747 A1 | 9/2003 | Pyke et al. |
| 2003/0200311 A1 | 10/2003 | Baum |
| 2003/0211840 A1 | 11/2003 | Castrogiovanni et al. |
| 2003/0219103 A1 | 11/2003 | Rao et al. |
| 2004/0009761 A1 | 1/2004 | Money et al. |
| 2004/0019539 A1 | 1/2004 | Raman et al. |
| 2004/0022237 A1 | 2/2004 | Elliot et al. |
| 2004/0034793 A1 | 2/2004 | Yuan |
| 2004/0157629 A1 | 8/2004 | Kallio et al. |
| 2004/0165709 A1 | 8/2004 | Pence et al. |
| 2004/0181599 A1 | 9/2004 | Kreusch et al. |
| 2004/0202295 A1 | 10/2004 | Shen et al. |
| 2004/0203565 A1 | 10/2004 | Chin et al. |
| 2004/0203582 A1 | 10/2004 | Dorenbosch et al. |
| 2004/0218748 A1 | 11/2004 | Fisher |
| 2004/0240439 A1 | 12/2004 | Castleberry et al. |
| 2004/0255126 A1 | 12/2004 | Reith |
| 2005/0007999 A1 | 1/2005 | Becker et al. |
| 2005/0021939 A1 | 1/2005 | Le et al. |
| 2005/0025043 A1 | 2/2005 | Mussman et al. |
| 2005/0063519 A1 | 3/2005 | James |
| 2005/0069097 A1 | 3/2005 | Hanson et al. |
| 2005/0083911 A1 | 4/2005 | Grabelsky et al. |
| 2005/0094651 A1 | 5/2005 | Lutz et al. |
| 2005/0131813 A1 | 6/2005 | Gallagher et al. |
| 2005/0135401 A1 | 6/2005 | Schmidt |
| 2005/0164704 A1 | 7/2005 | Winsor |
| 2005/0169248 A1 | 8/2005 | Truesdale et al. |
| 2005/0171898 A1 | 8/2005 | Bishop et al. |
| 2005/0174937 A1 | 8/2005 | Scoggins et al. |
| 2005/0177843 A1 | 8/2005 | Williams |
| 2005/0188081 A1 | 8/2005 | Gibson et al. |
| 2005/0190892 A1 | 9/2005 | Dawson et al. |
| 2005/0192897 A1 | 9/2005 | Rogers et al. |
| 2005/0192901 A1 | 9/2005 | McCoy et al. |
| 2005/0198499 A1 | 9/2005 | Salapaka et al. |
| 2005/0202799 A1 | 9/2005 | Rollender |
| 2005/0222952 A1 | 10/2005 | Garrett et al. |
| 2005/0267842 A1 | 12/2005 | Weichert et al. |
| 2005/0287979 A1 | 12/2005 | Rollender |
| 2006/0006224 A1 | 1/2006 | Modi |
| 2006/0007940 A1 | 1/2006 | Sollee et al. |
| 2006/0013266 A1 | 1/2006 | Vega-Garcia et al. |
| 2006/0025122 A1 | 2/2006 | Harris et al. |
| 2006/0030290 A1 | 2/2006 | Rudolf et al. |
| 2006/0036522 A1 | 2/2006 | Perham |
| 2006/0072547 A1 | 4/2006 | Florkey et al. |
| 2006/0072550 A1 | 4/2006 | Davis et al. |
| 2006/0078094 A1 | 4/2006 | Breen et al. |
| 2006/0093135 A1 | 5/2006 | Fiatal et al. |
| 2006/0095320 A1 | 5/2006 | Jones |
| 2006/0109960 A1 | 5/2006 | D'Evelyn et al. |
| 2006/0111116 A1 | 5/2006 | Palmer et al. |
| 2006/0116892 A1 | 6/2006 | Grimes et al. |
| 2006/0142011 A1 | 6/2006 | Kallio |
| 2006/0146797 A1 | 7/2006 | Lebizay |
| 2006/0153342 A1 | 7/2006 | Sasaki |
| 2006/0160565 A1 | 7/2006 | Singh et al. |
| 2006/0177035 A1 | 8/2006 | Cope et al. |
| 2006/0189303 A1 | 8/2006 | Rollender |
| 2006/0195398 A1 | 8/2006 | Dheer et al. |
| 2006/0195584 A1 | 8/2006 | Baumann |
| 2006/0205383 A1 | 9/2006 | Rollender et al. |
| 2006/0209768 A1 | 9/2006 | Yan et al. |
| 2006/0233317 A1 | 10/2006 | Coster et al. |
| 2006/0248186 A1 | 11/2006 | Smith |
| 2006/0251056 A1 | 11/2006 | Feuer |
| 2006/0258328 A1 | 11/2006 | Godoy |
| 2006/0264200 A1 | 11/2006 | Laiho et al. |
| 2006/0268921 A1 | 11/2006 | Ekstrom et al. |
| 2006/0281437 A1 | 12/2006 | Cook |
| 2007/0016524 A1 | 1/2007 | Diveley et al. |
| 2007/0036139 A1 | 2/2007 | Patel et al. |
| 2007/0036143 A1 | 2/2007 | Alt et al. |
| 2007/0047548 A1 | 3/2007 | Yazaki et al. |
| 2007/0053382 A1 | 3/2007 | Bevan et al. |
| 2007/0061397 A1 | 3/2007 | Gregorat et al. |
| 2007/0064919 A1 | 3/2007 | Chen et al. |
| 2007/0092070 A1 | 4/2007 | Croy et al. |
| 2007/0112964 A1 | 5/2007 | Guedalia et al. |
| 2007/0115935 A1 | 5/2007 | Qiu et al. |

(56) References Cited

U.S. PATENT DOCUMENTS

| | | |
|---|---|---|
| 2007/0121590 A1 | 5/2007 | Turner et al. |
| 2007/0121593 A1 | 5/2007 | Vance et al. |
| 2007/0121602 A1 | 5/2007 | Sin et al. |
| 2007/0121866 A1 | 5/2007 | Kniveton et al. |
| 2007/0127676 A1 | 6/2007 | Khadri |
| 2007/0174469 A1 | 7/2007 | Andress et al. |
| 2007/0217354 A1 | 9/2007 | Buckley |
| 2007/0220038 A1 | 9/2007 | Crago |
| 2007/0230423 A1* | 10/2007 | Yoshida ............... H04W 76/10 370/338 |
| 2007/0253418 A1 | 11/2007 | Shiri et al. |
| 2007/0253429 A1 | 11/2007 | James |
| 2007/0263609 A1 | 11/2007 | Mitchell |
| 2007/0286170 A1* | 12/2007 | Khan ................... H04L 12/66 370/356 |
| 2007/0297376 A1 | 12/2007 | Gass |
| 2008/0013523 A1 | 1/2008 | Nambakkam |
| 2008/0037715 A1 | 2/2008 | Prozeniuk et al. |
| 2008/0043718 A1 | 2/2008 | Chu |
| 2008/0056235 A1* | 3/2008 | Albina ................. H04M 7/123 370/352 |
| 2008/0056243 A1 | 3/2008 | Roy et al. |
| 2008/0056302 A1 | 3/2008 | Erdal et al. |
| 2008/0063153 A1 | 3/2008 | Krivorot et al. |
| 2008/0160953 A1* | 7/2008 | Mia ..................... H04M 7/0057 455/404.2 |
| 2008/0166999 A1 | 7/2008 | Guedalia et al. |
| 2008/0167019 A1 | 7/2008 | Guedalia et al. |
| 2008/0167020 A1 | 7/2008 | Guedalia et al. |
| 2008/0167039 A1 | 7/2008 | Guedalia et al. |
| 2008/0187122 A1 | 8/2008 | Baker |
| 2008/0188198 A1 | 8/2008 | Patel et al. |
| 2008/0188227 A1 | 8/2008 | Guedalia et al. |
| 2008/0205378 A1 | 8/2008 | Wyss et al. |
| 2008/0261560 A1* | 10/2008 | Ruckart .............. G07C 9/00103 455/411 |
| 2008/0310599 A1 | 12/2008 | Purnadi et al. |
| 2009/0003535 A1 | 1/2009 | Grabelsky et al. |
| 2009/0012851 A1 | 1/2009 | Marc |
| 2009/0017842 A1* | 1/2009 | Fukasaku ........... H04M 3/42042 455/457 |
| 2009/0028146 A1 | 1/2009 | Kleyman et al. |
| 2009/0129566 A1 | 5/2009 | Feuer |
| 2009/0135724 A1 | 5/2009 | Zhang et al. |
| 2009/0135735 A1 | 5/2009 | Zhang et al. |
| 2009/0141883 A1 | 6/2009 | Bastien |
| 2009/0213839 A1 | 8/2009 | Davis et al. |
| 2009/0214000 A1 | 8/2009 | Patel et al. |
| 2009/0238168 A1 | 9/2009 | Lavoie et al. |
| 2009/0268615 A1 | 10/2009 | Pelletier |
| 2009/0292539 A1 | 11/2009 | Jaroker |
| 2009/0296900 A1 | 12/2009 | Breen et al. |
| 2009/0325558 A1 | 12/2009 | Pridmore et al. |
| 2010/0002701 A1 | 1/2010 | Hsieh et al. |
| 2010/0008345 A1 | 1/2010 | Lebizay |
| 2010/0039946 A1 | 2/2010 | Imbimbo et al. |
| 2010/0083364 A1 | 4/2010 | Gutierrez |
| 2010/0086119 A1 | 4/2010 | De Luca et al. |
| 2010/0105379 A1 | 4/2010 | Bonner et al. |
| 2010/0114896 A1 | 5/2010 | Clark et al. |
| 2010/0115018 A1 | 5/2010 | Yoon et al. |
| 2010/0128729 A1 | 5/2010 | Yazaki et al. |
| 2010/0142382 A1 | 6/2010 | Jungck et al. |
| 2010/0150138 A1 | 6/2010 | Björsell et al. |
| 2010/0150328 A1 | 6/2010 | Perrault et al. |
| 2010/0172345 A1 | 7/2010 | Björsell et al. |
| 2010/0177671 A1 | 7/2010 | Qiu et al. |
| 2010/0220852 A1 | 9/2010 | Willman et al. |
| 2010/0233991 A1 | 9/2010 | Crawford et al. |
| 2010/0246589 A1 | 9/2010 | Pelletier |
| 2010/0272242 A1 | 10/2010 | Croy et al. |
| 2010/0278534 A1 | 11/2010 | Leiden et al. |
| 2010/0316195 A1 | 12/2010 | Di Serio et al. |
| 2011/0013541 A1 | 1/2011 | Croy et al. |
| 2011/0072095 A1 | 3/2011 | Havriluk |
| 2011/0122827 A1 | 5/2011 | Björsell et al. |
| 2011/0153809 A1 | 6/2011 | Ghanem et al. |
| 2011/0167164 A1 | 7/2011 | Gutierrez |
| 2011/0176541 A1 | 7/2011 | James |
| 2011/0201321 A1 | 8/2011 | Bonner |
| 2011/0208859 A1 | 8/2011 | Gutierrez |
| 2011/0235543 A1 | 9/2011 | Seetharaman et al. |
| 2011/0255553 A1 | 10/2011 | Bobba et al. |
| 2011/0261717 A1 | 10/2011 | Akuzuwa et al. |
| 2011/0267986 A1 | 11/2011 | Grabelsky et al. |
| 2011/0273526 A1 | 11/2011 | Mehin et al. |
| 2011/0276903 A1 | 11/2011 | Mehin et al. |
| 2011/0276904 A1 | 11/2011 | Mehin et al. |
| 2011/0292929 A1 | 12/2011 | Haster |
| 2012/0014383 A1 | 1/2012 | Geromel et al. |
| 2012/0089717 A1 | 4/2012 | Chen |
| 2012/0096145 A1 | 4/2012 | Le et al. |
| 2012/0099599 A1 | 4/2012 | Keränen et al. |
| 2012/0113981 A1 | 5/2012 | Feuer |
| 2012/0155333 A1 | 6/2012 | Yoon et al. |
| 2012/0170574 A1 | 7/2012 | Huttunen et al. |
| 2012/0195236 A1 | 8/2012 | Knight |
| 2012/0195415 A1 | 8/2012 | Wyss et al. |
| 2012/0227101 A1 | 9/2012 | Yuan |
| 2012/0250624 A1 | 10/2012 | Lebizay |
| 2012/0259975 A1 | 10/2012 | Le et al. |
| 2012/0270554 A1 | 10/2012 | Hellwig et al. |
| 2012/0282881 A1 | 11/2012 | Mitchell |
| 2012/0314699 A1 | 12/2012 | Qiu et al. |
| 2013/0039226 A1 | 2/2013 | Sridhar |
| 2013/0097308 A1 | 4/2013 | Le et al. |
| 2013/0114589 A1 | 5/2013 | Fangnnan et al. |
| 2013/0128879 A1 | 5/2013 | Kyle |
| 2013/0148549 A1 | 6/2013 | Crawford et al. |
| 2013/0173534 A1 | 7/2013 | Nelakonda et al. |
| 2013/0223276 A1 | 8/2013 | Padgett |
| 2013/0229950 A1 | 9/2013 | Björsell et al. |
| 2013/0237198 A1 | 9/2013 | Vashi et al. |
| 2013/0254301 A1 | 9/2013 | Lin et al. |
| 2013/0272297 A1 | 10/2013 | Breen et al. |
| 2013/0281147 A1 | 10/2013 | Denman et al. |
| 2013/0287006 A1 | 10/2013 | Nix |
| 2013/0310002 A1 | 11/2013 | Celi, Jr. et al. |
| 2013/0318166 A1 | 11/2013 | Jungck et al. |
| 2013/0329722 A1 | 12/2013 | Perrault et al. |
| 2013/0329864 A1 | 12/2013 | Björsell et al. |
| 2014/0010119 A1 | 1/2014 | Björsell et al. |
| 2014/0016764 A1 | 1/2014 | Björsell et al. |
| 2014/0101749 A1 | 4/2014 | Yuan |
| 2014/0141884 A1 | 5/2014 | Kropivny |
| 2014/0153477 A1 | 6/2014 | Huttunen et al. |
| 2014/0211789 A1 | 7/2014 | Feuer |
| 2014/0215642 A1 | 7/2014 | Huxham |
| 2014/0220944 A1 | 8/2014 | Balasubramanian |
| 2014/0244393 A1 | 8/2014 | Rimmer et al. |
| 2014/0247730 A1 | 9/2014 | Thota et al. |
| 2014/0269624 A1 | 9/2014 | Khay-Ibbat et al. |
| 2014/0307858 A1 | 10/2014 | Li et al. |
| 2014/0321333 A1 | 10/2014 | Björsell et al. |
| 2014/0324969 A1 | 10/2014 | Riddle |
| 2014/0337961 A1 | 11/2014 | Chien et al. |
| 2014/0337962 A1 | 11/2014 | Brandstatter |
| 2014/0349602 A1 | 11/2014 | Majumdar et al. |
| 2015/0327320 A1 | 11/2015 | Huttunen et al. |
| 2015/0358470 A1 | 12/2015 | Björsell et al. |
| 2016/0006882 A1 | 1/2016 | Björsell et al. |
| 2016/0028619 A1 | 1/2016 | Perreault et al. |
| 2017/0104868 A1 | 4/2017 | Björsell et al. |
| 2017/0111265 A1 | 4/2017 | Perreault et al. |
| 2017/0126752 A1 | 5/2017 | Perreault et al. |
| 2017/0142256 A1 | 5/2017 | Björsell et al. |
| 2019/0199621 A1 | 6/2019 | Perreault et al. |

FOREIGN PATENT DOCUMENTS

| | | |
|---|---|---|
| CA | 2 218 218 A1 | 10/1997 |
| CA | 2249668 | 4/1999 |
| CA | 2 299 037 A1 | 8/2000 |

(56) References Cited

FOREIGN PATENT DOCUMENTS

| | | |
|---|---|---|
| CA | 2 437 275 A1 | 10/2002 |
| CA | 2598200 A1 | 2/2008 |
| CA | 2668025 A1 | 5/2008 |
| CA | 3032707 A1 | 5/2008 |
| CA | 3045672 A1 | 5/2008 |
| CA | 3045681 A1 | 5/2008 |
| CA | 3045683 A1 | 5/2008 |
| CA | 3045694 A1 | 5/2008 |
| CA | 2670510 A1 | 6/2008 |
| CA | 2681984 A1 | 10/2008 |
| CA | 2 690 236 A1 | 12/2008 |
| CA | 2 659 007 A1 | 9/2009 |
| CA | 2732148 A1 | 2/2010 |
| CA | 2 778 905 A1 | 8/2010 |
| CA | 2812174 A1 | 3/2011 |
| CA | 2732148 C | 6/2018 |
| CA | 2668025 C | 2/2020 |
| CN | 1498029 A | 5/2004 |
| CN | 1498482 A | 5/2004 |
| CN | 1668137 A | 9/2005 |
| CN | 1274114 C | 9/2006 |
| CN | 101005503 A | 7/2007 |
| CN | 101069390 A | 11/2007 |
| CN | 101095329 A | 12/2007 |
| CN | 101584150 A | 11/2009 |
| CN | 101584166 A | 11/2009 |
| CN | 101605342 A | 12/2009 |
| CN | 1498029 B | 5/2010 |
| CN | 101772929 A | 7/2010 |
| CN | 101069390 B | 12/2010 |
| CN | 102137024 A | 7/2011 |
| CN | 102457494 A | 5/2012 |
| CN | 102484656 A | 5/2012 |
| CN | 102572123 A | 7/2012 |
| CN | 101095329 B | 10/2012 |
| CN | 101605342 B | 12/2012 |
| CN | 102833232 A | 12/2012 |
| CN | 101005503 B | 1/2013 |
| CN | 101772929 B | 7/2014 |
| CN | 102457494 B | 10/2014 |
| DE | 602 01 827 T2 | 11/2005 |
| DE | 11 2005 003 306 T5 | 1/2008 |
| DE | 601 33 316 T2 | 7/2008 |
| DE | 603 17 751 T2 | 11/2008 |
| EP | 0 841 832 A2 | 5/1998 |
| EP | 0 841 832 A3 | 5/1999 |
| EP | 1 032 224 A2 | 8/2000 |
| EP | 1 032 224 A3 | 8/2000 |
| EP | 1054569 A1 | 11/2000 |
| EP | 1 244 250 A1 | 9/2002 |
| EP | 1 266 516 A2 | 12/2002 |
| EP | 1 362 456 A2 | 11/2003 |
| EP | 1 371 173 A1 | 12/2003 |
| EP | 1 389 862 A1 | 2/2004 |
| EP | 1 411 743 A1 | 4/2004 |
| EP | 1 389 862 B1 | 11/2004 |
| EP | 1 526 697 A2 | 4/2005 |
| EP | 1 362 456 A4 | 5/2005 |
| EP | 1 575 327 A1 | 9/2005 |
| EP | 1 610 583 A1 | 12/2005 |
| EP | 1 526 697 A3 | 3/2006 |
| EP | 1 721 446 A1 | 11/2006 |
| EP | 1 829 300 A1 | 9/2007 |
| EP | 1 371 173 B1 | 11/2007 |
| EP | 1 411 743 B1 | 11/2007 |
| EP | 1 362 456 B1 | 3/2008 |
| EP | 1 974 304 A2 | 10/2008 |
| EP | 1 974 304 A4 | 10/2008 |
| EP | 1 610 583 B1 | 8/2009 |
| EP | 2 084 868 | 8/2009 |
| EP | 2 090 024 | 8/2009 |
| EP | 2 127 232 A1 | 12/2009 |
| EP | 2 165 489 A1 | 3/2010 |
| EP | 2 215 755 A1 | 8/2010 |
| EP | 2 227 048 A1 | 9/2010 |
| EP | 2 127 232 A4 | 3/2011 |
| EP | 2 165 489 A4 | 3/2011 |
| EP | 2 311 292 | 4/2011 |
| EP | 1 829 300 A4 | 5/2012 |
| EP | 2 449 749 A1 | 5/2012 |
| EP | 2 478 678 | 7/2012 |
| EP | 2 215 755 A4 | 10/2012 |
| EP | 1 829 300 B1 | 11/2012 |
| EP | 2 449 749 B1 | 3/2014 |
| EP | 1 266 516 B1 | 5/2014 |
| EP | 2311292 A4 | 5/2014 |
| EP | 2084868 B1 | 5/2018 |
| EP | 3386155 A1 | 10/2018 |
| EP | 2311292 | 4/2020 |
| GB | 2 332 337 A | 6/1999 |
| IN | 24/2009 | 6/2009 |
| IN | 29/2009 | 7/2009 |
| IN | 287412 | 9/2017 |
| JP | 2011-199384 A | 10/2011 |
| KR | 10-2009-0086428 A | 8/2009 |
| KR | 10-2009-0095621 A | 9/2009 |
| MX | 2009004811 A | 8/2009 |
| MX | 2009005751 A | 8/2009 |
| SG | 151991 | 6/2009 |
| SG | 152752 | 6/2009 |
| SG | 155474 | 10/2009 |
| WO | WO 2000/069156 A1 | 11/2000 |
| WO | WO 2001/006740 A2 | 1/2001 |
| WO | WO 01/50693 A1 | 7/2001 |
| WO | WO 01/69899 A2 | 9/2001 |
| WO | WO 01/69899 A3 | 9/2001 |
| WO | WO 01/80587 A1 | 10/2001 |
| WO | WO 01/89145 A2 | 11/2001 |
| WO | WO 0223851 A2 | 3/2002 |
| WO | WO 0225889 A2 | 3/2002 |
| WO | WO 02/082728 A1 | 10/2002 |
| WO | WO 02/082782 A2 | 10/2002 |
| WO | WO 02/082782 A3 | 10/2002 |
| WO | WO 03/027801 A2 | 4/2003 |
| WO | WO 2003/028355 A1 | 4/2003 |
| WO | WO 2003/096559 A1 | 11/2003 |
| WO | WO 2004/008786 A1 | 1/2004 |
| WO | WO 2004/102941 A1 | 11/2004 |
| WO | WO 2005/084002 A1 | 9/2005 |
| WO | WO 2006/067269 A1 | 6/2006 |
| WO | WO 2006/072099 A1 | 7/2006 |
| WO | WO 2006/078175 A2 | 7/2006 |
| WO | WO 2006/078175 A3 | 7/2006 |
| WO | WO 2007/044454 A2 | 4/2007 |
| WO | WO 2007/056158 A1 | 5/2007 |
| WO | WO 2007/087077 A2 | 8/2007 |
| WO | WO 2007/087077 A3 | 8/2007 |
| WO | WO 2008/027065 A1 | 3/2008 |
| WO | WO 2008/052340 A1 | 5/2008 |
| WO | WO 2008/064481 A1 | 6/2008 |
| WO | WO 2008/085614 A2 | 7/2008 |
| WO | WO 2008/085614 A3 | 7/2008 |
| WO | WO 2008/086350 A2 | 7/2008 |
| WO | WO 2008/086350 A3 | 7/2008 |
| WO | WO 2008/103652 A1 | 8/2008 |
| WO | WO 2008/116296 A1 | 10/2008 |
| WO | WO 2008/085614 A8 | 12/2008 |
| WO | WO 2008/151406 A1 | 12/2008 |
| WO | WO 2008/151406 A8 | 12/2008 |
| WO | WO 2009/070202 A1 | 6/2009 |
| WO | WO 2009/070278 A1 | 6/2009 |
| WO | W00200902627 | 9/2009 |
| WO | WO 2010/012090 A2 | 2/2010 |
| WO | WO 2011/000405 A1 | 1/2011 |
| WO | WO 2011/032256 A1 | 3/2011 |
| WO | WO 2013/013189 A2 | 1/2013 |
| WO | WO 2013/120069 A1 | 8/2013 |
| WO | WO 2014/066155 A2 | 5/2014 |
| WO | WO 2014/117599 A1 | 8/2014 |
| WO | WO 2014-166258 A1 | 10/2014 |

(56) References Cited

OTHER PUBLICATIONS

Huitema et al., "Architecture for Internet Telephony Service for Residential Customers," Academic Paper for *Bellcore*, Mar. 2, 1999, pp. 1-14.
Stallings, William, "The Session Initiation Protocol," *The Internet Protocol Journal*, vol. 6, No. 1, Mar. 2003, pp. 20-30.
Chinese Office Action dated Mar. 24, 2011 for Chinese Patent Application No. CN 200780049791.5.
Chinese Office Action dated Jun. 23, 2011 for Chinese Patent Application No. CN 200780049136.X.
Indonesian Examination Report dated Jul. 5, 2012 for Indonesian Patent Application No. W-00200901414.
Indonesian Examination Report dated Feb. 8, 2013 for Indonesian Patent Application No. W-00200901165.
Mexican Exam Report dated Jul. 11, 2011 for Mexican Patent Application No. MX/a/2009/004811.
Mexican Notice of Allowance dated Sep. 2, 2011 for Mexican Patent Application No. MX/a/2009/005751.
Canadian Office Action dated Jan. 27, 2015 for Canadian Patent Application No. CA 2,681,984.
Extended European Search Report dated Apr. 16, 2014 for European Patent Application No. EP 09 802 316.1 which shares priority of U.S. Appl. No. 61/129,898, filed Jul. 28, 2008 with captioned U.S. Appl. No. 14/035,806.
Baker et al., "Cisco Support for Lawful Intercept in IP Networks," Internet Draft—working document of the Internet Engineering Task Force (IETF), accessible at http://www.ietf.org/ietf/lid-abstracts.txt, Apr. 2003, expires Sep. 30, 2003, pp. 1-15.
Bhushan et al., "Federated Accounting: Service Charging and Billing in a Business-to-Business Environment," 0-7803-6719-7/01, © 2001 IEEE, pp. 107-121.
Jajszczyk et al., "Emergency Calls in Flow-Aware Networks," *IEEE Communications Letters*, vol. 11, No. 9, Sep. 2007, pp. 753-755.
Kim et al., "An Enhanced VoIP Emergency Services Prototype," *Proceedings of the 3rd International ISCRAM Conference* (B. Van de Walle and M. Turoff, eds.), Newark, NJ (USA), May 2006, pp. 1-8.
Kornfeld et al., "DVB-H and IP Datacast—Broadcast to Handheld Devices," *IEEE Transactions on Broadcasting*, vol. 53, No. 1, Mar. 2007, pp. 161-170.
Kortebi et al., "SINR-Based Routing in Multi-Hop Wireless Networks to Improve VoIP Applications Support," 1-4244-0667-6/07, © 2007 IEEE, pp. 491-496.
Lee et al., "VoIP Interoperation with KT-NGN," in *The 6th International Conference on Advanced Communication Technology*, Technical Proceedings, 2004, pp. 126-128, accompanied by Title and Contents—4 pages.
Lin et al., "Effective VoIP Call Routing in WLAN and Cellular Integration," *IEEE Communications Letters*, vol. 9, No. 10, Oct. 2005, pp. 874-876.
Ma et al., "Realizing MPEG4 Video Transmission Based on Mobile Station over GPRS," 0-7803-9335-X/05, © 2005 IEEE, pp. 1241-1244.
Mintz-Habib et al., "A VoIP Emergency Services Architecture and Prototype," {mm2571,asr,hgs,xiaotaow}@cs.columbia.edu, 0-7803-9428-3/05, © 2005 IEEE, pp. 523-528.
Munir, Muhammad Farukh, "Study of an Adaptive Scheme for Voice Transmission on IP in a Wireless Networking Environment 802.11e," Dept. of Networks and Distributed Computing, *Ecole Supérieure En Sciences Informatiques (ESSI), Université De Nice*, Jun. 2005, (pp. 1-35), Best Available Copy—pp. 1-11.
Sripanidkulchai et al., "Call Routing Management in Enterprise VoIP Networks," *Copyright 2007 ACM* 978-1-59593-788-09/07/0008, 6 pages.
Thernelius, Fredrik, "SIP, NAT, and Firewalls," Master's Thesis, *Ericsson, Department of Teleinformatics*, May 2000, pp. 1-69.
Trad et al., "Adaptive VoIP Transmission over Heterogeneous Wired/Wireless Networks," *V. Roca and F. Rousscau (Eds.): MIPS 2004, LNCS 3311*, pp. 25-36, 2004, © Springer-Verlag Berlin Heidelberg 2004.
Yu et al., "Service-Oriented Issues: Mobility, Security, Charging and Billing Management in Mobile Next Generation Networks," *IEEE BcN2006*, 1-4244-0146-1/06, © 2006 IEEE, pp. 1-10.
Ketchpel et al. "U-PAI: A universal payment application interface" *Second USENIX Workshop on Electronic Commerce Proceedings*, Aug. 1996, pp. 1-17.
Moberg & Drummond, "MIME-Based Secure Peer-to-Peer Business Data Interchange Using HTTP, Applicability Statement 2 (AS2)," *Network Working Group, Request for Comments: 4130, Category: Standards Track*, Copyright © The Internet Society Jul. 2005, pp. 1-47.
Abrazhevich, Dennis. "Electronic Payment Systems: a User-Centered Perspective and Interaction Design," *Thesis under the auspices of the J.F. Schouten School for User-System Interaction Research*, Technische Universiteit Eindhoven, Netherlands, 2004, pp. Cover page—p. 189.
Extended European Search Report dated Nov. 2, 2012 for European Application No. EP 07 855 436.7.
Extended European Search Report dated Dec. 20, 2013 for European Application No. EP 09 849 358.8.
F. Baker et al. "RFC 3924—Cisco Architecture for Lawful Intercept in IP Networks." Oct. 2004.
Cisco. "*Lawful Intercept Requirements Summary.*" http://www.faqs.org/rfcs/rfc3924.html. Nov. 8, 2006.
Sippy SIP B2BUA. "*About Sippy RTPproxy.*" http://www.rtpproxy.org. Jul. 15, 2009.
ETSI Technical Specification. "Lawful Interception (LI); Handover Interface and Service-Specific Details (SSD) for IP delivery; Part 5: Service-specific details for IP Multimedia Services." Apr. 2008, 25 pgs, v.2.3.1, France.
M. Handley et al. "RFC 2543—SIP: Session Initiation Protocol." Mar. 1999.
The International Search Report and Written Opinion of the International Searching Authority completed Jun. 6, 2008 for related PCT/CA2008/000545.
The International Search Report and Written Opinion of the International Searching Authority completed Feb. 6, 2008 for corresponding PCT/CA2007/001956.
The International Preliminary Report on Patentability dated May 14, 2009 for corresponding PCT/CA2007/001956.
The International Search Report and Written Opinion of the International Searching Authority completed Mar. 3, 2008 for related PCT/CA2007/002150.
The International Preliminary Report on Patentability dated Feb. 13, 2009 for related PCT/CA2007/002150.
The International Preliminary Report on Patentability and Written Opinion of the International Searching Authority dated Feb. 10, 2011 for related PCT Application No. PCT/CA2009/001062, Feb. 1, 2011.
The Written Opinion and International Search Report completed on Jun. 18, 2010 for related PCT Application No. PCT/CA2009/001317.
The International Search Report and Written Opinion dated on Mar. 12, 2010 for corresponding PCT Application No. PCT/CA2009/001062.
The International Preliminary Report on Patentability dated Sep. 29, 2009 for PCT/CA2008/000545.
The International Preliminary Report on Patentability dated Mar. 20, 2012 for PCT/CA2009/001317.
Townsley, et al.; "RFC 2661—Layer Two Tunneling Protocol 'L2TP'", Aug. 1999.
IP2Location, http://www.ip2location.com/; printed Jun. 20, 2012.
DOTS IP Address Validation, "Overview", http://www.serviceobjects.com/products/dots_ipgeo.asp; printed Jun. 21, 2012.
List of North American Numbering Plan area codes, http://en.wikipedia.org/wiki/List_of NANP_area_codes; printed Jun. 20, 2012.
DOTS Phone Exchange, "Overview", http://www.serviceobjects.com/demos/PhoneExchangeDemo.asp (URL no longer valid, current URL is http://www.serviceobjects.com/products/phone/phone-exchange); printed Jun. 21, 2012.
Rosenberg, et al.; "RFC 3261—SIP: Session Initiation Protocol", Jun. 2002.

(56) References Cited

OTHER PUBLICATIONS

Lind AT&T S: "ENUM Call Flows for VoIP Interworking; draft-lind-enum-callflows-03.txt", Feb. 1, 2002, No. 3, Feb. 1, 2002, pp. 1-17, XP015004214, ISSN: 0000-0004.
IETF ENUM WG R Stastny OEFEG Informational Numbering for VoIP and Other IP Communications: "Numbering for ViOP and other IP Communications, draft-stastny-enum-numbering-voip-00.txt", Oct. 1, 2003, Oct. 1, 2003, pp. 1-43, XP015035676, ISSN: 0000-0004.
Supplementary European Search Report for European Application No. 07816106, dated Jun. 18, 2012.
Supplementary European Search Report for European Application No. 07816106, dated Nov. 2, 2012.
Wikipedia, "International mobile subscriber identity (IMSI)," http://en.wikipedia.org/wiki/IMSI, Jul. 16, 2013.
Wikipedia, "Roaming," http://en.wikipedia.org/wiki/Roaming, Jul. 16, 2013.
Document Title: Complaint for Patent Infringement [Jury Demand]; Case Title: *Voip-Pal.com, Inc., a Nevada corporation*, Plaintiff, v. *Verizon Wireless Services, LLC, a Delaware limited liability corporation; Verizon Communications, Inc., a Delaware corporation; AT&T, Inc., a Delaware corporation; AT&T Corp., a Delaware corporation; and Does I through X*, inclusive, Defendants; Case No: 2:16-CV-00271; Court: United States District Court District of Nevada. Attachments: Table of Exhibits; Exhibit A; Exhibit B; Exhibit C; Exhibit D; Exhibit E; Chart 1 to Exhibit E; Chart 2 to Exhibit E; Chart 3 to Exhibit E; Chart 4 to Exhibit E; Chart 5 to Exhibit E; Chart 6 to Exhibit E; Exhibit F; Chart 1 to Exhibit F; Chart 2 to Exhibit F; Chart 3 to Exhibit F; Chart 4 to Exhibit F; Chart 5 to Exhibit F; Chart 6 to Exhibit F; Exhibit G; Exhibit H; and Addendum 1 to Exhibit H.
Document Title: Complaint for Patent Infringement [Jury Demand] ; Case Title: *Voip-Pal.com, INC., a Nevada corporation*, Plaintiff, v. *Apple, Inc., a California corporation*; Defendants; Case No: 2:16-CV-00260; Court: United States District Court District of Nevada. Attachments: Table of Exhibits; Exhibit A; Exhibit B; Exhibit C; Exhibit D; Chart 1 to Exhibit D; Chart 2 to Exhibit D; Chart 3 to Exhibit D; Chart 4 to Exhibit D; Exhibit E; Exhibit F; and Addendum 1 to Exhibit F.
Letter dated Nov. 30, 2015, from VoIP-Pal.com Inc. giving notice and inviting the company listed herein below to contact VoIP-Pal.com about U.S. Pat. Nos. 9,179,005 and 8,542,815 and related patents listed in the accompanying Attachment A. Sent to the following company: Apple Inc. In the U.S.
Letter dated Dec. 1, 2015, from VoIP-Pal.com Inc. giving notice and inviting the company listed herein below to contact VoIP-Pal.com about U.S. Pat Nos. 9,179,005 and 8,542,815 and related patents listed in the accompanying Attachment A. Sent to the following company; Verizon Communications in the U.S.
Letters dated December 18, 2015, from VoIP-Pal.com Inc. giving notice and inviting the companies listed herein below to contact VoIP-Pal.com about U.S. Pat. Nos. 9,179,005 and 8,542,815 and related patents listed in the accompanying Attachment A. (Please Note: Attachment A is attached here only to the first letter.) Sent to the following companies: Airtel in India; Alcatel-Lucent in France; Avaya Inc. In the U.S.; AT&T in the U.S.; Blackberry in Canada; Cable One in the U.S.; CenturyLink in the U.S.; Charter Communications in the U.S.; Cisco Systems in the U.S.; Comcast in the U.S.; Cox Communications in the U.S.; Cricket Wireless in the U.S.; Facebook in the U.S.; Freedom Pop in the U.S.; Frontier Communications in the U.S.; Google Inc. in the U.S.; HP in the U.S.; Juniper Networks in the U.S.; LoopPay, Inc. in the U.S.; Magic Jack in the U.S.; MetroPCS in the U.S.; Ooma in the U.S.; PayPal in the U.S.; Republic Wireless in the U.S.; Rok Mobile in the U.S.; Samsung Electronics—America in the U.S.; ShoreTel, Inc. in the U.S.; Siemens in Germany; Skype Usa in the U.S.; Sprint in the U.S.; Square Cash in the U.S.; Suddenlink Communications in the U.S.; Talktone in the U.S.; Tango in the U.S.; Time Warner Cable in the U.S.; 1-Mobile in the U.S.; Twitter in the U.S.; US Cellular in the U.S.; Venmo in the U.S.; Virgin Mobile USA in the U.S.; Vodafone in the UK; and Vonage in the U.S.
Letters dated Jan. 4, 2016, from VoIP-Pal.com Inc. giving notice and inviting the companies listed herein below to contact VoIP-Pal.com about U.S. Pat. Nos. 9,179,005 and 8,542,815 and related patents listed in the accompanying Attachment A. (Please Note: Attachment A is attached here only to the first letter.) Sent to the following companies: Rogers Communications Inc. in Canada; Shaw Cable in Canada; Walmart in Alaska; and WIND Mobile in Canada.
Letters dated Jan. 21, 2016, from VoIP-Pal.com Inc. giving notice and inviting the companies listed herein below to contact VoIP-Pal.com about U.S. Pat. Nos. 9,179,005 and 8,542,815 and related patents listed in the accompanying Attachment A. (Please Note: Attachment A is attached here only to the first letter.) Sent to the following companies: Alibaba (China) Co., Ltd in China; Comwave Telecommunications in Canada; and Intel in the U.S.
Letters dated Feb. 2, 2016, from VoIP-Pal.com Inc. giving notice and inviting the companies listed herein below to contact VoIP-Pal.com about U.S. Pat. Nos. 9,179,005 and 8,542,815 and related patents listed in the accompanying Attachment A. (Please Note: Attachment A is attached here only to the first letter.) Sent to the following companies: Netflix Inc. in the U.S.; Skype Technologies in the U.S.; and WhatsApp Inc. in the U.S.
Document Title: United States Patent and Trademark Office; Before the Patent Trial and Appeal Board; *Apple Inc.*, Petitioner v. *VoIp-Pal.com Inc.*, Patent Owner; Case No. TBD, U.S. Pat. No. 9,179,005; Petition for Inter Partes Review of U.S. Pat. No. 9,179,005; Dated Jun. 15, 2016. 70 sheets.
Document Title: In the United States Patent and Trademark Office; Petition for Inter Partes Review Pursuant to 37 C.F.R. §42.100 ET SEQ.; In re U.S. Pat. No. 9,179,005; Currently in Litigation Styled: *VoIP-Pal.com, Inc.* v. *Apple Inc.*, Case No: 2:16-cv-00260-RFB-VCF; Issued: Nov. 3, 2015; Application Filed: Aug. 13, 2013; Applicant: Clay Perreault, et al.; Title: Producing Routing Messages for Voice Over IP Communications; Declaration of Henry H. Houh, PhD; Signed Jun. 14, 2016. 143 sheets.
Document Title: United States Patent and Trademark Office; Before the Patent Trial and Appeal Board; *Apple Inc.*, Petitioner v. *VoIP-Pal.com Inc.*, Patent Owner; Case No. TBD, U.S. Pat. No. 8,542,815; Petition for Inter Partes Review of U.S. Pat. No. 8,542,815; Dated Jun. 15, 2016. 67 sheets.
Document Title: In the United States Patent and Trademark Office; Petition for Inter Partes Review Pursuant to 37 C.F.R. §42.100 ET SEQ.; In re U.S. Pat. No. 8,542,815; Currently in Litigation Styled: *VoIP-Pal.com, Inc.* v. *Apple Inc.*, Case No: 2:16-cv-00260-RFB-VCF; Issued: Sep. 24, 2013; Application Filed: Nov. 1, 2007; Applicant: Clay Perreault, et al.; Title: Producing Routing Messages for Voice Over IP Communications; Declaration of Henry H. Houh, PhD; Signed Jun. 14, 2016, 143 sheets.
Document Title: Petition for Inter Partes Review of U.S. Pat. No. 8,542,815; United States Patent and Trademark Office; Before the Patent Trial and Appeal Board; *Unified Patents Inc.*, Petitioner v. *Voip-Pal.com Inc.*, Patent Owner; IPR2016-01082; U.S. Pat. No. 8,542,815; Producing Routing Messages for Voice Over IP Communications; Dated May 24, 2016. 64 sheets.
Document Title: Declaration of Michael Caloyannides; United States Patent and Trademark Office; Before the Patent Trial and Appeal Board; *Unified Patents Inc.*, Petitioner v. *Voip-Pal.com Inc.*, Patent Owner; IPR2016-01082; U.S. Pat. No. 8,542,815; Producing Routing Messages for Voice Over IP Communications; Signed May 23, 2016; Filed May 24, 2016, 84 sheets.
Document Title: Public Switched Telephone Networks: A Network Analysis of Emerging Networks; Daniel Livengood, Jijun Lin and Chintan Vaishnav; Engineering Systems Division; Massachusetts Institute of Technology; Submitted May 16, 2006; To Dan Whitney, Joel Moses and Chris Magee. 27 sheets.
Document Title: A Brief History of VoIP; Document One—The Past; Joe Hallock; joe@sitedifference.com; date on cover page Nov. 26, 2004; Evolution and Trends in Digital Media Technologies— COM 538; Masters of Communication in Digital Media; University of Washington. 17 sheets.
Document Title: Petitioner's Voluntary Interrogatory Responses; United States Patent and Trademark Office; Before the Patent Trial

(56) References Cited

OTHER PUBLICATIONS and Appeal Board; *Unified Patents Inc.*, Petitioner v. *Voip-Pal.com Inc.*, Patent Owner; IPR20161082; U.S. Pat. No. 8,542,815; Producing Routing Messages for Voice Over IP Communications; Signed and Filed not later than May 24, 2016. 8 sheets.
Document Title: VoIP-Pal, The World is Calling!, "Over $7 Billion in Lawsuits File by *Voip-Pal.com Inc.* vs *Apple, Verizon and AT&T* for Various Patent Infringements," *Business Wire®, A Berkshire Hathaway Company*, Feb. 11, 2016. 2 sheets.
Technical Report, "3rd Generation Partnership Project; Technical Specification Group Core Network and Terminals; Study into routing of MT-SMs via the HPLMN (Release 7)," *3GPP TR 23.840* V0.1.0 (Feb. 2006), 13 pages.
European Examination Report dated Nov. 26, 2015 for European Patent Application No. EP 07 816 106.4.
Canadian Office Action dated Nov. 18, 2015 for Canadian Patent Application No. CA 2,681,984.
Canadian Office Action dated Dec. 1, 2015 for Canadian Patent Application No. CA 2,812,174,.
Canadian Office Action dated Jan. 22, 2016 for Canadian Patent Application No. CA 2,916,220.
Canadian Office Action dated Mar. 3, 2016 for Canadian Patent Application No. CA 2,670,510.
Canadian Office Action dated Jun. 8, 2016 for Canadian Patent Application No. CA 2,916,217,.
First Examination Report dated Dec. 9, 2015, India Patent Application No. 1047/MUMNP/2009.
Communication for European Patent Application No. EP 07 816 106.4—Invitation pursuant to Article 94(3) and Rule 71(1) EPC dated Apr. 15, 2016. All pages.
Communication under Rule 71(3) EPS—Intention to Grant—dated Oct. 14, 2016 for European Patent Application No. EP 07 816 106.4.
Canadian Office Action dated Aug. 16, 2016 for Canadian Patent Application No. CA 2,681,984.
Canadian Office Action dated Mar. 31, 2017 for Canadian Patent Application No. CA 2,916,220.
Patent Owner Response to Petition, *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Filed: Feb. 10, 2017, 76 pages.
Patent Owner Updated Exhibit List, *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Filed: Feb. 10, 2017, 6 pages.
Voip-Pal Ex. 2002, IPR2016-01201, "Declaration of Ryan Thomas in Support of Pro Hac Vice Motion," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Jan. 20, 2017, 4 pages.
Voip-Pal Ex. 2003, IPR2016-01201, "Technical Review of Digifonica VoIP System," Digifonica, Global Telephone Solutions, Author: John Rutter, Stuart Gare, Version V0.7 (Draft), Date: May 7, 2005, 35 pages.
Voip-Pal Ex. 2004, IPR2016-01201, Memo—"Subject; Smart 421 Contract signed and Faxed," From: Clay S. Perreault, Date: Jun. 6, 2005, 8:53 AM, to: Steve Nicholson, et al., 2 pages.
Voip-Pal Ex. 2005, IPR2016-01201, Memo—"Subject: Digifonica TEchnology review," From: Clay Perreault, Date: Jun. 6, 2005, 5:37 PM; To: John Rutter, et al., 5 pages.
Voip-Pal Ex. 2006, IPR2016-01201, Memo—"Subject: Re: Sample code for review Next document upload complete," From: Clay Perreault, Date: Jun. 15, 2005, 3:28 PM, To: John Rutter, et al., 3 pages.
Voip-Pal Ex. 2007, IPR2016-01201, DigiFonica International Inc Memo—"[Fwd: Digifonica Technical Review—draft report]," From Clay Perreault, To: Rod Thomson, et al., Tue, Jul. 5, 2005 at 4:45 PM, 2 pages.

Voip-Pal Ex. 2008, IPR2016-01201, John Rutter—"Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Jan. 31, 2017, 4 pages.
Voip-Pal Ex. 2009, IPR2016-01201, Stuart Gare—"Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Feb. 2, 2017, 4 pages.
Voip-Pal Ex. 2010, IPR2016-01201, Pentti Kalevi Huttunen - "Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Feb. 3, 2017, 4 pages.
Voip-Pal Ex. 2011, IPR2016-01201, Ryan Purita—"Declaration in Support Patent Owner Response to Inter Partes Petition," *Apple Inc.*, Petitioner, v. *Voip-Pal.com, Inc.*, Patent Owner, Case No, IPR2016-01201, U.S. Pat. No. 8,542,815, United States Patent and Trademark Office, Before the Patent Trial and Appeal Board, Dated: Jan. 31, 2017, 3 pages.
Voip-Pal Ex, 2012, IPR2016-01201, Johan Emil Viktor Björsell—"Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Feb. 9, 2017, 9 pages.
Voip-Pal Ex. 2013, IPR2016-01201, Clay Perreault—"Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Feb. 8, 2017, 6 pages.
Voip-Pal Ex. 2014, IPR2016-01201, RBR Source Code, Version 361, "call_e164.class.php RBR Version 361, Jun. 6, 2005 09:22:59," 45 pages.
Voip-Pal Ex. 2015, IPR2016-01201, RBR Source Code Log for Trunk Directory, "r1879 | cdelalande | Oct. 31, 2006 17:07:46—0800 (Tue, Oct. 31, 2006) | 3 lines," 56 pages.
Voip-Pal Ex. 2016. IPR2016-01201, William Henry Mangione-Smith—"Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Feb. 10, 2017, 82 pages.
Voip-Pal Ex. 2017, IPR2016-01201, DF DigiFonica International Inc Memo—"notes from your presentation, 1 message" From Konstantin Kropivny, To: Emil Björsell, Tue, Jun. 14, 2005 at 7:33PM, 4 pages.
Voip-Pal Ex. 2018, IPR2016-01201, David Terry—"Declaration in Support Patent Owner Response to Inter Partes Petition," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Feb. 8, 2017, 5 pages.
Voip-Pal Ex. 2019, IPR2016-01201, DF DigiFonica International Inc Memo—"Software release 10:30 am PST—11:00am PST for Aug. 25, 2005. 1 message" From Samantha Edwards, To: everyone@digifonica.com, Wed., Aug. 24, 2005 at 4:02 PM, 8 pages.
Voip-Pal Ex. 2020, IPR2016-01201, "Next Generation Networks—A Migration Path Digifonica Voice Over IP Technologies. Technology Overview, Draft Jun. 3, 2005, Not for Distribution," by Clay S Perreault, CEO / CTO, Digifonica International Ltd, Gibraltar, 45 pages.
Voip-Pal Ex. 2021, IPR2016-01201, DF DigiFonica International Inc Memo—"Software roll out for supernodes.::Salm Rev 341, RBR Rev 341 added, 1 message" Fuad A. To: E. Björsell, Tue, May 31, 2005 at 1:13 PM, 1 page.

(56) References Cited

OTHER PUBLICATIONS

Voip-Pal Ex. 2022, IPR2016-01201, DF DigiFonica International Inc Memo—"Salm Rev 341, RBR Rev 341, 2 messages" Emil Björsell To: Fuad, et al., Tue, May 31, 2005 at 2:38 and 2:44 PM, 1 page.
Voip-Pal Ex. 2023, IPR2016-01201, DF DigiFonica International Inc Memo—"Software roll out for supernodes.::RBR Roll out Rev 353 added, 1 message" Fuad A. To: E. Björsell, Thu, Jun. 2, 2005 at 1:12 PM, 1 page.
Voip-Pal Ex. 2024, IPR2016-01201, DF DigiFonica International Inc Memo—"Software roll out for supernodes.::RBR Roll out Rev 358 added, 1 message" Fuad A. To: E. Björsell, Sun, Jun. 5, 2005 at 1:18 PM, 1 page.
Voip-Pal Ex. 2025, IPR2016-01201, DF DigiFonica International Inc Memo—"Software roll out for supernodes.::RBR Roll out Rev 361 updated, 1 message" Fuad A. To: E. Björsell, Mon., Jun. 6, 2005 at 9:26 AM, 1 page.
Voip-Pal Ex. 2026, IPR2016-01201, DF DigiFonica International Inc Memo—"RBR Roll out Rev 361, 1 message" David Terry To: Fuad, et al., Mon., Jun. 6, 2005 at 9:33 AM, 1 page.
Voip-Pal Ex. 2027, IPR2016-01201, DF DigiFonica International Inc Memo—"RBR Roll out Rev 361, 1 message" Emil Björsell To: Fuad, et al., Mon., Jun. 6, 2005 at 11:33 AM, 1 page.
Voip-Pal Ex. 2030, IPR2016-01201, DF DigiFonica International Inc Memo—"Software roll out for supernodes.::RBR Rev 541 updated, 1 message" Fuad A. To: E. Björsell, Thu, Aug. 4, 2005 at 11:57 AM, 1 page.
Voip-Pal Ex. 2031, IPR2016-01201, DF DigiFonica International Inc Memo—"RBR Rev 541, 1 message" David Terry To: Fuad, et al., Thu, Aug. 4, 2005 at 1:58 PM, 1 page.
Voip-Pal Ex. 2032, IPR2016-01201, DF DigiFonica International Inc Memo—"RBR Rev 541, 1 message" Emil Björsell To: Fuad, et al., Thu, Aug. 4, 2005 at 3:59 PM, 1 page.
Voip-Pal Ex. 2033, IPR2016-01201, DF DigiFonica International Inc Memo—"Software roll out for supernodes.::RBR Roll out Rev 554 added, 1 message" Fuad A. To: Emil Björsell, Mon, Aug. 8, 2005 at 10:55 AM, 1 page.
Voip-Pal Ex. 2034, IPR2016-01201, DF DigiFonica International Inc Memo—"RBR Roll out Rev 554, 2 messages" David Terry To: Fuad, et al., Mon, Aug. 8, 2005 at 11:48 AM and 12:00 PM, 1 page.
Voip-Pal Ex. 2035, IPR2016-01201, DF DigiFonica International Inc Memo—"RBR Roll out Rev 554, 1 message" Emil Björsell To: Fuad, et al., Mon, Aug. 8, 2005 at 12:09 PM, 1 page.
Voip-Pal Ex. 2036, IPR2016-01201, DF DigiFonica International Inc Memo—"Digifonica : RBR and Salma Deployment," Samantha Edwards To: everyone@digifonica.com, Mon, Aug. 8, 2005 at 4:12 PM, 4 pages.
Voip-Pal Ex. 2042, IPR2016-01201, DF DigiFonica International Inc Memo—"RBR Roll out Rev 693==>694, 1 message" Chris Huff To: Fuad, et al., Tue, Aug. 23, 2005 at 1:33 PM, 1 page.
Voip-Pal Ex. 2043, IPR2016-01201, "Deposition of Henry H. Houh, Ph.D., vol. I, Taken on Behalf of the Patent Owner," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Jan. 25, 2017, 128 pages.
Voip-Pal Ex. 2044, IPR2016-01201, "Deposition of Henry H. Houh, Ph.D., vol. II, Taken on Behalf of the Patent Owner," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Jan. 26, 2017, 158 pages.
Voip-Pal Ex. 2045, IPR2016-01201, Curriculum Vitae of William Henry Mangione-Smith, Ph.D., 23 pages.
Voip-Pal Ex. 2046, IPR2016-01201, U.S. Pat. No. 3,725,596, Issued Apr. 3, 1973, Rodney Robert Maxon et al., 18 pages.
Voip-Pal Ex. 2047, IPR2016-01201, "MERLIN® Communications System, Centrex/PBS Connection," Lucent Technologies, Bell Labs Innovations, © 1984 AT&T, 999-500-138 IS, Issue 1, Mar. 1985, 26 pages.

Voip-Pal Ex. 2048, IPR2016-01201, "Telephone Features," Quick Reference Guide, Definity, Rockefeller Group, Telecommunications Services, Inc., 2000, 2 pages.
Voip-Pal Ex. 2049, IPR2016-01201, Valdar, Andy, *Understanding Telecommunications Networks*, © 2006 The Institution of Engineering and Technology, London, UK, Title page, copyright page, pp. 38-39.
Voip-Pal Ex. 2050, IPR2016-01201, Horak, Ray, "Webster's New World® Telecom Dictionary," © 2008 by Wiley Publishing, Inc., Indianapolis, Indiana, Title page, copyright page, p. 133.
Patent Owner Response to Petition, *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Filed: Feb. 10, 2017, 78 pages.
Patent Owner Updated Exhibit List, *Apple Inc.*, Petitioner, v. *Voip.Pal.com, Inc.*, Patent Owner, Case No. IPR2016-01198, U.S. Pat. No. 9,179,005, United States Patent and Trademark Office, Before the Patent Trial and Appeal Board, Filed: Feb. 10, 2017, 6 pages.
Voip-Pal Ex. 2002, IPR2016-01198, "Declaration of Ryan Thomas in Support of Pro Hac Vice Motion," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Jan. 20, 2017, 4 pages.
Voip-Pal Ex. 2003, IPR2016-01198, "Technical Review of Digifonica VoIP System," Digifonica, Global Telephone Solutions, Author: John Rutter, Stuart Gare, Version V0,7 (Draft), Date: May 7, 2005, 35 pages.
Voip-Pal Ex. 2004, IPR2016-01198, Memo—"Subject: Smart 421 Contract signed and Faxed," From: Clay S. Perreault, Date: Jun. 6, 2005, 8:53 AM, To: Steve Nicholson, et al., 2 pages.
Voip-Pal Ex. 2005, IPR2016-01198, Memo—"Subject: Digifonica TEchnology review," From: Clay Perreault, Date: Jun. 6, 2005, 5:37 PM; To: John Rutter, et al., 5 pages.
Voip-Pal Ex. 2006, IPR2016-01198, Memo—"Subject: Re: Sample code for review Next document upload complete," From: Clay Perreault, Date: Jun. 15, 2005, 3:28 PM, To: John Rutter, et al., 3 pages.
Voip-Pal Ex. 2007, IPR2016-01198, DigiFonica International Inc Memo—"[Fwd: Digifonica Technical Review—draft report]," From Clay Perreault, To: Rod Thomson, et al., Tue, Jul. 5, 2005 at 4:45 PM, 2 pages.
Voip-Pal Ex. 2008, IPR2016-01198, John Rutter—"Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Jan. 31, 2017, 4 pages.
Voip-Pal Ex. 2009, IPR2016-01198, Stuart Gare—"Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Feb. 2, 2017, 4 pages.
Voip-Pal Ex. 2010, IPR2016-01198, Pentti Kalevi Huttunen— "Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Feb. 3, 2017, 4 pages.
Voip-Pal Ex. 2011, IPR2016-01198, Ryan Purita—"Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Jan. 31, 2017, 3 pages.
Voip-Pal Ex. 2012, IPR2016-01198, Johan Emil Viktor Björsell— "Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Feb. 9, 2017, 9 pages.

(56) References Cited

OTHER PUBLICATIONS

Voip-Pal Ex. 2013, IPR2016-01198, Clay Perreault—"Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Feb. 8, 2017, 6 pages.
Voip-Pal Ex. 2014, IPR2016-01198, RBR Source Code, Version 361, "call_e164.class.php RBR Version 361, Jun. 6, 2005 09:22:59," 45 pages.
Voip-Pal Ex. 2015, IPR2016-01198, RBR Source Code Log for Trunk Directory, "r1879 | cdelalande | Oct. 31, 2006 17:07:46—0800 (Tue, Oct. 31, 2006) | 3 lines," 56 pages.
Voip-Pal Ex. 2016, IPR2016-01198, William Henry Mangione-Smith—"Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Feb. 10, 2017, 96 pages.
Voip-Pal Ex. 2017, IPR2016-01198, DF DigiFonica International Inc Memo—"notes from your presentation, 1 message" From Konstantin Kropivny, To: Emil Björsell, Tue, Jun. 14, 2005 at 7:33PM, 4 pages.
Voip-Pal Ex. 2018, IPR2016-01198, David Terry—"Declaration in Support Patent Owner Response to Inter Partes Petition," *Apple Inc.*, Petitioner, v. *Voip-Pal.com, Inc.*, Patent Owner, Case No. IPR2016-01198, U.S. Pat. No. 9,179,005, United States Patent and Trademark Office, Before the Patent Trial and Appeal Board, Dated: Feb. 8, 2017, 5 pages.
Voip-Pal Ex. 2019, IPR2016-01198, DF DigiFonica International Inc Memo—"Software release 10:30 am PST—11:00am PST for Aug. 25, 2005. 1 message" From Samantha Edwards, To: everyone@digifonica.com, Wed., Aug. 24, 2005 at 4:02 PM, 8 pages.
Voip-Pal Ex. 2020, IPR2016-01198, "Next Generation Networks—A Migration Path Digifonica Voice Over IP Technologies. Technology Overview, Draft Jun. 3, 2005, Not for Distribution," by Clay S Perreault, CEO / CTO, Digifonica International Ltd, Gibraltar, 45 pages.
Voip-Pal Ex. 2021, IPR2016-01198, DF DigiFonica International Inc Memo—"Software roll out for supernodes.::Salm Rev 341, RBR Rev 341 added, 1 message" Fuad A. To: E. Björsell, Tue, May 31, 2005 at 1:13 PM, 1 page.
Voip-Pal Ex. 2022, IPR2016-01198, DF DigiFonica International Inc Memo—"Salm Rev 341, RBR Rev 341, 2 messages" Emil Björsell to: Fuad, et al., Tue, May 31, 2005 at 2:38 and 2:44 PM, 1 page.
Voip-Pal Ex. 2023, IPR2016-01198, DF DigiFonica International Inc Memo—"Software roll out for supernodes.::RBR Roll out Rev 353 added, 1 message" Fuad A. To: E. Björsell, Thu, Jun. 2, 2005 at 1:12 PM, 1 page.
Voip-Pal Ex. 2024, IPR2016-01198, DF DigiFonica International Inc Memo—"Software roll out for supernodes.::RBR Roll out Rev 358 added, 1 message" Fuad A. To: E. Björsell,. Sun, Jun. 5, 2005 at 1:18 PM, 1 page.
Voip-Pal Ex. 2025, IPR2016-01198, DF DigiFonica International Inc Memo—"Software roll out for supernodes.::RBR Roll out Rev 361 updated, 1 message" Fuad A. To: E. Björsell, Mon., Jun. 6, 2005 at 9:26 AM, 1 page.
Voip-Pal Ex. 2026, IPR2016-01198, DF DigiFonica International Inc Memo—"RBR Roll out Rev 361, 1 message" David Terry To: Fuad, et al., Mon., Jun. 6, 2005 at 9:33 AM, 1 page.
Voip-Pal Ex. 2027, IPR2016-01198, DF DigiFonica International Inc Memo—"RBR Roll out Rev 361, 1 message" Emil Björsell to: Fuad, et al., Mon., Jun. 6, 2005 at 11:33 AM, 1 page.
Voip-Pal Ex. 2030, IPR2016-01198, DF DigiFonica International Inc Memo—"Software roll out for supernodes.::RBR Rev 541 updated, 1 message" Fuad A. To: E. Björsell, Thu, Aug. 4, 2005 at 11:57 AM, 1 page.

Voip-Pal Ex. 2031, IPR2016-01198, DF DigiFonica International Inc Memo—"RBR Rev 541, 1 message" David Terry To: Fuad, et al., Thu, Aug. 4, 2005 at 1:58 PM, 1 page.
Voip-Pal Ex. 2032, IPR2016-01198, DF DigiFonica International Inc Memo—"RBR Rev 541, 1 message" Emil Björsell to: Fuad, et al., Thu, Aug. 4, 2005 at 3:59 PM, 1 page.
Voip-Pal Ex. 2033, IPR2016-01198, DF DigiFonica International Inc Memo—"Software roll out for supernodes.::RBR Roll out Rev 554 added, 1 message" Fuad A. To: Emil Björsell, Mon, Aug. 8, 2005 at 10:55 AM, 1 page.
Voip-Pal Ex. 2034, IPR2016-01198, DF DigiFonica International Inc Memo—"RBR Roll out Rev 554, 2 messages" David Terry To: Fuad, et al., Mon, Aug. 8, 2005 at 11:48 AM and 12:00 PM, 1 page.
Voip-Pal Ex. 2035, IPR2016-01198, DF DigiFonica International Inc Memo—"RBR Roll out Rev 554, 1 message" Emil Björsell to: Fuad, et al., Mon, Aug. 8, 2005 at 12:09 PM, 1 page.
Voip-Pal Ex. 2036, IPR2016-01198, DF DigiFonica International Inc Memo—"Digifonica : RBR and Salma Deployment," Samantha Edwards To: everyone@digifonica.com, Mon, Aug. 8, 2005 at 4:12 PM, 4 pages.
Voip-Pal Ex. 2042, IPR2016-01198, DF DigiFonica International Inc Memo—"RBR Roll out Rev 693==>694, 1 message" Chris Huff To: Fuad, et al., Tue, Aug. 23, 2005 at 1:33 PM, 1 page.
Voip-Pal Ex. 2043, IPR2016-01198, "Deposition of Henry H. Houh, Ph.D., vol. I, Taken on Behalf of the Patent Owner," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Jan. 25, 2017, 128 pages.
Voip-Pal Ex. 2044, IPR2016-01198, "Deposition of Henry H. Hour, Ph.D., vol. II, Taken on Behalf of the Patent Owner," *Apple Inc.*, Petitioner, v. *Voip-Pal.com, Inc.*, Patent Owner, Case No. IPR2016-01201, U.S. Pat. No. 8,542,815, United States Patent and Trademark Office, Before the Patent Trial and Appeal Board, Dated: Jan. 26, 2017, 158 pages.
Voip-Pal Ex. 2045, IPR2016-01198, Curriculum Vitae of William Henry Mangione-Smith, Ph.D., 23 pages.
Voip-Pal Ex. 2046, IPR2016-01198, U.S. Pat. No. 3,725,596, Issued Apr. 3, 1973, Rodney Robert Maxon et al., 18 pages.
Voip-Pal Ex. 2047, IPR2016-01198, "MERLIN® Communications System, Centrex/PBS Connection," Lucent Technologies, Bell Labs Innovations, © 1984 AT&T, 999-500-138 IS, Issue 1, Mar. 1985, 26 pages.
Voip-Pal Ex. 2048, IPR2016-01198, "Telephone Features," Quick Reference Guide, Definity, Rockefeller Group, Telecommunications Services, Inc., 2000, 2 pages.
Voip-Pal Ex. 2049, IPR2016-01198, Valdar, Andy, *Understanding Telecommunications Networks*,© 2006 The Institution of Engineering and Technology, London, UK, Title page, copyright page, pp. 38-39.
Voip-Pal Ex. 2050, IPR2016-01198, Horak, Ray, "Webster's New World® Telecom Dictionary," © 2008 by Wiley Publishing, Inc., Indianapolis, Indiana, Title page, copyright page, p. 133.
Canadian Office Action dated May 29, 2017 for Candian Patent Application No. CA 2,668,025.
Canadian Office Action dated Jun. 9, 2017 for Candian Patent Application No. CA 2,916,217.
European Examination Report dated May 12, 2017 for European Patent Application No. EP 09-802-316.1.
Document Title: United States Patent and Trademark Office; Before the Patent Trial and Appeal Board; *Apple Inc.*, Petitioner v. *Voip-Pal.com Inc.*, Patent Owner; Case No. IPR2017-01399-815; U.S. Pat. No. 8,542,815; Petition for Inter Partes Review of U.S. Pat. No. 8,542,815; Dated May 9, 2017, 63 pages.
Petitioner Apple Inc. Exhibit 1003, Case No, IPR2017-01399-815; U.S. Pat. No. 8,542,815: U.S. Pat. No. 7,486,684 to Chu, et al., 59 pages.
Petitioner Apple Inc. Exhibit 1004, Case No. IPR2017-01399-815; U.S. Pat. No. 8,542,815: U.S. Pat. No. 6,760,324 to Scott, et al., 65 pages.
Petitioner Apple Inc. Exhibit 1005, Case No. IPR2017-01399-815; U.S. Pat. No. 8,542,815: Declaration of Henry H. Hough, PhD, 45 pages.

(56) References Cited

OTHER PUBLICATIONS

Petitioner Apple Inc. Exhibit 1006, Case No. IPR2017-01399-815; U.S. Pat. No. 8,542,815: U.S. Publication No. 2002/0122547 to Hinchey et al., 21 pages.
Document Title: United States Patent and Trademark Office; Before the Patent Trial and Appeal Board; *Apple Inc.*, Petitioner v. *Patent of Voip-Pal.com Inc.*, Patent Owner; Case No. IPR2017-01398-005; U.S. Pat. No. 9,179,005; Petition for Inter Partes Review of U.S. Pat. No. 9,179,005; Dated May 9, 2017. 54 pages.
Petitioner Apple Inc. Exhibit 1006, Case No. IPR2017-01398-005; U.S. Pat. No. 9,179,005: U.S. Pat. No. 7,486,684 to Chu, et al., 59 pages.
Petitioner Apple Inc. Exhibit 1007, Case 'No. IPR2017-01398-005; U.S. Pat. No. 9,179,005: U.S. Pat. No. 6,760,324 to Scott, et al., 65 pages.
Petitioner Apple Inc. Exhibit 1008, Case No. IPR2017-01398-005; U.S. Pat. No. 9,179,005: Declaration of Henry H. Hough, PhD, 41 pages.
Petitioner Apple Inc. Exhibit 1009, Case No. IPR2017-01398-005; U.S. Pat. No. 9,179,005: U.S. Publication No. 2002/0122547 to Hinchey et al., 21 pages.
Document Title: In the United States Patent and Trademark Office; Before the Patent Trial and Appeal Board; *AT&T Services, Inc.*, Petitioner v. *Digifonica (International)* Limited Patent Owner, Case No. IPR2017-01382; U.S. Pat. No. 8,542,815; Petition for Inter Partes Review of U.S. Pat. No. 8,542,815; Dated May 8, 2017, 84 pages.
Petitioner AT&T Services, Inc. Exhibit 1003, United States Patent and Trademark Office; Before the Patent Trial and Appeal Board; *AT&T Services, Inc.*, Petitioner v. *Digifonica (International)* Limited Patent Owner, U.S. Pat. No. 8,542,815, Inter Partes Review No. IPR2017-01382; Declaration of James Bress in Support of Petition for Inter Partes Review of U.S. Pat. No. 8,542,815; with Appendices a through II, 2113 pages.
Petitioner AT&T Services, Inc. Exhibit 1003, Case No. IPR2017-01382; Appendix A, James R. Bress, Curriculum Vitae, 26 pages.
Petitioner AT&T Services, Inc. Exhibit 1003, Case No. IPR2017-01382; Appendix B, Chapter 5, Telecommunications Essentials, Lillian Goleniewski, © 2002, 40 pages.
Petitioner AT&T Services, Inc. Exhibit 1003, Case No. IPR2017-01382; Appendix C, Chapter 11, Telecommunications Essentials, Lillian Goleniewski, © 2002, 41 pages.
Petitioner AT&T Services, Inc. Exhibit 1003, Case No. IPR2017-01382; Appendix D, ITU-T Recommendation E.164 (May 1997), 27 pages.
Petitioner AT&T Services, Inc. Exhibit 1003, Case No. IPR2017-01382; Appendix E, Telcordia Notes on the Networks, SR-2275, Issue 4, Oct. 2000, pp. 3-8-3-14, 9 pages.
Petitioner AT&T Services, Inc. Exhibit 1003, Case No. IPR2017-01382; Appendix F, Chapter 4, Telecommunications Essentials, Lillian Goleniewski, © 2002, pp. 99-100, 4 pages.
Petitioner AT&T Services, Inc. Exhibit 1003, Case No. IPR2017-01382; Appendix G, Telcordia Notes on the Networks, SR-2275, Issue 4, Oct. 2000, pp. 18-1-18-20, 22 pages.
Petitioner AT&T Services, Inc. Exhibit 1003, Case No. IPR2017-01382; Appendix H, Softswitch, Architecture for VoIP, Franklin D. Ohrtman, Jr., © 2003, Chapter 2, 32 pages.
Petitioner AT&T Services, Inc. Exhibit 1003, Case No. IPR2017-01382; Appendix I, Telecommunications Act of 1996, 104th Congress of the U.S.A., Jan. 1996, 128 pages.
Petitioner AT&T Services, Inc. Exhibit 1003, Case No. IPR2017-01382; Appendix J, Perspectives on the AIN Architecture, Berman et al., IEEE Communications Magazine, Feb. 1992, 6 pages.
Petitioner AT&T Services, Inc. Exhibit 1003, Case No. IPR2017-01382; Appendix K, U.S. Pat. No. 7,907,714 B2, to Baniak et al., 21 pages.
Petitioner AT&T Services, Inc. Exhibit 1003, Case No. IPR2017-01382; Appendix L, The IMS, Poikselka & Mayer, © 2009, John Wiley & Sons Ltd, Chapter 1 Introduction, 14 pages.
Petitioner AT&T Services, Inc. Exhibit 1003, Case No. IPR2017-01382; Appendix M, The IMS, Poikselkä & Mayer, @ 2009, John Wiley & Sons Ltd, pp. 24-25 and 86-94, 13 pages.
Petitioner AT&T Services, Inc. Exhibit 1003, Case No. IPR2017-01382; Appendix N, Chapter 9, Telecommunications Essentials, Lillian Goleniewski, © 2002, 42 pages.
Petitioner AT&T Services, Inc. Exhibit 1003, Case No. IPR2017-01382; Appendix O, Softswitch, Architecture for VoIP, Franklin D. Ohrtman, Jr., © 2003, pp. 238-239, 4 pages.
Petitioner AT&T Services, Inc. Exhibit 1003, Case No. IPR2017-01382; Appendix P, Softswitch, Architecture for VoIP, Franklin D. Ohrtman, Jr., © 2003, Chapter 4, pp. 67-86, 22 pages.
Petitioner AT&T Services, Inc. Exhibit 1003, Case No. IPR2017-01382; Appendix Q, Softswitch, Architecture for VoIP, Franklin D. Ohrtman, Jr., © 2003, Chapter 5, pp. 87-112, 28 pages.
Petitioner AT&T Services, Inc. Exhibit 1003, Case No. IPR2017-01382; Appendix R, Telecommunications Essentials, Lillian Goleniewski, © 2002, p. 221, 3 pages.
Petitioner AT&T Services, Inc. Exhibit 1003, Case No. IPR2017-01382; Appendix S, Network Working Group, RFC (Request for Comments): 1122, Internet Engineering Task Force, R. Braden, Ed., Oct. 1989, pp. 18-25, 9 pages.
Petitioner AT&T Services, Inc. Exhibit 1003, Case No. IPR2017-01382; Appendix T, RFC (Request for Comments): 791, Internet Protocol, DARPA Internet Program, Protocol Specification, Sep. 1981., by Information Sciences Institute, USC, 50 pages.
Petitioner AT&T Services, Inc. Exhibit 1003, Case No. IPR2017-01382; Appendix U, Network Working Group, RFC (Request for Comments): 1034, P. Mockapetris, ISI, Nov. 1987, pp. 1-55, 55 pages.
Petitioner AT&T Services, Inc. Exhibit 1003, Case No, IPR2017-01382; Appendix V, Network Working Group, RFC (Request for Comments): 1035, P. Mockapetris, ISI, Nov. 1987, pp. 1-55, 55 pages.
Petitioner AT&T Services, Inc. Exhibit 1003, Case No. IPR2017-01382; Appendix W, Network Working Group, RFC (Request for Comments): 3761, P. Faltstrom et al., Apr. 2004, pp. 1-18, 18 pages.
Petitioner AT&T Services, Inc. Exhibit 1003, Case No. IPR2017-01382; Appendix X, U.S. Pat. No. 6,594,254 B1, to Kelly, 18 pages.
Petitioner AT&T Services, Inc. Exhibit 1003, Case No. IPR2017-01382; Appendix Y, ITU-T Recommendation H.323 (Jul. 2003), 298 pages.
Petitioner AT&T Services, Inc. Exhibit 1003, Case No. IPR2017-01382; Appendix Z, Telcordia Notes on the Networks, SR-2275, Issue 4, Oct. 2000, pp. 6-306-6-309, 4 pages.
Petitioner AT&T Services, Inc. Exhibit 1003, Case No. IPR2017-01382; Appendix AA, Telcordia Notes on the Networks, SR-2275, Issue 4, Oct. 2000, pp. 14-10-14-13, 6 pages.
Petitioner AT&T Services, Inc. Exhibit 1003, Case No. IPR2017-01382; Appendix BB, The Internet Engineering Task Force (IETF®), May 5, 2017, 2 pages.
Petitioner AT&T Services, Inc. Exhibit 1003, Case No. IPR2017-01382; Appendix CC, Network Working Group, RFC (Request for Comments): 3261, J. Rosenberg et al., Jun. 2002, 269 pages.
Petitioner AT&T Services, Inc. Exhibit 1003, Case No. IPR2017-01382; Appendix DD, Network Working Group, RFC (Request for Comments): 3666, A. Johnston et al., Dec. 2003, 118 pages.
Petitioner AT&T Services, Inc. Exhibit 1003, Case No. IPR2017-01382; Appendix EE, Network Working Group, RFC (Request for Comments): 3665, A. Johnston et al., Dec. 2003, 94 pages.
Petitioner AT&T Services, Inc. Exhibit 1003, Case No. IPR2017-01382; Appendix FF, Network Working Group, RFC (Request for Comments): 2327, M. Handley et al., Apr. 1998, 42 pages.
Petitioner AT&T Services, Inc. Exhibit 1003, Case No. IPR2017-01382; Appendix GG, ITU-T Recommendation Q.931 (May 1998), 345 pages.
Petitioner AT&T Services, Inc. Exhibit 1003, Case No. IPR2017-01382; Appendix HH, Telcordia Notes on the Networks, SR-2275, Issue 4, Oct. 2000, pp. 14-76-14-77, 4 pages.
Petitioner AT&T Services, Inc. Exhibit 1003, Case No. IPR2017-01382; Appendix II, Telcordia Notes on the Networks, SR-2275, Issue 4, Oct. 2000, p. 10-7, 3 pages.

(56) References Cited

OTHER PUBLICATIONS

Petitioner AT&T Services, Inc. Exhibit 1004, Case No. IPR2017-01382; James R. Bress, Curriculum Vitae, 26 pages.
Petitioner AT&T Services, Inc. Exhibit 1005, Case No. IPR2017-01382; U.S. Pat. No. 6,240,449, Issued May 29, 2001 to Raymond Nadeau, 13 pages.
Petitioner AT&T Services, Inc. Exhibit 1006, Case No. IPR2017-01382; U.S. Pat. No. 6,594,254 B1, Issued Jul. 15, 2003 to Keith C. Kelly, 18 pages.
Petitioner AT&T Services, Inc. Exhibit 1007, Case No. IPR2017-01382; U.S. Pat. No. 7,715,413 B2, Issued May 11, 2010, to Vaziri et al., 53 pages.
Petitioner AT&T Services, Inc. Exhibit 1008, Case No. IPR2017-01382; Decision, Institution of Inter Partes Review, 37 C.F.R. § 42.108, Paper 6, Entered Nov. 21, 2016, United States Patent and Trademark Office, Before the Patent Trial and Appeal Board, *Apple Inc.*, Petitioner, v. *Voip-Pal.com Inc.*, Patent Owner, Case IPR2016-01201, U.S. Pat. No. 8,542,815 B2, Before Barbara A. Benoit, Lynne E. Pettigrew, and Stacy B. Margolies, *Administrative Patent Judges*, 33 pages.
Petitioner AT&T Services, Inc. Exhibit 1009, Case No. IPR2017-01382; p. 221 and Chapter 11, Telecommunications Essentials, Lillian Goleniewski, © 2002, 44 pages.
Petitioner AT&T Services, Inc. Exhibit 1010, Case No. IPR2017-01382; RFC (Request for Comments): 791, Internet Protocol, DARPA Internet Program, Protocol Specification, Sep. 1981, by Information Sciences Institute, USC, 50 pages.
Petitioner AT&T Services, Inc. Exhibit 1011, Case No. IPR2017-01382; ITU-T Recommendation H.323 (Jul. 2003), 298 pages.
Petitioner AT&T Services, Inc. Exhibit 1012, Case No. IPR2017-01382; Telcordia Notes on the Networks, SR-2275, Issue 4, Oct. 2000, p. 10-7, 3 pages.
Document Title: In the United States Patent and Trademark Office; Before the Patent Trial and Appeal Board; *AT&T Services, Inc.*, Petitioner v. *Digifonica (International)* Limited Patent Owner, Case No. IPR2017-01383; U.S. Pat. No. 9,179,005; Petition for Inter Partes Review of U.S. Pat. No. 9,179,005; Dated May 8, 2017, 92 pages.
Petitioner AT&T Services, Inc. Exhibit 1003, United States Patent and Trademark Office; Before the Patent Trial and Appeal Board; *AT&T Services, Inc.*, Petitioner v. *Digifonica (International)* Limited Patent Owner, U.S. Pat. No. 9,179,005, Inter Partes Review No. IPR2017-01383; Declaration of James Bress in Support of Petition for Inter Partes Review of U.S. Pat. No. 9,179,005; with Appendices A through II, 2094 pages. Appendices A through II are identical to those previously listed hereinabove as cite Nos. 25-59.
Petitioner AT&T Services, Inc. Exhibit 1004, Case No. IPR2017-01383; James R. Bress, Curriculum Vitae, 26 pages.
Petitioner AT&T Services, Inc. Exhibit 1005, Case No. IPR2017-01383; U.S. Pat. No. 6,240,449, Issued May 29, 2001 to Raymond Nadeau, 13 pages.
Petitioner AT&T Services, Inc. Exhibit 1006, Case No. IPR2017-01383; U.S. Publication No. 2004/0218748 A1, Published Nov. 4, 2004, by Stephen Fisher, 18 pages.
Petitioner AT&T Services, Inc. Exhibit 1007, Case No. IPR2017-01383; U.S. Pat. No. 6,594,254 B1, Issued Jul. 15, 2003, to Keith C. Kelly, 18 pages.
Petitioner AT&T Services, inc. Exhibit 1008, Case No. IPR2017-01383; U.S. Pat. No. 6,674,850 B2, Issued Jan. 6, 2004, to Vu et al., 10 pages.
Petitioner AT&T Services, Inc. Exhibit 1009, Case No. IPR2017-01383; Decision, Institution of Inter Partes Review, 37 C.F.R. § 42.108, Paper 6, Entered Nov. 21, 2016, United States Patent and Trademark Office, Before the Patent Trial and Appeal Board, *Apple Inc.*, Petitioner, v. *Voip-Pal.com Inc.*, Patent Owner, Case IPR2016-01198, Patent 9,179,005 B2, Before Barbara A. Benoit, Lynne E. Pettigrew, and Stacy B. Margolies, *Administrative Patent Judges*, 32 pages.
Petitioner AT&T Services, Inc. Exhibit 1010, Case No. IPR2017-01383; Patent Owner Response to Petition, Filed Feb. 10, 2017, United States Patent and Trademark Office, Before the Patent Trial and Appeal Board, *Apple Inc.*, Petitioner, v. *Voip-Pal.com, Inc.*, Patent Owner, Case IPR2016-01198, U.S. Pat. No. 9,179,005 B2, 78 pages.
Document Title: In the United States Patent and Trademark Office; Before the Patent Trial and Appeal Board; *AT&T Services, Inc.*, Petitioner v. *Digifonica (International)* Limited Patent Owner, Case No. IPR2017-01384; U.S. Pat. No. 9,179,005; Petition for Inter Partes Review of U.S. Pat. No. 9,179,005; Dated May 7, 2017, 70 pages.
Petitioner AT&T Services, Inc. Exhibit 1003, United States Patent and Trademark Office; Before the Patent Trial and Appeal Board; *AT&T Services, Inc.*, Petitioner v. *Digifonica (International)* Limited Patent Owner, U.S. Pat. No. 9,179,005, Inter Partes Review No. IPR2017-01384; Declaration of James Bress in Support of Petition for Inter Partes Review of U.S. Pat. No. 9,179,005; with Appendices A through II, 2085 pages. Appendices A through II are identical to those previously listed hereinabove as cite Nos. 25-59.
Petitioner AT&T Services, Inc. Exhibit 1004, Case No. IPR2017-01384; James R. Bress, Curriculum Vitae, 26 pages.
Petitioner AT&T Services, Inc. Exhibit 1005, Case No. IPR2017-01384; U.S. Pat. No. 6,240,449, Issued May 29, 2001 to Raymond Nadeau, 13 pages.
Petitioner AT&T Services, Inc. Exhibit 1006, Case No. IPR2017-01384; U.S. Pat. No. 6,594,254 B1, Issued Jul. 15, 2003, to Keith C. Kelly, 18 pages.
Petitioner AT&T Services, Inc. Exhibit 1007, Case No. IPR2017-01384; U.S. Pat. No. 7,715,413 B2, Issued May 11, 2010, to Vaziri et al., 53 pages.
Petitioner AT&T Services, Inc. Exhibit 1008, Case No. IPR2017-01384; Decision, Institution of Inter Partes Review, 37 C.F.R. § 42.108, Paper 6, Entered Nov. 21, 2016, United States Patent and Trademark Office, Before the Patent Trial and Appeal Board, *Apple Inc.*, Petitioner, v. *Voip-Pal.com Inc.*, Patent Owner, Case IPR2016-01198, U.S. Pat. No. 9,179,005 B2, Before Barbara A. Benoit, Lynne E. Pettigrew, and Stacy B. Margolies, *Administrative Patent Judges*, 32 pages.
Petitioner AT&T Services, Inc. Exhibit 1009, Case No. IPR2017-01384; p. 221 and Chapter 11, Telecommunications Essentials, Lillian Goleniewski, © 2002, 44 pages.
Petitioner AT&T Services, Inc. Exhibit 1010, Case No. IPR2017-01384; RFC (Request for Comments): 791, Internet Protocol, DARPA Internet Program, Protocol Specification, Sep. 1981, by Information Sciences Institute, USC, 50 pages.
Petitioner AT&T Services, Inc. Exhibit 1011, Case No. IPR2017-01384; ITU-T Recommendation H.323 (Jul. 2003), 298 pages.
Petitioner AT&T Services, Inc. Exhibit 1012, Case No. 1PR2017-01384; Telcordia Notes on the Networks, SR-2275, Issue 4, Oct. 2000, p. 10-7, 3 pages.
Document Title; United States Patent and Trademark Office; Before the Patent Trial and Appeal Board; *Apple Inc.*, Petitioner v. *Voip-Pal.com Inc.*, Patent Owner; Case No. IPR2016-01201; U.S. Pat. No. 8,542,815; Petitioner's Reply to Patent Owner's Response, Dated May 17, 2017, 34 pages.
Petitioner Apple Inc. Exhibit 1007, United States Patent and Trademark Office; Before the Patent Trial and Appeal Board; *Apple Inc.*, Petitioner v. *Voip-Pal.com, Inc.*, Patent Owner; Case No. IPR2016-01201; U.S. Pat. No. 8,542,815; Discovery Deposition of William Henry Mangione-Smith, taken on Apr. 19, 2017 in Case No. IPR2016-01198; U.S. Pat. No. 9,179,005, 213 pages.
Petitioner Apple Inc. Exhibit 1008, United States Patent and Trademark Office; Before the Patent Trial and Appeal Board; *Apple Inc.*, Petitioner v. *Voip-Pal.com, Inc.*, Patent Owner; Case No. IPR2016-01201; U.S. Pat. No. 8,542,815; Discovery Deposition of John Rutter, taken (by phone) on Apr. 5, 2017 in Case No. IPR2016-01198; U.S. Pat. No. 9,179,005, 43 pages.
Petitioner Apple Inc. Exhibit 1009, United States Patent and Trademark Office; Before the Patent Trial and Appeal Board; *Apple Inc.*, Petitioner v. *Voip-Pal.com, Inc.*, Patent Owner; Case No. IPR2016-01201; U.S. Pat. No. 8,542,815; Discovery DepoSition of David Terry, taken on Mar. 24, 2017 in Case No. IPR2016-01198; U.S. Pat. No. 9,179,005, 95 pages.

(56) References Cited

OTHER PUBLICATIONS

Petitioner Apple Inc. Exhibit 1010, United States Patent and Trademark Office; Before the Patent Trial and Appeal Board; *Apple Inc.,* Petitioner v. *Voip-Pal.com, Inc.,* Patent Owner; Case No. IPR2016-01201; U.S. Pat. No. 8,542,815; Discovery Deposition of Clay Perreault, taken on Apr. 12, 2017 in Case No. IPR2016-01198; U.S. Pat. No. 9,179,005, 118 pages.
Petitioner Apple Inc. Exhibit 1011, United States Patent and Trademark Office; Before the Patent Trial and Appeal Board; *Apple Inc.,* Petitioner v. *Voip-Pal.com, Inc.,* Patent Owner; Case No. IPR2016-01201; U.S. Pat. No. 8,542,815; Complaint for Patent Infringement [Jury Demand], United States District Court, District of Nevada, Case No. 2:16-CV-00260, *Voip-Pal.com, Inc., a Nevada corporation,* Plaintiff, v. *Apple, Inc., a California corporation,* Defendants, filed Feb. 9, 2016, 8 pages.
Petitioner Apple Inc. Exhibit 1012, United States Patent and Trademark Office; Before the Patent Trial and Appeal Board; *Apple Inc.,* Petitioner v. *Voip-Pal.com, Inc.,* Patent Owner; Case No. IPR2016-01201; U.S. Pat. No. 8,542,815; Discovery Deposition of Johan Emil Viktor Björsell, taken on Mar. 24, 2017 in Case No. IPR2016-01198; U.S. Pat. No. 9,179,005, 204 pages.
Petitioner Apple Inc. Exhibit 1013, United States Patent and Trademark Office; Before the Patent Trial and Appeal Board; *Apple Inc.,* Petitioner v. *Voip-Pal.com, Inc.,* Patent Owner; Case No. IPR2016-01201; U.S. Pat. No. 8,542,815; Letter dated Apr. 21, 2017 to Adam P. Seitz et al., ERISE IP, P.A., re: IPR2016-01198 & IPR1026-01201, "Pursuant to the Board Order of Apr. 19, 2017 (Paper 28) . . . " from Kerry Taylor, Knobbe, Martens, Olson & Bear, LLP, 1 page.
Petitioner Apple Inc. Exhibit 1014, United States Patent and Trademark Office; Before the Patent Trial and Appeal Board; *Apple Inc.,* Petitioner v. *Voip-Pal.com, Inc.,* Patent Owner; Case No. IPR2016-01201; U.S. Pat. No. 8,542,815; Email dated May 1, 2017 to Adam P. Seitz et al., ERISE IP, P.A., re: IPR2016-01198 & IPR1026-01201—Fuad Arafa, from Kerry Taylor, Knobbe, Martens, Olson & Bear, LLP, 2 pages.
Document Title: United States Patent and Trademark Office; Before the Patent Trial and Appeal Board; *Apple Inc.,* Petitioner v. *Voip-Pal.com Inc.,* Patent Owner; Case No. IPR2016-01198; U.S. Pat. No. 9,179,005; Petitioner's Reply to Patent Owner's Response, Paper 34, Dated May 17, 2017, 33 pages.
Petitioner Apple Inc. Exhibit 1010, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Discovery Deposition of William Henry Mangione-Smith, taken on Apr. 19, 2017 in Case No. IPR2016-01198; U.S. Pat. No. 9,179,005, 213 pages.
Petitioner Apple Inc. Exhibit 1011, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Discovery Deposition of John Rutter, taken (by phone) on Apr. 5, 2017 in Case No. IPR2016-01198; U.S. Pat. No. 9,179,005, 43 pages.
Petitioner Apple Inc. Exhibit 1012, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Discovery Deposition of David Terry, taken on Mar. 24, 2017 in Case No. IPR2016-01198; U.S. Pat. No. 9,179,005, 95 pages.
Petitioner Apple Inc. Exhibit 1013, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Discovery Deposition of Clay Perreault, taken on Apr. 12, 2017 in Case No. IPR2016-01198; U.S. Pat. No. 9,179,005, 118 pages.
Petitioner Apple Inc. Exhibit 1014, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Complaint for Patent Infringement [Jury Demand], United States District Court, District of Nevada, Case No. 2:16-CV-00260, *Voip-Pal.Com, Inc., a Nevada corporation,* Plaintiff, v. *Apple, Inc., a California corporation,* Defendants, filed Feb. 9, 2016, 8 pages.
Petitioner Apple Inc, Exhibit 1015, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Discovery Deposition of Johan Emil Viktor Björsell, taken on Mar. 24, 2017 in Case No. IPR2016-01198; U.S. Pat. No. 9,179,005, 204 pages.
Petitioner Apple Inc. Exhibit 1016, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Letter dated Apr. 21, 2017 to Adam P. Seitz et al., ERISE IP, P.A., re: IPR2016-01198 & IPR1026-01201, "Pursuant to the Board Order of Apr. 19, 2017 (Paper 28) . . . " from Kerry Taylor, Knobbe, Martens, Olson & Bear, LLP, 1 page.
Petitioner Apple Inc. Exhibit 1017, United States Patent and Trademark Office; Before the Patent Trial and Appeal Board; *Apple Inc.,* Petitioner v. *Voip-Pal.com, Inc.,* Patent Owner; Case No. IPR2016-01198; U.S. Pat. No. 9,179,005; Email dated May 1, 2017 to Adam P. Seitz et al., ERISE IP, P.A., re: IPR2016-01198 & IPR1026-01201—Fuad Arafa, from Kerry Taylor, Knobbe, Martens, Olson & Bear, LLP, 2 pages.
Document Title: United States Patent and Trademark Office; Before the Patent Trial and Appeal Board; *Apple Inc.,* Petitioner v. *Voip-Pal.com.Inc.,* Patent Owner, Case No. IPR2016-01201, U.S. Pat. No. 8,542,815; Patent Owner Objections to Apple Evidence Served With Petitioner's Reply, Filed on behalf of Patent Owner Voip-Pal.com Inc., Filed: May 24, 2017, 6 pages.
Document Title: United States Patent and Trademark Office; Before the Patent Trial and Appeal Board; *Apple Inc.,* Petitioner v. *Voip-Pal.com.Inc.,* Patent Owner, Case No, IPR2016-01198, U.S. Pat. No. 9,179,005; Patent Owner Objections to Apple Evidence Served With Petitioner's Reply, Filed on behalf of Patent Owner Voip-Pal.com Inc., Filed: May 24, 2017, 6 pages.
Petitioner's Request for Oral Argument, United States Patent and Trademark Office, Before the Patent Trial and Appeal Board, *Apple Inc.,* Petitioner v. *Voip-Pal.com, Inc.,* Patent Owner, Case No. IPR2016-01201, U.S. Pat. No. 8,542,815, dated Jun. 14, 2017, 4 pages.
Patent Owner Sur-Reply in Response to Petitioner's Reply, United States Patent and Trademark Office, Before the Patent Trial and Appeal Board, *Apple Inc.,* Petitioner v. *Voip-Pal.com, Inc.,* Patent Owner, Case No. IPR2016-01201, U.S. Pat. No. 8,542,815, dated Jun. 14, 2017, 8 pages.
Patent Owner Request for Oral Argument, United States Patent and Trademark Office, Before the Patent Trial and Appeal Board, *Apple Inc.,* Petitioner v. *Voip-Pal.com, Inc.,* Patent Owner, Case No. IPR2016-01201, U.S. Pat. No. 8,542,815, dated Jun. 14, 2017, 4 pages.
Patent Owner Motion to Exclude, United States Patent and Trademark Office, Before the Patent Trial and Appeal Board, *Apple Inc.,* Petitioner v. *Voip-Pal.com, Inc.,* Patent Owner, Case No. IPR2016-01201, U.S. Pat. No. 8,542,815, dated Jun. 14, 2017, 18 pages.
Voip-Pal Ex. 2052, IPR2016-01201, *Apple Inc.* vs. *Voip-Pal.com, Inc.,* Reporter's Transcript of Telephonic Hearing, Jun. 7, 2017, 16 sheets.
Petitioner's Request for Oral Argument, United States Patent and Trademark Office, Before the Patent Trial and Appeal Board, *Apple Inc.,* Petitioner v. *Voip-Pal.com, Inc.,* Patent Owner, Case No. IPR2016-01198, U.S. Pat. No. 9,179,005, dated Jun. 14, 2017, 4 pages.
Patent Owner Sur-Reply in Response to Petitioner's Reply, United States Patent and Trademark Office, Before the Patent Trial and Appeal Board, *Apple Inc.,* Petitioner v. *Voip-Pal.com, Inc.,* Patent Owner, Case No. IPR2016-01198, U.S. Pat. No. 9,179,005, dated Jun. 14, 2017, 8 pages.
Patent Owner Request for Oral Argument, United States Patent and Trademark Office, Before the Patent Trial and Appeal Board, *Apple Inc.,* Petitioner v. *Voip-Pal.com, Inc.,* Patent Owner, Case No. IPR2016-01198, U.S. Pat. No. 9,179,005, dated Jun. 14, 2017, 4 pages.

(56) References Cited

OTHER PUBLICATIONS

Patent Owner Motion to Exclude, United States Patent and Trademark Office, Before the Patent Trial and Appeal Board, *Apple Inc.*, Petitioner v. *Voip-Pal.com, Inc.*, Patent Owner, Case No. IPR2016-01198, U.S. Pat. No. 9,179,005, dated Jun. 14, 2017, 18 pages.
Voip-Pal Ex. 2052, IPR2016-01198, *Apple Inc.* vs. *Voip-Pal.com, Inc.*, Reporter's Transcript of Telephonic Hearing, Jun. 7, 2017, 16 sheets.
Order, Conduct of Proceeding, 37 C.F.R. § 42.5, United States Patent and Trademark Office, Before the Patent Trial and Appeal Board, *Apple Inc.*, Petitioner, v. *Voip-Pal.com Inc.*, Patent Owner, Cases IPR2016-01198 and IPR2016-01201, U.S. Pat. Nos. 9,179,005 B2 and 8,542,815 B2, Paper No. 37, Filed: Jun. 13, 2017, 3 pages.
Voip-Pal Ex. 2053, IPR2016-01198, *Apple Inc.* vs. *Voip-Pal.com, Inc.*, Reporter's Transcript of Telephonic Hearing, Jun. 20, 2017, 25 pages.
Voip-Pal Ex. 2053, IPR2016-01201, *Apple Inc.* vs. *Voip-Pal.com, Inc.*, Reporter's Transcript of Telephonic Hearing, Jun. 20, 2017, 25 pages.
Order, Conduct of Proceeding, 37 C.F.R. § 42.5, United States Patent and Trademark Office, Before the Patent Trail and Appeal Board, *Apple Inc.*, Petitioner, v. *Voip-Pal.com, Inc.*, Patent Owner. Cases IPR2016-01198 and IPR2016-01201, U.S. Pat. Nos. 9,179,005 B2 and 8,542,815 B2, Paper No. 43, Filed: Jun. 22, 2017, 4 pages.
Order, Trial Hearing, 37 C.F.R. § 42.70, United States Patent and Trademark Office, Before the Patent Trail and Appeal Board, *Apple Inc.*, Petitioner, v. *Voip-Pal.com, Inc.*, Patent Owner. Cases IPR2016-01198 and IPR2016-01201, U.S. Pat. Nos. 9,179,005 B2 and 8,542,815 B2, Paper No. 45, Filed: Jun. 26, 2017, 4 pages.
Petitioner's Opposition to Patent Owner's Motion to Exclude, Unted States Patent and Trademark Office, Before the Patent Trial and Appeal Board, *Apple Inc.*, Petitioner v. *Voip-Pal.com, Inc.*, Patent Owner, Case No. IPR2016-01201, U.S. Pat. No. 8,542,815, Date: Jun. 26, 2017, 15 pages.
Petitioner's Opposition to Patent Owner's Motion to Exclude, Unted States Patent and Trademark Office, Before the Patent Trial and Appeal Board, *Apple Inc.*, Petitioner v. *Voip-Pal.com, Inc.*, Patent Owner, Case No. IPR2016-01198, U.S. Pat. No. 9,179,005, Date: Jun. 26, 2017, 15 pages.
Patent Owner Reply to Opposition to Motion to Exclude, United States Patent and Trademark Office, Before the Patent Trial and Appeal Board, *Apple Inc.*, Petitioner, v. *Voip-Pal.com, Inc.*, Patent Owner, Case No. IPR 2016-01198, U.S. Pat. No. 9,179,005, Filed: Jul. 3, 2017, 8 pages.
Patent Owner Reply to Opposition to Motion to Exclude, United States Patent and Trademark Office, Before the Patent Trial and Appeal Board, *Apple Inc.*, Petitioner, v. *Voip-Pal.com, Inc.*, Patent Owner, Case No. IPR 2016-01201, U.S. Pat. No. 8,542,815, Filed: Jul. 3, 2017, 8 pages.
Voip-Pal Ex. 2054, IPR2016-01198, Voip-Pal's Demonstratives for Oral Hearing, *Apple Inc.* v. *Voip-Pal.com*, Inc., Case IPR2016-01201 (U.S. Pat. No. 8,542,815), Case IPR2016-01198 (U.S. Pat. No. 9,179,005), Jul. 20, 2017, 34 pages.
Voip-Pal Ex. 2054, IPR2016-01201, Voip-Pal's Demonstratives for Oral Hearing, *Apple Inc.* v. *Voip-Pal.com, Inc.*, Case IPR2016-01201 (U.S. Pat. No. 8,542,815), Case IPR2016-01198 (U.S. Pat. No. 9,179,005), Jul. 20, 2017, 34 pages.
Petitioner Apple Inc. Ex. 1018, Petitioner's Demonstrative Exhibits, Inter Partes Reviews, U.S. Pat. No. 9,179,005 & U.S. Pat. No. 8,542,815, Oral Argument, Jul. 20, 2017, *Apple Inc.* v. *Voip-Pal.com, Inc.*, Case IPR2016-01198; U.S. Pat. No. 9,179,005, Case IPR2016-01201; U.S. Pat. No. 8,542,815, 46 pages.
Decision: Denying Institution of Inter Partes Review, 37 C.F.R. § 42.108, United States Patent and Trademark Office, Before the Patent Trial and Appeal Board, *Unified Patents Inc.*, Petitioner v. *Voip-Pal.com Inc.*, Patent Owner, Case IPR2016-01082, U.S. Pat. No. 8,542,815 B2, Paper 8, Entered: Nov. 18, 2016.
Decision: Institution of Inter Partes Review, 37 C.F.R. § 42.108, United States Patent and Trademark Office, Before the Patent Trial and Appeal Board, *Apple Inc.*, Petitioner v. *Voip-Pal.com Inc.*, Patent Owner, Case IPR2016-01201, U.S. Pat. No. 8,542,815 B2, Paper 6, Entered: Nov. 21, 2016.
Decision: Institution of Inter Partes Review, 37 C.F.R. § 42.108, United States Patent and Trademark Office, Before the Patent Trial and Appeal Board, *Apple Inc.*, Petitioner v. *Voip-Pal.com Inc.*, Patent Owner, Case IPR2016-01198, U.S. Pat. No. 9,179,005 B2, Paper 6, Entered: Nov. 21, 2016.
Scheduling Order: United States Patent and Trademark Office, Before the Patent Trial and Appeal Board, *Apple Inc.*, Petitioner v. *Voip-Pal.com Inc.*, Patent Owner, Cases IPR2016-01201, IPR2016-01198, U.S. Pat. No. 8,542,815 B2, U.S. Pat. No. 9,179,005 B2, Paper 7, Entered: Nov. 21, 2016.
Canadian Office Action dated Sep. 18, 2014 for Canadian Patent Application No. CA 2,670,510.
Canadian Office Action dated Aug. 18, 2015 for Canadian Patent Application No. CA 2,732,148.
Canadian Office Action dated Aug. 2, 2017 for Canadian Patent Application No. CA 2,681,984.
Indian Office Action dated Jun. 21, 2017 for Indian Patent Application No. IN 1227/MUMNP/2009.
Intimation of the grant and recordal of India Patent No. 287412 entitled "Producing Routing Messages for Voice Over IP Communications", dated Sep. 15, 2017, for India Patent Application. No. IN 1047/MUMNP/2009 filed Nov. 1, 2007.
Patent Owner's Preliminary Response to Petition for Inter Partes Review, United States Patent and Trademark Office, Before the Patent Trial and Appeal Board, *AT&T Services, Inc.*, Petitioner, v. *VoIP-Pal.com, Inc.*, Patent Owner, Case No. IPR2017-01382, U.S. Pat. No. 8,542,815, dated Aug. 24, 2017, 71 pages.
Patent Owner's Preliminary Response to Petition for Inter Partes Review, United States Patent and Trademark Office, Before the Patent Trial and Appeal Board, *AT&T Services, Inc.*, Petitioner, v. *VoIP-Pal.com, Inc.*, Patent Owner, Case No. IPR2017-01383, U.S. Pat. No. 9,179,005, dated Aug. 24, 2017, 74 pages.
Patent Owner's Preliminary Response to Petition for Inter Partes Review, United States Patent and Trademark Office, Before the Patent Trial and Appeal Board, *AT&T Services, Inc.*, Petitioner, v. *VoIP-Pal.com, Inc.*, Patent Owner, Case No. IPR2017-01384, U.S. Pat. No. 9,179,005, dated Aug. 24, 2017, 61 pages.
Patent Owner's Preliminary Response to Petition for Inter Partes Review, United States Patent and Trademark Office, Before the Patent Trial and Appeal Board, *Apple Inc.*, Petitioner, v. *Voip-Pal.com, Inc.*, Patent Owner, Case No. IPR2017-01398, U.S. Pat. No. 9,179,005, dated Aug. 25, 2017, 76 pages.
Patent Owner's Preliminary Response to Petition for Inter Partes Review, United States Patent and Trademark Office, Before the Patent Trial and Appeal Board, *Apple Inc.*, Petitioner, v. *VoIP-Pal.com, Inc.*, Patent Owner, Case No. IPR2017-01399, U.S. Pat. No. 8,542,815, dated Aug. 25, 2017, 77 pages.
United States Patent and Trademark Office; Before the Patent Trial and Appeal Board; *Apple Inc.*, Petitioner, v. *Voip-Pal.com., Inc.* Patent Owner; Cases IPR2016-01198 and IPR2016-01201; U.S. Pat. Nos. 9,179,005 B2 and 8,542,815 B2; Record of Oral Hearing, Held: Jul. 20, 2017; Before Josiah C. Cocks, Jennifer Meyer Chagnon, and John A. Hudalla, *Administrative Patent Judges*, 83 pages.
United States Patent and Trademark Office; Before the Patent Trial and Appeal Board; *Apple Inc.*, Petitioner, v. *Voip-Pal.com, Inc.*, Patent Owner; Case IPR2016-01198, U.S. Pat. No. 9,179,005 B2; Final Written Decision; Paper 53, Entered: Nov. 20, 2017; 29 pages.
United States Patent and Trademark Office; Before the Patent Trial and Appeal Board; *Apple Inc.*, Petitioner, v. *Voip-Pal.com, Inc.*, Patent Owner; Case IPR2016-01201, U.S. Pat. No. 8,542,815 B2; Final Written Decision; Paper 54, Entered: Nov. 20, 2017; 29 pages.
United States Patent and Trademark Office; Before the Patent Trial and Appeal Board; *Apple Inc.*, Petitioner, v. *Voip-Pal.com, Inc.*, Patent Owner; Case IPR2017-01399, U.S. Pat. No. 8,542,815 B2; Decision: Denying Institution of Inter Partes Review; Paper No. 6, Entered: Nov. 20, 2017; 23 pages.
United States Patent and Trademark Office; Before the Patent Trial and Appeal Board; *Apple Inc.*, Petitioner, v. *Voip-Pal.com, Inc.*, Patent Owner; Case IPR2017-01398, U.S. Pat. No. 9,179,005 B2;

(56) References Cited

OTHER PUBLICATIONS

Decision: Denying Institution of Inter Partes Review; Paper No. 6, Entered: Nov. 20, 2017; 23 pages.
United States Patent and Trademark Office; Before the Patent Trial and Appeal Board; *AT&T Services, Inc.*, Petitioner, v. *Voip-Pal.com, Inc.*, Patent Owner; Case IPR2017-01382, U.S. Pat. No. 8,542,815 B2; Decision: Denying Institution of Inter Partes Review; Paper No. 8, Entered: Nov. 20, 2017; 28 pages.
United States Patent and Trademark Office; Before the Patent Trial and Appeal Board; *AT&T Services, Inc.*, Petitioner, v. *Voip-Pal.com, Inc.*, Patent Owner; Case IPR2017-01383, U.S. Pat. No. 9,179,005 B2; Decision: Denying Institution of Inter Partes Review; Paper No. 8, Entered: Nov. 20, 2017; 43 pages.
United States Patent and Trademark Office; Before the Patent Trial and Appeal Board; *AT&T Services, Inc.*, Petitioner, v. *Voip-Pal.com, Inc.*, Patent Owner; Case IPR2017-01384, U.S. Pat. No. 9,179,005 B2; Decision: Denying Institution of Inter Partes Review; Paper No. 8, Entered: Nov. 20, 2017; 31 pages.
United States Patent and Trademark Office; Before the Patent Trial and Appeal Board; *Apple Inc.*, Petitioner, v. *Voip-Pal.com, Inc.*, Patent Owner; Cases IPR2016-01198 and IPR2016-01201, U.S. Pat. Nos. 9,179,005 B2 and 8,542,815 B2; Order, Conduct of Proceeding, 37 C.F.R. § 42.5; Paper No. 54, Entered: Dec. 20, 2017; 4 pages.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Petitioner's Motion for Entry of Judgment in Favor of Petitioner etc; Paper 55, Date: Dec. 20, 2017; 18 pages.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Petitioner's Updated Exhibit List; Date: Dec. 22, 2017; 4 pages.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Apple Exhibit 1019—Sep. 18, 2017 Voip-Pal Website advertising Dr. Sawyer's Letters; Date: Dec. 20, 2017; 1 page.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Apple Exhibit 1020—Sep. 2017 Voip-Pal Website posting and linking all of Dr. Sawyer's Letters; Date: Dec. 20, 2017; 2 pages.
United States Patent and Trademark Office; Before the Patent Trial and Appeal Board; *Apple Inc.*, Petitioner, vs. *Voip-Pal.com, Inc.*, Patent Owner; Case No. IPR2016-01198, U.S. Pat. No. 9,179,005 B2 and Case No. IPR2016-01201, U.S. Pat. No. 8,542,815 B2; IPR2016-01201 Apple Exhibit 1021—Telephonic Hearing Before the Administrative Patent Judges: Dec. 19, 2017; 25 pages.
United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Petitioner's Motion for Entry of Judgment in Favor of Petitioner etc; Date: Dec. 20, 2017; 18 pages.
United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Petitioner's Updated Exhibit List; Date: Dec. 22, 2017; 4 pages.
United States Patent and Trademark Office; Before the Patent Trial and Appeal Board; *Apple Inc.*, Petitioner, v. *Voip-Pal.com, Inc.*, Patent Owner; Case IPR2016-01198, U.S. Pat. No. 9,179,005 B2; Apple Exhibit 1019—Sep. 18, 2017 Voip-Pal Website advertising Dr. Sawyer's Letters; Date: Dec. 20, 2017; 1 page.
United States Patent and Trademark Office; Before the Patent Trial and Appeal Board; *Apple Inc.*, Petitioner, v. *Voip-Pal.com, Inc.*, Patent Owner; Case IPR2016-01198, U.S. Pat. No. 9,179,005 B2; Apple Exhibit 1020—Sep. 2017 Voip-Pal Website posting and linking all of Dr. Sawyer's Letters; Date: Dec. 20, 2017; 2 pages.
United States Patent and Trademark Office; Before the Patent Trial and Appeal Board; *Apple Inc.*, Petitioner, vs. *Voip-Pal.com, Inc.*, Patent Owner; Case No. IPR2016-01198, U.S. Pat. No. 9,179,005 B2 and Case No. IPR2016-01201, U.S. Pat. No. 8,542,815 B2; IPR2016-01198 Apple Exhibit 1021—Telephonic Hearing Before the Administrative Patent Judges: Dec. 19, 2017; 25 pages.
Exhibit 3001 filed Dec. 20, 2017—Letter from Ryan L. Thomas dated Dec. 19, 2017 re Representation of VoIP-Pal.com, Inc. in Conference Call to the Administrative Patent Judges in re IPR2016-01198 and IPR-2016-01201; 1 page.
Exhibit 3002 filed Dec. 20, 2017—Email from Attorney Adam Seitz dated Dec. 15, 2017 to the Administrative Patent Judges in re IPR2016-01198 and IPR-2016-01201 re Authorization to File Motion for Sanctions; 1 page.
Exhibit 3003 filed Dec. 20, 2017—Letter from Dr. Thomas E. Sawyer (Shareholder) dated May 1, 2017 to PTAB Chief Judge David P. Ruschke in re IPR2016-01198 and IPR-2016-01201 re Review of Proceedings, 6 pages.
Exhibit 3004 filed Dec. 20, 2017—Letter from Dr. Thomas E. Sawyer (Shareholder) dated Jun. 21, 2017 to PTAB Chief Judge David P. Ruschke in re IPR2016-01198 and IPR-2016-01201 re Review of Proceedings, 3 pages.
Exhibit 3005 filed Dec. 20, 2017—Letter from Dr. Thomas E. Sawyer (Shareholder) dated Jul. 11, 2017 to PTAB Chief Judge David P. Ruschke in re IPR2016-01198 and IPR-2016-01201 re Review of Proceedings, 5 pages.
Exhibit 3006 filed Dec. 20, 2017—Letter from Dr. Thomas E. Sawyer (Shareholder) dated Jul. 27, 2017 to the Secretary of the Department of Commerce Hon. Wilbur Ross et al. in re IPR2016-01198 and IPR-2016-01201 re Review of Proceedings, 6 pages.
Exhibit 3007 filed Dec. 20, 2017—Letter from Dr. Thomas E. Sawyer (Shareholder) dated Aug. 31, 2017 to the Secretary of the Department of Commerce Hon. Wilbur Ross in re IPR2016-01198 and IPR-2016-01201 re Review of Proceedings, 8 pages.
Exhibit 3008 filed Dec. 20, 2017—Letter from Dr. Thomas E. Sawyer (Shareholder) dated Oct. 23, 2017 to the PTAB Chief Judge David P. Ruschke et al. in re IPR2016-01198 and IPR-2016-01201 re Review of Proceedings, 10 pages.
United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Patent Owner's Opposition to Apple's Motion for Sanctions Pursuant to Board Order of Dec. 20, 2017; Filed: Jan. 12, 2018; 17 pages.
United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Patent Owner's Updated Exhibit List; Filed: Jan. 12, 2018; 9 pages.
Voip-Pal Exhibit 2056, IPR2016-01198; United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Declaration in Support of Patent Owner's Opposition to Motion for Sanctions; Dated: Jan. 12, 2018; 12 pages.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Patent Owner's Opposition to Apple's Motion for Sanctions Pursuant to Board Order of Dec. 20, 2017; Filed: Jan. 12, 2018; 17 pages.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Patent Owner's Updated Exhibit List; Filed: Jan. 12, 2018; 9 pages.
Voip-Pal Exhibit 2056, IPR2016-01198; United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Declaration in Support of Patent Owner's Opposition to Motion for Sanctions; Dated: Jan. 12, 2018; 12 pages.
Voip-Pal Exhibit 2057; IPR2016-01198 and IPR2016-01201; Declaration of Adam R. Knecht, ESQ. Regarding Notice of Various Letters From Dr. Thomas Sawyer to the Honorable Judge Richard

(56) References Cited

OTHER PUBLICATIONS

F. Boulware II (ECF Nos. 28 and 32); including Exhibit A (7 pages), Exhibit B (19 pages) and Exhibit C (12 pages); Executed on Dec. 18, 2017; 40 pages.
Voip-Pal Exhibit 2058; IPR2016-01198 and IPR2016-01201; O'Brien et al., "Revealed: Federal Judges Guilty of Owning Stock in Corporations They Ruled On," Occupy.com(May 1, 2014,) 11 pages.
Voip-Pal Exhibit 2059; IPR2016-01198 and IPR2016-01201; Letter dated Aug. 7, 2013 from Kathryn Siehndel, USPTO FOIA Officer, , Re: Freedom of Information Act (FOIA) Request No. F-13-00218 concerning U.S. Pat. No. 7,139,761; 77 pages.
Voip-Pal Exhibit 2060; IPR2016-01198 and IPR2016-01201; Questionnaire for Non-Judicial Nominees; Affidavit executed by Michelle K. Lee Oct. 28, 2014; 40 pages.
Voip-Pal Exhibit 2061; IPR2016-01198 and IPR2016-01201; Davis, R., "PTAB's 'Death Squad' Label Not Totally Off-Base, Chief Says," *Law360*, New York (Aug. 14, 2014) 4 pages.
Voip-Pal Exhibit 2062; IPR2016-01198 and IPR2016-01201; Graham et al., "The Brainy Bunch," *Intellectual Property: An ALM Supplement*, Fall 2015, 7 pages.
Voip-Pal Exhibit 2063; IPR2016-01198 and IPR2016-01201; Patent Trial and Appeal Board Statistics, *USPTO*, Jan. 31, 2017, 15 pages.
Voip-Pal Exhibit 2064; IPR2016-01198 and IPR2016-01201; Davis, R., "Fed. Circ. Reverses PTAB Nix of Synopsys Circuit Patent," *Law360*, New York, Apr. 24, 2017, 5 pages.
Voip-Pal Exhibit 2065; IPR2016-01198 and IPR2016-01201; Scheller et al. "Federal Circuit to PTAB: No Short Cuts Allowed," *The National Law Review*; Apr. 25, 2017, 5 pages.
Voip-Pal Exhibit 2066; IPR2016-01198 and IPR2016-01201; Couturier, K. "How Europe Is Going After Apple, Google and Other U.S. Tech Giants," *New York Times*, Apr. 13, 2015, 1 page.
Voip-Pal Exhibit 2067; IPR2016-01198 and IPR2016-01201; Manjoo, F., "Tech Giants Seem Invincible. That Worries Lawmakers." *New York Times*, Jan. 4, 2017, 5 pages.
Voip-Pal Exhibit 2068; IPR2016-01198 and IPR2016-01201; Quinn et al., "Michelle Lee's views on patent quality out of touch with reality facing patent applicants," *IPWatchdog®*,Feb. 2, 2017, 5 pages.
Voip-Pal Exhibit 2069; IPR2016-01198 and IPR2016-01201; Quinn, G., "Michelle Lee launches PTAB initiative to 'shape and improve' IPR proceedings," *IPWatchdog®*, Apr. 10, 2017, 3 pages.
Voip-Pal Exhibit 2070; IPR2016-01198 and IPR2016-01201; Kampis, J., "Google employees have enjoyed revolving door during Obama administration," watchdog.org, Aug. 8, 2016, 6 pages.
Voip-Pal Exhibit 2071; IPR2016-01198 and IPR2016-01201; Dayen, D., "The Android Administration," *The Intercept_*, Apr. 22, 2016, 16 pages.
Voip-Pal Exhibit 2072; IPR2016-01198 and IPR2016-01201; Editor Charlie, "@scleland: How Google Is Anti-employment Antiproperty & Pro-regulation," *Artist Rights Watch, News for the Artist Rights Advocacy Community*, Nov. 18, 2016, 3 pages.
Voip-Pal Exhibit 2073; IPR2016-01198 and IPR2016-01201; Press Release: "Voip-Pal Issues a Correction to its Press Release of Sep. 18, 2017," *Voip-Pal.Com Inc.*, Jan. 11, 2018, 1 page.
Voip-Pal Exhibit 2074; IPR2016-01198 and IPR2016-01201; "Former head of Google patent strategy appointed to run U.S. patent agency," ai (/Profile/12836/AppleInsider), Dec. 12, 2013, 8 pages.
Voip-Pal Exhibit 2075; IPR2016-01198 and IPR2016-01201; Vermont, S. "IPR Statistics Revisited: Yep, It's a Patent Killing Field," PatentAttorney.com, Feb. 8, 2017, 9 pages.
Voip-Pal Exhibit 2076; IPR2016-01198 and IPR2016-01201; Sterne et al., "PTAB Death Squads: Are All Commercially Viable Patents Invalid?" *IPWatchdog®*, Mar. 24, 2014, 5 pages.
Voip-Pal Exhibit 2077; IPR2016-01198 and IPR2016-01201; Sheafe, B., "Dear Congress: A Small Request on Behalf of the Innovators You (Theoretically) Represent: Part 2," *IPWire*, Jan. 12, 2018, 5 pages.

Voip-Pal Exhibit 2078; IPR2016-01198 and IPR2016-01201; Brachmann, S., "Are conflicts of interest at the PTAB leading to preferential decisions for Apple?" *IPWatchdog®*, Apr. 28, 2017, 5 pages.
Voip-Pal Exhibit 2079; IPR2016-01198 and IPR2016-01201; Quinn et al., "Patent owners do not like IPRs despite what Bloomberg Law, AIPLA study says," *IPWatchdog®*, Feb. 6, 2017, 5 pages.
Voip-Pal Exhibit 2080; IPR2016-01198 and IPR2016-01201; "Does Google's Michelle Lee Work for Both Google and the U.S. Patent Office at the Same Time?" *The Corruption Times, Your Public New WIKI for Social Updates*Apr. 6, 2016, 8 pages.
Voip-Pal Exhibit 2081; IPR2016-01198 and IPR2016-01201; Morinville, P., "The Senate Must Vet Vishal Amin," *IPWatchdog®*, Apr. 23, 2017, 4 pages.
Voip-Pal Exhibit 2082; IPR2016-01198 and IPR2016-01201; The New York Times "May 15, 1911, Supreme Court Orders Standard Oil to Be Broken Up," By the Learning Network, May 15, 2012, 3 pages.
Voip-Pal Exhibit 2083; IPR2016-01198 and IPR2016-01201; Simpson et al., "PTAB Kill Rates: How IPRs Are Affecting Patents," *Law360*, New York, Sep. 15, 2015, 6 pages.
Voip-Pal Exhibit 2084; IPR2016-01198 and IPR2016-01201; Vermont, S., "IPR Statistics Revisited: Yep, It's a Patent Killing Field," PatentAttorney.com, Feb. 8, 2017, 9 pages.
Voip-Pal Exhibit 2085; IPR2016-01198 and IPR2016-01201; Robinson, E., "Why the Unified Patents Model Would Not Work in China," *IPWatchdog®*, Apr. 26, 2017, 4 pages.
Voip-Pal Exhibit 2086; IPR2016-01198 and IPR2016-01201; Brachmann et al., "US Inventor sets patents on fire as part of PTAB protest at USPTO," *IPWatchdog®*, Aug. 11, 2017, 4 pages.
Voip-Pal Exhibit 2087; IPR2016-01198 and IPR2016-01201; "Selection process for assigning judges to expanded PTAB panels," *717 Madison Place*, Aug. 28, 2017, 3 pages.
Voip-Pal Exhibit 2088; IPR2016-01198 and IPR2016-01201; Eden, S., "How the U.S. Patent Office Got So Screwed Up," *Popular Mechanics*, Jun. 21, 2016, 21 pages.
Voip-Pal Exhibit 2089; IPR2016-01198 and IPR2016-01201; Quinn, G., "Supreme Court to decide if Inter Partes Review is Unconstitutional," *IPWatchdog®*, Jun. 12, 2017, 4 pages.
Voip-Pal Exhibit 2090; IPR2016-01198 and IPR2016-01201; Quinn, G., "Industry reaction to SCOTUS patent venue decision in TC Heartland v. Kraft Food Group," *IPWatchdog®*, May 22, 2017, 7 pages.
Voip-Pal Exhibit 2091; IPR2016-01198 and IPR2016-01201; Flibbert et al., "5 Distinctions Between IPRs and District Court Patent Litigation," *Finnegan*, Dec. 16, 2015, 6 pages.
Voip-Pal Exhibit 2092; IPR2016-01198 and IPR2016-01201; "2404. Hobbs Act—Under Color of Official Right," *USAM*, Department of Justice, downloaded on Jan. 12, 2018, 5 pages.
Voip-Pal Exhibit 2093; IPR2016-01198 and IPR2016-01201; "Selection process for assigning judges to expanded PTAB panels," *717 Madison Place*, Aug. 28, 2017, 3 pages.
Voip-Pal Exhibit 2094; IPR2016-01198 and IPR2016-01201; "2015 Summary of Ethics Rules," *Economic Development Administration*, U.S. Department of Commerce, 16 pages.
Voip-Pal Exhibit 2095; IPR2016-01198 and IPR2016-01201; "Patent Trial and Appeal Board Statistics," United States Patent and Trademark Office, *USPTO*, Mar. 31, 2017, 15 pages.
Voip-Pal Exhibit 2096; IPR2016-01198 and IPR2016-01201; Madigan et al., "Turning Gold to Lead: How Patent Eligibility Doctrine is Undermining U.S. Leadership in Innovation," *George Mason Law & Economics Research Paper No. 17-16*, Mar. 30, 2017, 21 pages.
United States Patent and Trademark Office; Before the Patent Trial and Appeal Board; *Apple Inc.*, Petitioner, v. *Voip-Pal.com, Inc.*, Patent Owner; Cases IPR2016-01198 and IPR2016-01201, U.S. Pat Nos. 9,179,005 B2 and 8,542,815 B2; Order, Conduct of Proceeding, 37 C.F.R. § 42.5, for both proceedings; Paper No. 62, Entered: Jan. 19, 2018, 4 pages.
United States Patent and Trademark Office; Before the Patent Trial and Appeal Board; *Apple Inc.*, Petitioner, v. *Voip-Pal.com, Inc.*, Patent Owner; IPR2016-01198, U.S. Pat. No. 9,179,005; Notice of Appeal, Dated: Jan. 22, 2018, 5 pages.

(56) References Cited

OTHER PUBLICATIONS

Apple Exhibit 1022, IPR2016-01198, Telephonic Hearing Before the Administrative Patent Judges; Jan. 19, 2018; 14 pages.
United States Patent and Trademark Office; Before the Patent Trial and Appeal Board; *Apple Inc.*, Petitioner, v. *Voip-Pal.com, Inc.*, Patent Owner; IPR2016-01201, U.S. Pat. No. 8,542,815; Notice of Appeal, Dated: Jan. 22, 2018, 5 pages.
Apple Exhibit 1022, IPR2016-01201, Telephonic Hearing Before the Administrative Patent Judges; Jan. 19, 2018; 14 pages.
Case: 18-1456; Document: 1-1; Filed: Jan. 23, 2018, 1 page. United States Court of Appeals for the Federal Circuit; Notice of Docketing; 18-1456—*Apple Inc.* v. *Voip-Pal.com, Inc.*; Date of Docketing: Jan. 23, 2018, IPR2016-01198; 1 page.
Case: 18-1456; Document: 1-2; Filed: Jan. 23, 2018, 34 pages United States Court of Appeals for the Federal Circuit; *Apple Inc.*, Petitioner, v. *Voip-Pal.com, Inc.*, Patent Owner; IPR2016-01198, U.S. Pat. No. 9,179,005; Notice of Appeal, (Dated: Jan. 22, 2018, 5 pages); with Paper 53; Entered: Nov. 20, 2017; Final Written Decision; 35 U.S.C. § 318(a) and 37 C.F.R. § 42.73; (29 pages).
Case: 18-1456; Document 6; Filed: Jan. 25, 2018; 14 pages: In the United States Court of Appeals for the Federal Circuit, *Apple Inc.*, Petitioner-Appellant, v. *Voip-Pal.com, Inc.*, Patent Owner-Appellee. On Appeal from the United States Patent and Trademark Office, Patent Trial and Appeal Board, in Case No. IPR2016-01198; Motion of Appellant Apple Inc. to Stay Appeal or for a Limited Remand to Allow Conclusion of Administrative Proceedings.
Case: 18-1457; Document: 1-1; Filed: Jan. 23, 2018, 1 page: United States Court of Appeals for the Federal Circuit; Notice of Docketing; 18-1457—*Apple Inc.* v. *Voip-Pal.com, Inc.*; Date of Docketing: Jan. 23, 2018, IPR2016-01201; 1 page.
Case: 18-1457; Document: 1-2; Filed: Jan. 23, 2018, 34 pages: United States Court of Appeals for the Federal Circuit; *Apple Inc.*, Petitioner, v. *Voip-Pal.com, Inc.*, Patent Owner; IPR2016-01201, U.S. Pat. No. 8,542,815; Notice of Appeal, (Dated: Jan. 22, 2018, 5 pages); with Paper 54; Entered: Nov. 20, 2017; Final Written Decision; 35 U.S.C. § 318(a) and 37 C.F.R. § 42.73; (29 pages).
Case: 18-1457; Document 6; Filed: Jan. 25, 2018; 14 pages: In the United States Court of Appeals for the Federal Circuit, *Apple Inc.*, Petitioner-Appellant, v. *Voip-Pal.com, Inc.*, Patent Owner-Appellee. On Appeal from the United States Patent and Trademark Office, Patent Trial and Appeal Board, in Case No. IPR2016-01201; Motion of Appellant Apple Inc. to Stay Appeal or for a Limited Remand to Allow Conclusion of Administrative Proceedings.
United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Petitioner's Reply in Support of its Motion for Entry of Judgment in Favor of Petitioner as a Sanction for Improper Ex Parte Communications by Patent Owner, or, Alternatively, for New and Constitutionally Correct Proceedings, Date: Jan. 26, 2018, 11 pages.
United States Patent and Trademark Office; Before the Patent Trial and Appeal Board; *Apple Inc.*, Petitioner, v. *Voip-Pal.com, Inc.*, Patent Owner; Case No. IPR2016-01198, U.S. Pat. No. 9,179,005; Petitioner's Updated Exhibit List, Date: Jan. 26, 2018, 4 pages.
Apple Exhibit 1023, IPR2016-01198, Voip-Pal Issues a Correction to its Press Release of Sep. 18, 2017; Jan. 12, 2018, 1 page.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Petitioner's Reply in Support of its Motion for Entry of Judgment in Favor of Petitioner as a Sanction for Improper Ex Parte Communications by Patent Owner, or, Alternatively, for New and Constitutionally Correct Proceedings, Date: Jan. 26, 2018, 11 pages.
United States Patent and Trademark Office; Before the Patent Trial and Appeal Board; *Apple Inc.*, Petitioner, v. *Voip-Pal.com, Inc.*, Patent Owner; Case No. IPR2016-01201, U.S. Pat. No. 8,542,815; Petitioner's Updated Exhibit List, Date: Jan. 26, 2018, 4 pages.
Apple Exhibit 1023, IPR2016-01201, Voip-Pal Issues a Correction to its Press Release of Sep. 18, 2017; Jan. 12, 2018, 1 page.
Case: 18-1456; Document 7; Filed: Jan. 29, 2018; 2 pages: United States Court of Appeals for the Federal Circuit, Order; consolidating the appeals.
Case: 18-1457; Document 7; Filed: Jan. 29, 2018; 2 pages: United States Court of Appeals for the Federal Circuit, Order; consolidating the appeals.
Complaint for Patent Infringement, United States District Court, District of Nevada, Case No. 2:16-cv-2338, *Voip-Pal.com, Inc., a Nevada corporation*, Plaintiff v. *Twitter, Inc., a California corporation*, Defendant, Filed Oct. 6, 2016, 8 pages.
Civil Docket for Case #: 2:16-cv-02338-RFB-CWH, United States District Court, District of Nevada (Las Vegas), *Voip-Pal.com, Inc.* v. *Twitter, Inc.*, Date Filed: Oct. 6, 2016, 2 pages.
Table of Exhibits, Case 2:16-cv-02338-RFB-CWH, Filed Oct. 6, 2016, 1 page.
Exhibit A, Case 2:16-cv-02338-RFB-CWH, Filed Oct. 6, 2016, U.S. Pat. No. 8,542,815 B2, Issued Sep. 24, 2013, to Clay Perrault et al., 60 pages.
Exhibit B, Case 2:16-cv-02338-RFB-CWH, Filed Oct. 6, 2016, U.S. Pat. No. 9,179,005 B2, Issued Nov. 3, 2015, to Clay Perrault et al., 63 pages.
Exhibit C, Case 2:16-cv-02338-RFB-CWH, Filed Oct. 6, 2016, Letter dated Dec. 18, 2015 giving notice of U.S. Pat. Nos. 8,542,815 B2; 9,179,005 B2; and related Patents listed in Attachment A, 4 pages.
Exhibit D, Case 2:16-cv-02338-RFB-CWH, Filed Oct. 6, 2016, Asserted Claims and Infringement Conditions, United States District Court, District of Nevada, *Voip-Pal.com, Inc., a Nevada corporation*, Plaintiff v. *Twitter, Inc., a California corporation*, Defendants, 6 pages.
Chart 1 to Exhibit D, Case 2.16-cv-02338-RFB-CWH, Filed Oct. 6, 2016, Chart 1, Asserted Claims and Infringement Conditions Concerning U.S. Pat. No. 8,542,815, United States District Court, District of Nevada, *Voip-Pal.com, Inc., a Nevada corporation*, Plaintiff v. *Twitter, Inc., a California corporation*, Defendants, 20 pages.
Chart 2 to Exhibit D, Case 2:16-cv-02338-RFB-CWH, Filed Oct. 6, 2016, Chart 2, Asserted Claims and Infringement Conditions Concerning U.S. Pat. No. 9,179,005, United States District Court, District of Nevada, *Voip-Pal.com, Inc., a Nevada corporation*, Plaintiff v. *Twitter, Inc., a California corporation*, Defendants, 28 pages.
Exhibit E, Case 2:16-cv-02338-RFB-CWH, Filed Oct. 6, 2016, VPLM Active U.S. Patent Matters as of October 1, 2016, 2 pages.
Exhibit F, Case 2:16-cv-02338-RFB-CWH, Filed Oct. 6, 2016, Twitter Royalty Monetization Analysis Overview, 4 pages.
Patent Owner's Preliminary Response, Case No. IPR2016-01082, U.S. Pat. No. 8,542,815, *Unified Patents Inc.*, Petitioner, v. *Voip-Pal.com Inc.*, Patent Owner, Filing Date: Aug. 26, 2016, 80 pages.
Voip-Pal.com, Inc. Exhibit 2001, Comparison of portions of Petition with portions of Declaration, IPR2016-01082, *Unified Patents* v. *Voip-Pal*, Filing Date: Aug. 26, 2016, 9 pages.
Patent Owner's Preliminary Response to Petition for Inter Partes Review, Case No. IPR2016-01201, U.S. Pat. No. 8,542,815, *Apple Inc.*, Petitioner, v. *Voip-Pal.com Inc.*, Patent Owner, Filing Date: Sep. 19, 2016, 74 pages.
Voip-Pal.com, Inc. Exhibit 2001, Comparison of Petition (Ground 1) with Petition (Ground 2), IPR2016-01201, *Apple* v. *Voip-Pal*, Filing Date: Sep. 19, 2016, 19 pages.
Patent Owner's Preliminary Response to Petition for Inter Partes Review, Case No. IPR2016-01198, U.S. Pat. No. 9,179,005, *Apple Inc.*, Petitioner, v. *Voip-Pal.com Inc.*, Patent Owner, Filing Date: Sep. 21, 2016, 74 pages.
Voip-Pal.com, Inc. Exhibit 2001, Comparison of Petition (Ground 1) with Petition (Ground 2), IPR2016-01198, *Apple* v. *Voip-Pal*, Filing Date: Sep. 21, 2016, 21 pages.
Canadian Office Action dated Aug. 16, 2016 for Canadian Patent Application No. 2,681,984.
European Examination Report dated Aug. 29, 2016 for European Patent Application No. EP 07 855 436.7.
Communication under Rule 71(3) EPC—Intention to Grant—dated Oct. 14, 2016 for European Patent Application No. EP 07 816 106.4.

(56) References Cited

OTHER PUBLICATIONS

Andrew Cray, IP PBXs: Open Questions, Data Communications, The Global Magazine for Network Architects, pp. 1, 114, 69-84, Mar. 1999, United States.
Mark Spencer, et al., The Asterisk Handbook, Mar. 30, 2003, 71 pages, Version 2, Digium, Inc., United States.
Jim Van Meggelen, et al., Asterisk: The Future of Telephony, Aug. 31, 2005, 376 pages, O'Reilly Media, Inc., United States.
David Gomillion, et al., Building Telephony Systems with Asterisk, Sep., 2005, 174 pages, Packt Publishing, United Kingdom.
Paul Mahler., VoIP Telephony with Asterisk, 2004, 211 pp., Signate, United States.
Avaya Inc., Understanding VoIP, Leveraging Technology for a Competitive Edge, White Paper, Oct. 2005, 31 pages, Avaya Inc., United States.
Avaya Inc., Feature Description and Implementation for Avaya Communication Manager, Issue 3, Jun. 2005, 1444 pages, Avaya Inc., United States.
Avaya Inc., Administration Guide for Avaya Communication Manager, Issue 1, Jun. 2005, 1656 pages, Avaya Inc., United States.
Avaya Inc., Configuring Avaya Communication Manager with a Multi Location Dial Plan—Issue 1.0, Avaya Solution & Interoperability Test Lab, Mar. 18, 2004, 18 pages, Avaya Inc., United States.
Avaya Inc., Application Notes for H.323 Voice over IP Trunking between Avaya Communication Manager and VoIP Americas Nativevoip VoIP Service—Issue 1.0, Avaya Solution & Interoperability Test Lab, 2005, 13 pages, Avaya Inc., United States.
Avaya Inc., Configuring H.323 Signaling and IP Trunks between Avaya Communication Manager and Cisco CallManager 4.0—Issue 1.0, Avaya Solution & Interoperability Test Lab, 2005, 19 pages, Avaya Inc., United States.
John Alexander, et al., A Cisco AVVID Solution, Cisco CallManager Fundamentals, 2002, 722 pp., Cisco Press, United States.
John Alexander, et al., Cisco CallManager Fundamentals, Second Edition, 2006, 975 pages, Cisco Systems, Inc., United States.
Salvatore Collora et al., A Cisco AVVID Solution, Cisco CallManager Best Practices, 2004, 620 pages, Cisco Systems, Inc., United States.
Cisco Systems, Inc., Cisco IP Telephony Network Design Guide, Cisco CallManager Release 3.0(5), 2000, 262 pages, Cisco Systems, Inc., United States.
David Bateman, Configuring CallManager and Unity: A Step-by-Step Guide, 2005, 560 pages, Cisco Press, United States.
Cisco Systems, Inc., System Description for the Cisco Communications Network, Version 2.1, Jan. 1999, 42 pages, Cisco Systems, Inc., United States.
Web-page, http://business.mci.com/small_business/local_long_distance/mci_advantage_faq.jsp, as accessed Mar. 12, 2019, 3 pages, MCI Inc., United States.
Henry Sinnreich et al., SIP Beyond VoIP, Jul. 2005, pp. 48-53, VON Publishing, LLC, Melville, NY, United States.
Taavet Hinrikus, Skype API, Description of Skype API and how to use it, Version 1.2 Mar. 4, 2005, 2005, 37 pages, Skype Technologies S.A., Luxembourg.
Baset et al., An Analysis of the Skype Peer-to-Peer Internet Telephony Protocol, Sep. 15, 2004, 12 pages, Department of Computer Science, Columbia University, United States.
Hao Wang, Skype VoIP service—architecture and comparison, Infotech Seminar Advanced Communication Services (ACS), 2005, 10 pages, Institute of Communication Networks and Computer Engineering, University of Stuttgart, Germany.
Dennis Bergström, An analysis of Skype VoIP application for use in a corporate environment., http://www.geocities.com/bergstromdennis/, Oct. 28, 2004, 30 pages, Version 1.3, United States.
Web-page, Skype for Windows 1.4, http://www.skype.com/products/skype/windows/, as accessed Oct. 26, 2005, 1 page, Skype Technologies S.A., Luxembourg.
Web-page, http://www.skype.com/help/guides/call.html, as accessed Oct. 26, 2005, 1 page, Skype Technologies S.A., Luxembourg.
Web-page, How to Use Skype, http://www.skype.com/help/guides/usingskype.html, as accessed Oct. 27, 2005, 5 pages, Skype Technologies S.A., Luxembourg.
Web-page, How to Use SkypeOut, http://www.skype.com/help/guides/skypeout.html, as accessed Oct. 26, 2005, 2 pages, Skype Technologies S.A., Luxembourg.
Web-page, http://www.skype.com/products/, as accessed Oct. 30, 2005, 3 pages, Skype Technologies S.A., Luxembourg.
Web-page, Skype Out, http://www.skype.com/products/skypeout/, as accessed Jan. 27, 2005, 2 pages, Skype Technologies S.A., Luxembourg.
Web-page, Skype for Windows, http://www.skype.com/products/skype/windows/, as accessed Jan. 19, 2005, 1 page, Skype Technologies S.A., Luxembourg.
Web-page, http://www.skype.com/help/guides/remove.html, as accessed Jan. 25, 2005, 1 page, Skype Technologies S.A., Luxembourg.
Web-page, How to Use Skype, http://www.skype.com/help/guides/usingskype.html, as accessed Jan. 27, 2005, 5 pages, Skype Technologies S.A., Luxembourg.
Web-page, How to Use SkypeOut, http://www.skype.com/help/guides/skypeout.html, as accessed Jan. 27, 2005, 2 pages, Skype Technologies S.A., Luxembourg.
Web-page, http://www.skype.com/, as accessed Jan. 30, 2005, 3 pages, Skype Technologies S.A., Luxembourg.
Quintum Technologies, Inc., Tenor Call Routing Server, Product Guide, P/N. 480-0028-00-00, 70 pages, Quintum Technologies, Inc., United States.
Quintum Technologies, Inc., Tenor Call Routing, 27 pages, Quintum Technologies, Inc., United States.
Quintum Technologies, Inc., Tenor Call Routing, 19 pages, Quintum Technologies, Inc., United States.
Vonage Holdings Corp., Form 10-K Annual Report, Apr. 17, 2007, 142 pages, Vonage Holdings Corp., United States.
Federal Communications Commission, In the Matter of Vonage Holdings Corporation Petition for Declaratory Ruling Concerning an Order of the Minnesota Public Utilities Commission, Memorandum Opinion and Order, Nov. 12, 2004, 41 pages, United States.
William B. Wilhelm, et al., Petition for Declaratory Ruling, Sep. 22, 2003, 142 pages, United States.
William B. Wilhelm, et al., WC 03-211; Vonage Petition for Declaratory Ruling, Oct. 1, 2004, 201 pages, United States.
Web-page, http://www.vonage.com/no_flash/features.php?feature=3 way_ calling, as accessed Nov. 6, 2004, 1 page, Vonage Holdings Corp, United States.
Web-page, http://www.vonage.com/no_flash/features.php?feature=7_dig it_ dialing, as accessed Nov. 6, 2004, 1 page, Vonage Holdings Corp, United States.
Web-page, http://www.vonage.com/no_flash/features.php?feature=311, as accessed Nov. 6, 2004, 2 pages, Vonage Holdings Corp, United States.
Web-page, http:// www.vonage.com/no_flash/features.php?feature=subscriber_to_subscriber, as accessed Apr. 6, 2005, 1 page, Vonage Holdings Corp, United States.
J. Rosenberg, et al., SIP: Session Initiation Protocol, Jun. 2002, 269 pages, The Internet Society, United States.
Jonathan Davidson, et al., A Systematic Approach to Understanding the Basics of Voice over IP, Voice over IP Fundamentals, 2000, 421 pages, Cisco Press, United States.
John Alexander, et al., A Cisco AVVID Solution, Cisco CallManager Fundamentals, 2002, 729 pages, Cisco Press, United States.
J. Postel, RFC 768, "User Datagram Protocol", ISI, Aug. 1980, 3 pages, https://tools.ietf.org/pdf/rfc768.pdf.
J. Postel et al., RFC 793, "Transmission Control Protocol: DARPA Internet Program Protocol Specification," Sep. 1981, 89 pages, https://tools.ietf.org/pdf/rfc768.pdf.
J. Postel, RFC 821, "Simple Mail Transfer Protocol", ISI, Aug. 1982, 70 pages, https://tools.ietf.org/pdf/rfc821.pdf.
J. Mogul, J. Postel, RFC 950, "Internet Standard Subnetting Procedure," Aug. 1985, 18 pages, https://tools.ietf.org/pdf/rfc950.pdf.
H. Schulzrinne et al., RFC 1889, "RTP: A Transport Protocol for Real-Time Applications," Jan. 1996, 75 pages, https://tools.ietf.org/pdf/rfc1889.pdf.

(56) References Cited

OTHER PUBLICATIONS

P. Falstrom, Cisco Systems Inc., RFC 2916, "E.164 number and DNS," Sep. 2000, 10 pages, https://tools.ietf.org/pdf/rfc2916.pdf.
R. Stewart et al., RFC 2960, "Stream Control Transmission Protocol," Oct. 2000, 134 pages, https://tools.ietf.org/pdf/rfc2960.pdf.
G. Sidebottom et al., RFC 3332, "Signaling System 7 (SS7) Message Transfer Part 3 (MTP3)—User Adaptation Layer (M3UA)," Sep. 2002, 120 pages, https://tools.ietf.org/pdf/rfc3332.pdf.
G. Camarillo et al., RFC 3398, "Integrated Services Digital Network (ISDN) User Part (ISUP) to Session Initiation Protocol (SIP) Mapping," Dec. 2002, 68 pages, https://tools.ietf.org/pdf/rfc3398.pdf.
F. Andreasen et al., Cisco Systems, RFC 3435, "Media Gateway Control Protocol (MGCP)—Version 1.0," Jan. 2003, 210 pages, https://tools.ietf.org/pdf/rfc3435.pdf.
M. Foster et al., NeuStar, Inc., RFC 3482, "No. Portability in the Global Switched Telephone Network (GSTN): An Overview," Feb. 2003, 30 pages, https://tools.ietf.org/pdf/rfc3482.pdf.
ITU-T Recommendation H.225.0, "Call signalling protocols and media stream packetization for packet-based multimedia communication systems," 1996, https://www.itu.int/rec/T-REC-H.225.0.
ITU-T Recommendation H.245, "Control protocol for multimedia communication," 1996, https://www.itu.int/rec/T-REC-H.245/en.
ITU-T Recommendation H.248.1, "Gateway control protocol," 2002, https://www.itu.int/rec/T-REC-H.248.1.
ITU-T Recommendation H.323, "Packet-based multimedia communications systems," 1996, https://www.itu.int/rec/T-REC-H.323/.
ITU-T Recommendation X.500, "Information technology—Open Systems Interconnection—the Directory: Overview of concepts, models and services," 1988, https://www.itu.int/rec/T-REC-X.500.
Bellcore, "Bell Communications Research Specification of Signalling System No. 7" (Bell Communications Research Specification of SS7), GR-246-CORE, Issue 3, 2644 pages, Dec. 1998.
Performance Technologies, Inc., "Tutorial on Signaling System 7 (SS7)," SS7 Tutorial by Performance Technologies (www.pt.com), 23 pages, 2003.
Huitema et al., "An Architecture for Residential Internet Telephony Service," IEEE Network, May/Jun. 1999, 7 pages.
Lucent Technologies, "Definity System's Little Instruction Book for Basic Administration," Apr. 2000, 124 pages.
Cisco Systems, "Enhanced Gatekeeper Solutions Using GKTMP/API", White Paper, 2000, 12 pages.
Anerousis et al., "Tops: An Architecture for Telephony over Packet Networks," IEEE Journal on Selected Areas in Communications, vol. 17, No. 1, Jan. 1999 (18 pages).
Anonymous, "What Is ENUM?", Network World, IDG Communications, May 11, 2004, as downloaded Sep. 3, 2020 from: https://www.networkworld.com/article/2332977/lan-wan-what-is-enum.html (8 pp.).
Cisco Systems, "Cisco Gatekeeper External Interface Reference, Version 4.2," Cisco IOS Release 12.2(15)T, Mar. 2003 (146 pages).
Don Brown, "Unified Communications Using Communité," White Paper, Interactive Intelligence, May 1, 2002 (24 pages).
Vonexus, "Microsoft-based IP PBX Communications Solution: Enterprise Interaction Center," Vonexus (a wholly-owned subsidiary of Interactive Intelligence Inc., Jul. 2004 (4 pages).
Donald E. Brown, "The Interaction Center Platform," White Paper, Interactive Intelligence, Feb. 18, 2003 (35 pages).
Interactive Intelligence, Inc., "Interaction Director Technical Overview," Interaction Center 1.3, 2.1, and 2.2, Interactive Intelligence, 2003 (35 pages).
Interactive Intelligence, Inc., "Interaction SIP Proxy," Datasheet, Interactive Intelligence, Feb. 2004 (2 pages).
Bob Roaten, "IP Telephony and EIC: A Technical Overview," White Paper, Interactive Intelligence, Jul. 22, 1998 (9 pages).
David Fuller, "IP Telephony and the Interaction Center Platform," White Paper, Interactive Intelligence, Sep. 25, 2003 (29 pages).

* cited by examiner

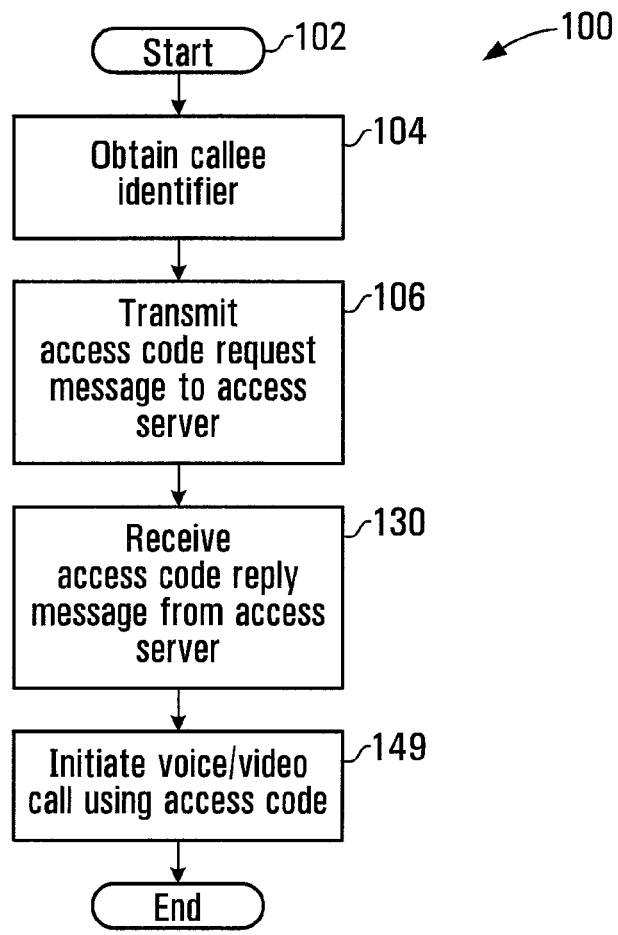
FIG. 3
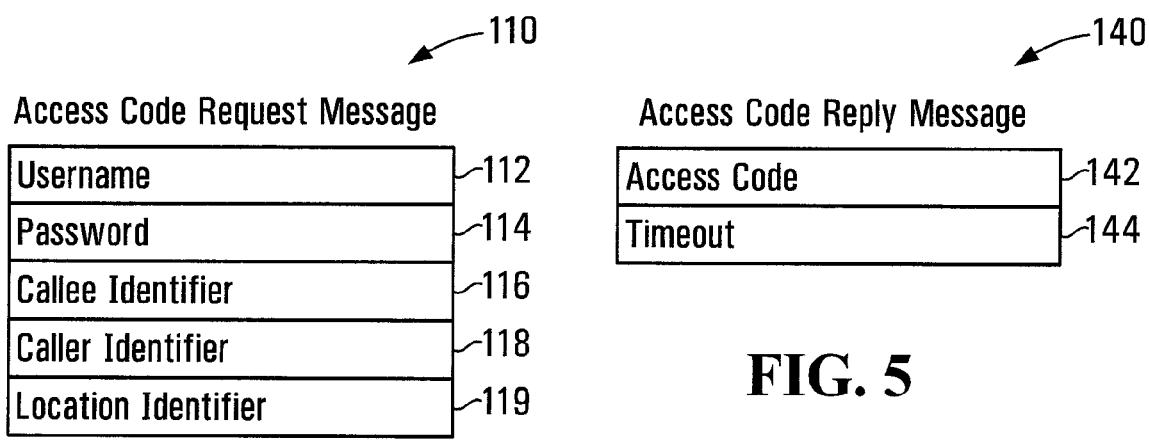
FIG. 4
FIG. 5

Dialing Profile for a User                  ← 200

| | |
|---|---|
| 202 — Username | Assigned on Subscription |
| 204 — Domain | Domain Associated with User |
| 206 — NDD | 1 |
| 208 — IDD | 011 |
| 210 — Country Code | 1 |
| 212 — Local Area Codes | 604;778 |
| 214 — Caller Minimum Local # Length | 10 |
| 216 — Caller Maximum Local # Length | 10 |
| 218 — Reseller | Retailer |
| 220 — Maximum # of concurrent calls | Assigned on Subscription |
| 222 — Current # of concurrent calls | Assigned on Subscription |
| 224 — Default Local Calling Area Identifier | Assigned on Subscription |

FIG. 9

| Local Calling Area Identifier | Access Code | Channel Identifier | Callee Identifier | Caller Identifier | Caller Username |
|---|---|---|---|---|---|
| XXXX | 1-604-345-1212 | 20 | | | |
| XXXX | 1-604-345-2323 | 22 | 1-403-789-1234 | 1-416-444-1441 | 2001 1050 8667 |
| XXXX | 1-604-345-3434 | 24 | | | |
| XXXX | 1-416-234-4646 | XX | 1-604-321-1234 | 1-416-444-1234 | 2001 1050 4141 |
| XXXX | 1-416-234-6868 | XY | | | |

| Timeout | Timestamp |
|---|---|
| 10 | 06-15-2008 10:31 |
| 10 | 06-15-2008 14:21 |

FIG. 10

SIP Invite Request Process

Gateway Node Association Table /—480

| Gateway IP Address | Node Identifier |
|---|---|
| 482— 20.14.102.5 | 2 |
| 484— 104.12.131.12 | 5 |

FIG. 19

MOBILE GATEWAY

INCORPORATION BY REFERENCE TO ANY PRIORITY APPLICATIONS

This application is a continuation of U.S. application Ser. No. 13/056,277, filed Jan. 27, 2011, entitled "Mobile Gateway", which is a national phase entry of PCT/CA2009/001062, filed Jul. 28, 2009, which claims priority to U.S. Provisional Application No. 61/129,898, filed Jul. 28, 2008, all of which are incorporated by reference in their entireties.

BACKGROUND

Field

This invention relates generally to telecommunication, and more particularly to methods, systems, apparatuses, and computer readable media for initiating or enabling a call with a mobile telephone to a callee.

Description of the Related Technologies

Mobile telephone service providers often charge significant fees for long distance telephone calls, particularly when the mobile telephone is roaming in another mobile telephone service provider's network.

One known technique for avoiding the long distance charges of mobile telephone service providers is to use a "calling card". A "calling card" may permit the user of the mobile telephone to place a call to a local telephone number or to a less-expensive telephone number (such as a toll-free number, for example) instead of placing the call directly to the callee. The user may thus avoid the long distance charges of the mobile telephone service provider, which may be higher than the charges for using the "calling card". However, this technique can be cumbersome and undesirable, because it may require the user of the mobile telephone to follow a number of complicated or cumbersome steps in order to initiate a call to the callee, for example.

SUMMARY OF CERTAIN EMBODIMENTS

In accordance with one aspect there is provided a method of initiating a call to a callee using a mobile telephone. The method involves receiving, from a user of the mobile telephone, a callee identifier associated with the callee; transmitting an access code request message to an access server, the access code request message including the callee identifier; receiving an access code reply message from the access server in response to the access code request message, the access code reply message including an access code different from the callee identifier and associated with the callee identifier; and initiating a call with the mobile telephone using the access code to identify the callee.

Transmitting may involve transmitting the access code request message to the access server on a non-voice network.

Transmitting may involve transmitting a location identifier of a location associated with the mobile telephone to the access server.

Transmitting the location identifier may involve transmitting an IP address of the mobile telephone in a wireless IP network.

Transmitting the location identifier may involve transmitting an identifier of a wireless voice signal station in wireless communication with the mobile telephone.

Transmitting the location identifier may involve transmitting a user-configured identifier of a location associated with the mobile telephone.

Receiving the access code reply message may involve receiving the access code reply message from the access server on a non-voice network.

Receiving the access code reply message may involve receiving, in the access code reply message, an access code temporarily associated with the callee identifier.

Receiving the access code reply message may involve receiving, in the access code reply message, a telephone number identifying a channel operably configured to cooperate with an IP network to cause a call involving the mobile telephone and the callee to be routed through the IP network.

Initiating the call may involve engaging a routing controller to route the call on the IP network to the callee.

The method may further involve: receiving from the mobile telephone the access code request message; communicating with a routing controller to obtain from the routing controller the access code wherein the access code identifies a channel and is useable by the mobile telephone to cause the routing controller to establish a call to the callee using the channel; and transmitting the access code reply message to the mobile telephone.

In accordance with another aspect, there is provided a mobile telephone. The mobile telephone includes: provisions for receiving, from a user of the mobile telephone, a callee identifier associated with the callee; transmitting provisions for transmitting an access code request message to an access server, the access code request message including the callee identifier; provisions for receiving an access code reply message from the access server in response to the access code request message, the access code reply message including an access code different from the callee identifier and associated with the callee identifier; and provisions for initiating a call using the access code to identify the callee.

The transmitting provisions may include a non-voice network interface for transmitting the access code request message to the access server on a non-voice network.

The access code request message may further include a location identifier of a location associated with the mobile telephone.

The location identifier may include an IP address of the mobile telephone in a wireless IP network.

The location identifier may include an identifier of a wireless voice signal station in wireless communication with the mobile telephone.

The location identifier may include a user-configured identifier of a location associated with the mobile telephone.

The provisions for receiving an access code reply message may include a non-voice network interface for receiving the access code reply message on a non-voice network.

The access code may include a telephone number.

The means for initiating may involve a mobile telephone network interface.

In accordance with another aspect, there is provided a system for initiating a call to a callee. The system includes the mobile telephone, a routing controller, and an access server. The access server includes: provisions for receiving from the mobile telephone the access code request message; provisions for communicating with the routing controller to obtain from the routing controller the access code wherein the access code identifies a channel and is useable by the mobile telephone to cause the routing controller to establish a call to the callee using the channel; and provisions for transmitting the access code reply message including the access code to the mobile telephone.

In accordance with another aspect, there is provided a mobile telephone. The mobile telephone includes a processor circuit, a network interface in communication with the processor circuit, and a computer readable medium in communication with the processor circuit and encoded with codes for directing the processor circuit to: receive, from a user of the mobile telephone, a callee identifier associated with the callee; cause an access code request message to be transmitted to an access server, the access code request message including the callee identifier; receive an access code reply message from the access server in response to the access code request message, the access code reply message including an access code different from the callee identifier and associated with the callee identifier; and initiate a call using the access code to identify the callee.

The network interface may include a non-voice network interface, and the codes for directing the processor circuit to cause the access code request message to be transmitted may include codes for directing the processor circuit to cause the access code request message to be transmitted to the access server using the non-voice network interface on a non-voice network.

The access code request message may further include a location identifier of a location associated with the mobile telephone.

The location identifier may include an IP address of the mobile telephone in a wireless IP network.

The location identifier may include an identifier of a wireless voice signal station in wireless communication with the mobile telephone.

The location identifier may include a user-configured identifier of a location associated with the mobile telephone.

The network interface may include a non-voice network interface, and the codes for directing the processor circuit to receive an access code reply message may include codes for directing the processor circuit to cause the access code reply message to be received from the access server using the non-voice network interface on a non-voice network.

The access code may include a telephone number identifying a channel operably configured to cooperate with an IP network to cause a call involving the mobile telephone and the callee to be routed through the IP network.

The network interface may include a mobile telephone network interface, and the codes for directing the processor circuit to initiate may include codes for directing the processor circuit to cause a call to be initiated using the mobile telephone network interface on a mobile telephone network.

In accordance with another aspect, there is provided a system for initiating a call to a callee. The system includes: the mobile telephone; a routing controller; and an access server comprising a processor circuit and a computer readable medium in communication with the processor circuit. The computer readable medium is encoded with codes for directing the processor circuit to: receive from the mobile telephone the access code request message; communicate with the routing controller to obtain from the routing controller the access code wherein the access code identifies a channel and is useable by the mobile telephone to cause the routing controller to establish a call to the callee using the channel; and transmit the access code reply message to the mobile telephone.

In accordance with another aspect, there is provided a computer readable medium encoded with codes for directing a processor circuit to: receive, from a user of a mobile telephone, a callee identifier associated with a callee; transmit an access code request message to an access server, the access code request message including the callee identifier; receive an access code reply message from the access server in response to the access code request message, the access code reply message including an access code different from the callee identifier and associated with the callee identifier; and initiate a call using the access code to identify the callee.

In accordance with another aspect, there is provided a method for enabling a mobile telephone to initiate a call to a callee through a channel. The method involves: receiving from the mobile telephone an access code request message including a callee identifier associated with the callee; communicating with a routing controller to obtain from the routing controller an access code identifying the channel, the access code being different from the callee identifier and useable by the mobile telephone to initiate a call to the callee using the channel; and transmitting an access code reply message including the access code to the mobile telephone.

Receiving may involve receiving the access code request message on a non-voice network.

The method may further involve causing the routing controller to produce the access code.

Producing may involve selecting the access code from a pool of access codes, where each access code in the pool of access codes identifies a respective telephone number.

The method may further involve determining a local calling area associated with the mobile telephone.

Determining may involve accessing a dialing profile associated with the caller, the dialing profile including a location field having contents identifying at least a default location of the caller.

Determining may involve receiving an IP address of the mobile telephone in a wireless IP network.

Determining may involve receiving an identifier of a wireless voice signal station in wireless communication with the mobile telephone.

Determining may involve receiving a user-configured identifier of a location associated with the mobile telephone.

Selecting may involve selecting an access code in the local calling area associated with the mobile telephone.

Each access code in the pool of access codes may further identify a respective channel operably configured to cooperate with an IP network to cause a call involving the mobile telephone and the callee to be routed through the IP network.

The method may further involve causing the routing controller to establish communication through the IP network in response to a call received on the channel.

Producing may further involve storing a caller identifier associated with the mobile telephone in association with the access code.

Causing the routing controller to establish communication may involve causing the routing controller to establish communication only if the caller identifier associated with the access code identifies the mobile telephone.

Producing may further involve storing the callee identifier in association with the access code.

Producing may further involve searching the pool of access codes for an access code associated with the callee identifier to identify the channel usable by the mobile telephone to initiate a call to the callee.

Producing may further involve storing, in association with the access code, a timestamp for use in determining when the usability of the access code to initiate a call to the callee will expire.

Causing the routing controller to establish communication may involve causing the routing controller to establish communication only if the usability of the access code to initiate a call to the callee has not expired.

Transmitting may involve transmitting the access code reply message on a non-voice network.

In accordance with another aspect, there is provided a system for enabling a mobile telephone to initiate a call to a callee through a channel. The system includes: provisions for receiving from the mobile telephone an access code request message including a callee identifier associated with the callee; provisions for communicating with the routing controller to obtain from the routing controller an access code identifying the channel, the access code being different from the callee identifier and useable by the mobile telephone to initiate a call to the callee using the channel; and provisions for transmitting an access code reply message including the access code to the mobile telephone.

The provisions for receiving may include a non-voice network interface for receiving the access code request message on a non-voice network.

The system may further include provisions for producing the access code.

The provisions for producing may include a processor circuit operably configured to select the access code from a pool of access codes, where each access code in the pool of access codes identifies a respective telephone number.

The processor circuit may be operably configured to determine a local calling area associated with the mobile telephone.

The processor circuit may be operably configured to determine a local calling area associated with the mobile telephone using a dialing profile associated with the caller, the dialing profile including a location field having contents identifying at least a default location of the caller.

The processor circuit may be operably configured to determine a local calling area associated with the mobile telephone using an IP address of the mobile telephone in a wireless IP network.

The processor circuit may be operably configured to determine a local calling area associated with the mobile telephone using an identifier of a wireless voice signal station in wireless communication with the mobile telephone.

The processor circuit may be operably configured to determine a local calling area associated with the mobile telephone using a user-configured identifier of a location associated with the mobile telephone.

The processor circuit may be operably configured to select an access code in the local calling area associated with the mobile telephone.

Each access code in the pool of access codes may further identify a respective channel operably configured to cooperate with an IP network to cause a call involving the mobile telephone and the callee to be routed through the IP network.

The processor circuit may be operably configured to establish communication through the IP network in response to a call received on the channel.

The processor circuit may be operably configured to store a caller identifier associated with the mobile telephone in association with the access code.

The processor circuit may be operably configured to cause the routing controller to establish communication only if the caller identifier associated with the access code identifies the mobile telephone.

The processor circuit may be operably configured to store the callee identifier in association with the access code.

The processor circuit may be operably configured to search the pool of access codes for an access code associated with the callee identifier to identify the channel usable by the mobile telephone to initiate a call to the callee.

The processor circuit may be operably configured to store, in association with the access code, a timestamp for use in determining when the usability of the access code to initiate a call to the callee will expire.

The processor circuit may operably configured to establish communication only if the usability of the access code to initiate a call to the callee has not expired.

The provisions for transmitting may include a non-voice network interface for transmitting the access code reply message on a non-voice network.

In accordance with another aspect, there is provided a system for enabling a mobile telephone to initiate a call to a callee through a channel. The system includes a processor circuit, a network interface in communication with the processor circuit, and a computer readable medium in communication with the processor circuit and encoded with codes for directing the processor circuit to: receive from the mobile telephone an access code request message including a callee identifier associated with the callee; communicate with the routing controller to obtain from the routing controller an access code identifying the channel, the access code being different from the callee identifier and useable by the mobile telephone to initiate a call to the callee using the channel; and cause an access code reply message including the access code to be transmitted to the mobile telephone.

The network interface may include a non-voice network interface, and the codes for directing the processor circuit to receive may include codes for directing the processor circuit to cause the access code request message to be received using the non-voice network interface on a non-voice network.

The computer readable medium may be further encoded with codes for directing the processor circuit to cause the access code to be produced.

The codes for directing the processor circuit to cause the access code to be produced may cause the access code to be selected from a pool of access codes, where each access code in the pool of access codes identifies a respective telephone number.

The computer readable medium may be further encoded with codes for directing the processor circuit to cause to be determined a local calling area associated with the mobile telephone.

The codes for directing the processor circuit to cause to be determined may cause a dialing profile associated with the caller to be accessed, the dialing profile including a location field having contents identifying at least a default location of the caller.

The codes for directing the processor circuit to cause to be determined may cause to be received an IP address of the mobile telephone in a wireless IP network.

The codes for directing the processor circuit to cause to be determined may cause to be received an identifier of a wireless voice signal station in wireless communication with the mobile telephone.

The codes for directing the processor circuit to cause to be determined may cause to be received a user-configured identifier of a location associated with the mobile telephone.

The codes for directing the processor circuit to cause the access code to be produced may further cause to be selected an access code in the local calling area associated with the mobile telephone.

Each access code in the pool of access codes may further identify a respective channel operably configured to cooperate with an IP network to cause a call involving the mobile telephone and the callee to be routed through the IP network.

The computer readable medium may be further encoded with codes for directing the processor circuit to cause communication through the IP network to be established in response to a call received on the channel.

The codes for directing the processor circuit to cause the access code to be produced may cause a caller identifier associated with the mobile telephone to be stored in association with the access code.

The codes for directing the processor circuit to cause communication to be established may cause communication to be established only if the caller identifier associated with the access code identifies the mobile telephone.

The codes for directing the processor circuit to cause the access code to be produced may cause the callee identifier to be stored in association with the access code.

The codes for directing the processor circuit to cause the access code to be produced may cause the pool of access codes to be searched for an access code associated with the callee identifier to identify the channel usable by the mobile telephone to initiate a call to the callee.

The codes for directing the processor circuit to cause the access code to be produced may cause a timestamp for use in determining when the usability of the access code to initiate a call to the callee will expire, to be stored in association with the access code.

The codes for directing the processor circuit to cause communication to be established may cause communication to be established only if the usability of the access code to initiate a call to the callee has not expired.

The network interface may include a non-voice network interface, and the codes for directing the processor circuit to transmit include codes for directing the processor circuit to cause the access code reply message to be transmitted using the non-voice network interface on a non-voice network.

In accordance with another aspect, there is provided a computer readable medium encoded with codes for directing a processor circuit to: receive from the mobile telephone an access code request message including a callee identifier associated with the callee; communicate with the routing controller to obtain from the routing controller an access code identifying the channel, the access code being different from the callee identifier and useable by the mobile telephone to initiate a call to the callee using the channel; and cause an access code reply message including the access code to be transmitted to the mobile telephone.

Other aspects and features will become apparent to those ordinarily skilled in the art upon review of the following description of specific embodiments of the invention in conjunction with the accompanying figures.

BRIEF DESCRIPTION OF THE DRAWINGS

In drawings which illustrate embodiments,

FIG. 3 is a flow chart of a process executed by the mobile telephone shown in FIG. 1;

FIG. 4 is a schematic representation of an access code request message transmitted between the mobile telephone and an access server shown in FIG. 1;

FIG. 5 is a schematic representation of an access code reply message transmitted between the mobile telephone and the access server shown in FIG. 1;

FIG. 9 is a tabular representation of a dialing profile stored in a database accessible by the routing controller illustrated in FIG. 1;

FIG. 10 is a tabular representation of an access code association table stored in memory accessible by the routing controller shown in FIG. 1;

FIG. 19 is a tabular representation of a gateway node association table stored in the database illustrated in FIG. 1.

DETAILED DESCRIPTION OF CERTAIN EMBODIMENTS

Figure 1:
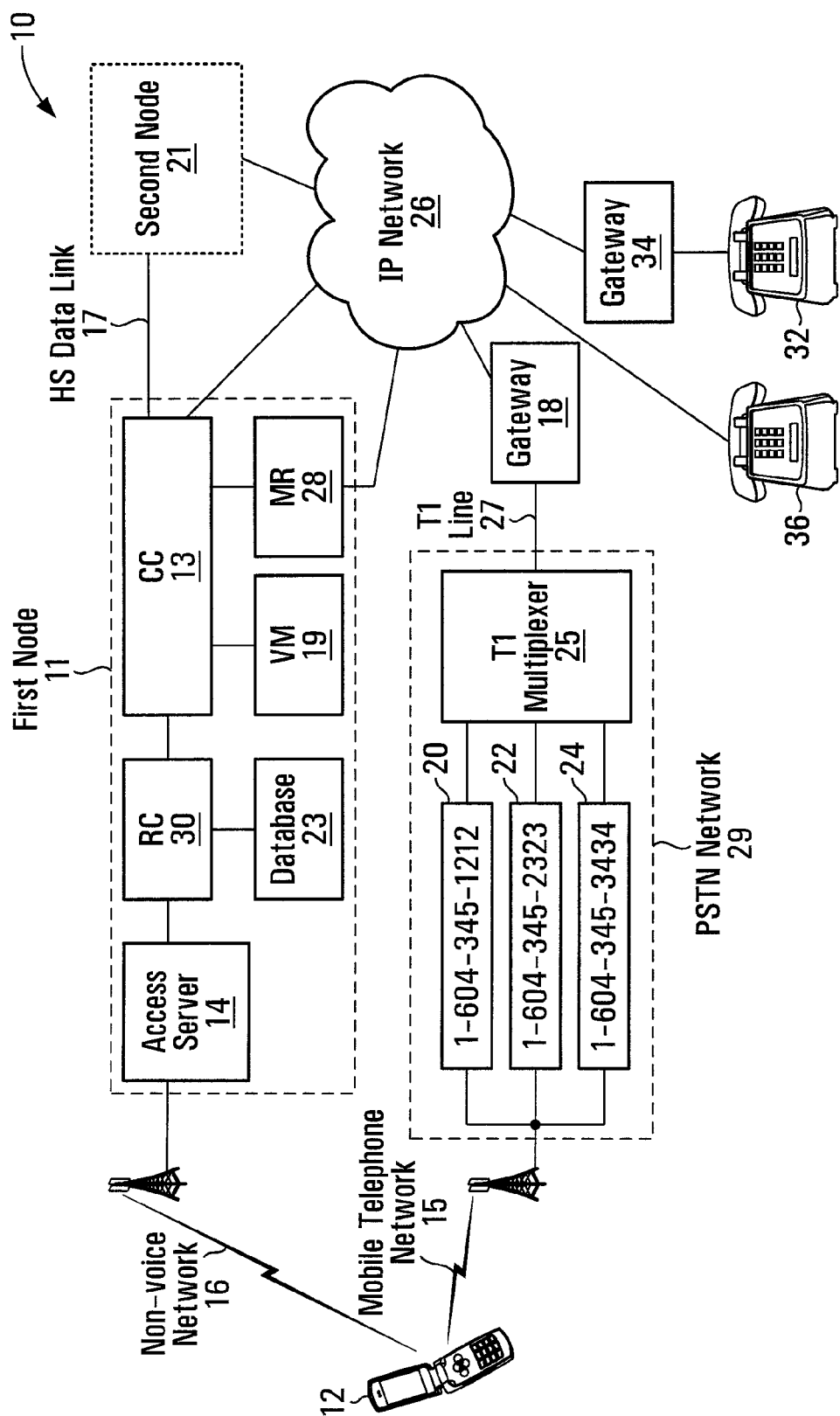
FIG. 1 is a block diagram of a system for enabling a mobile telephone to initiate a call through a channel to a callee in accordance with a first embodiment in the invention.

Referring to FIG. 1, a system for enabling a mobile telephone to initiate a call to a callee is shown generally at 10. The system 10 includes a first node 11, a second node 21, and a mobile telephone 12.

The first and second nodes 11 and 21 in the illustrated embodiment may support "voice-over-IP" (VoIP) calls between telephones and/or videophones using the Internet Protocol (IP), as described in PCT Publication No. WO 2008/052340, which is hereby incorporated by reference in its entirety herein. In the embodiment shown, the first node 11 is located in a geographical area, such as Vancouver, British Columbia, Canada, for example, and the second node 21 is located in London, England, for example. Different nodes may be located in different geographical regions throughout the world to provide telephone/videophone service to subscribers in respective regions. These nodes may be in communication with each other by high speed/high data throughput links including optical fiber, satellite, and/or cable links illustrated generally at 17, forming a backbone to the system. These nodes may alternatively, or in addition, be in communication with each other through conventional internet services.

In the embodiment shown, the first node 11 provides telephone/videophone service to western Canadian customers from Vancouver Island to Ontario. Another node (not shown) may be located in Eastern Canada to provide services to subscribers in that area, for example.

Other nodes of the type shown may also be employed within the geographical area serviced by a node to provide for call load sharing, for example, within a region of the geographical area serviced by the node. However, in general, all nodes may be similar and have the properties described in connection with the first node 11.

In this embodiment, the first node 11 includes a call controller (CC) 13, an access server 14, a routing controller (RC) 30, a database 23, a voicemail server 19, and a media relay 28. Each of these may be implemented as separate modules on a common computer system or by separate computers, for example. The voicemail server 19 need not be included in the node and can be provided by a third party service provider. Although the access server 14 is illustrated as being part of the first node 11, access servers in alternative embodiments may be separate from the node and may be in communication with one or more nodes, for example.

The mobile telephone 12 is configured to place calls over a mobile telephone network, illustrated generally at 15, in a manner well-known in the art. Furthermore, the mobile telephone 12 and the access server 14 are configured to communicate with each other, preferably on a non-voice network illustrated generally at 16, such as a "WiFi" wireless IP network or a General Packet Radio Service (GPRS) network, for example. However, in alternative embodiments, the mobile telephone 12 and the access server 14 may communicate with each other over other networks, such as a mobile telephone network using Short Message Service (SMS) messages, for example.

The system 10 further includes a gateway 18 in communication with at least one, and preferably a plurality of, channels, which are illustrated schematically at 20, 22, and 24, to which the mobile telephone 12 may initiate a call over the mobile telephone network 15. The channels 20, 22, and 24 maybe telephone lines in a Public Switched Telephone Network (PSTN) 29. The channels 20, 22, and 24 maybe associated with PSTN telephone numbers in a local calling area associated with the mobile telephone 12, and thus these channels preferably depend on a geographical location of the mobile telephone. The expression "local calling area" herein refers generally to a set of telephone numbers, typically defined by a geographical region, to which telephone calls may be placed by callers within the local calling area at either no additional charge or at a lower additional charge than would be required for calls to numbers that are outside of the local calling area. However, it will be appreciated that in other embodiments, the gateway 18 may be in communication with any number of channels, which need not be PSTN telephone lines. Also, in the illustrated embodiment, the channels 20, 22, and 24 are associated with telephone numbers for Vancouver, British Columbia, Canada and the surrounding area, although it will be appreciated that these channels may include PSTN telephone lines associated with other areas, for example, which may not necessarily be in a local calling area associated with the mobile telephone 12.

In the illustrated embodiment, each of the channels 20, 22, and 24 is configured by a PSTN service provider (which, in Canada, may be Bell Canada or Telus, for example) to direct calls that are received on the channels to the gateway 18. In the illustrated embodiment, the PSTN service provider has configured the channels 20, 22, and 24 to communicate with a T1 multiplexer 25, which multiplexes the channels 20, 22, and 24 in a manner known in the art onto one or more T1 lines 27 that are in communication with the gateway 18. The gateway 18 is in communication with an IP network shown generally at 26. The channels 20, 22, and 24 are thus configured to cooperate with the IP network 26 (via the gateway 18 in the illustrated embodiment) to cause a call involving the mobile telephone 12 and the callee to be routed through the IP network in response to a call received at one of the channels.

Also, in the illustrated embodiment, the access server 14 is in communication with the routing controller 30 of the first node 11, and the routing controller 30 is configurable to associate a callee identifier with one of the channels 20, 22, and 24, as described below. A callee identifier associated with one of the channels 20, 22, and 24 may be a telephone number of a PSTN telephone 32 that is in communication with the IP network 26 through a gateway 34, or it may be a telephone number of a VoIP telephone 36 that is directly in communication with the IP network 26, for example. Other routing controllers 30 of other nodes, such as the second node 21, for example, may also associate callee identifiers with other channels that are in communication with other gateways (not shown).

Mobile Telephone

Figure 2:
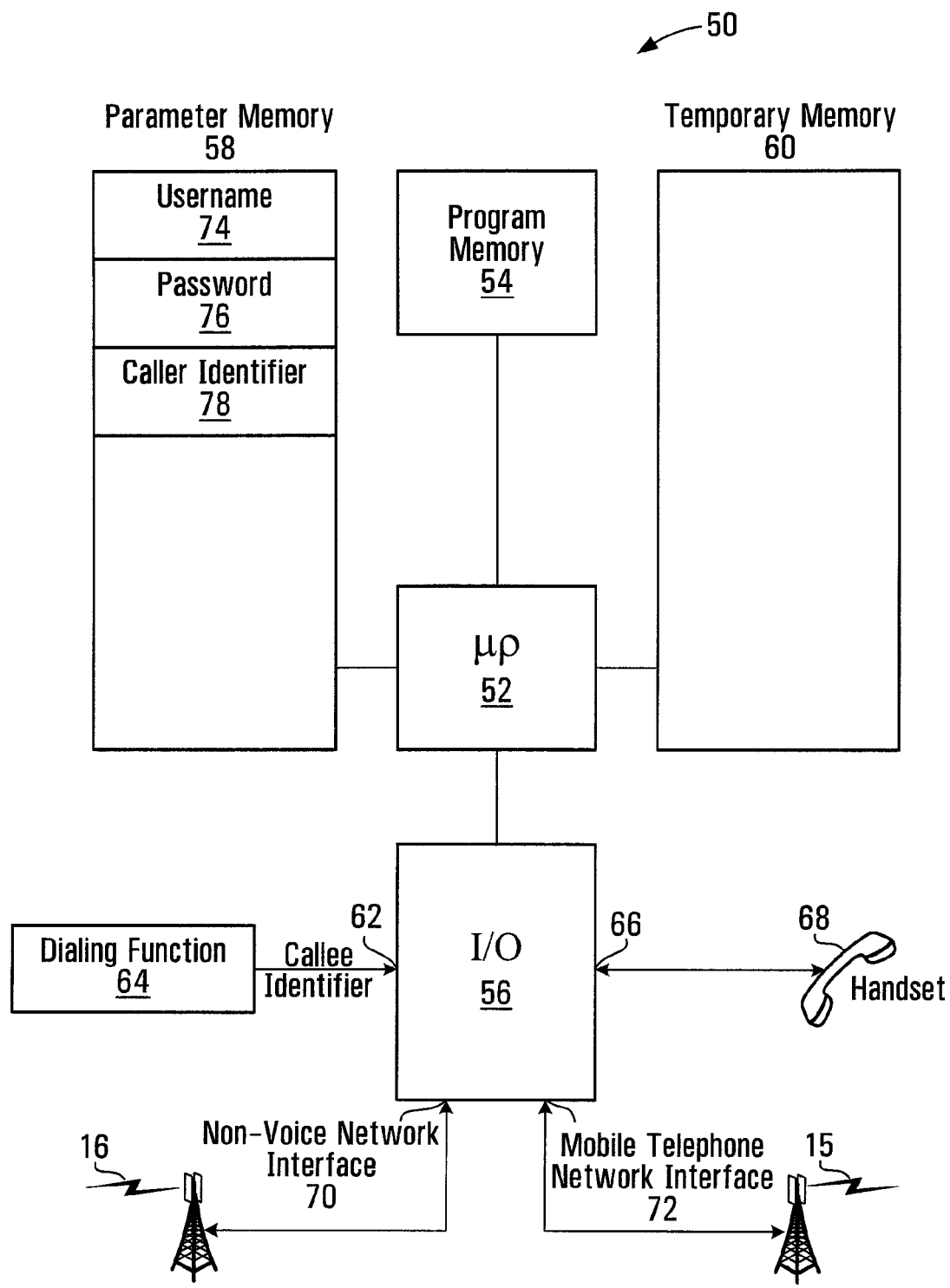
FIG. 2 is a block diagram of mobile telephone shown in FIG. 1.

Referring to FIG. 2, in this embodiment, the mobile telephone (12) includes a processor circuit shown generally at 50. The processor circuit 50 includes a microprocessor 52, a program memory 54, an input/output (I/O) port 56, parameter memory 58, and temporary memory 60. The program memory 54, I/O port 56, parameter memory 58, and temporary memory 60 are all in communication with the microprocessor 52. The processor circuit 50 may alternatively include a plurality of processors, a plurality of program memories, a plurality of temporary memories, and/or a plurality of I/O ports, or these components may alternatively be combined into a single device. However, for simplicity, the components of the processor circuit 50 are illustrated as shown in the example of FIG. 2.

In the illustrated embodiment, the I/O port 56 includes a dialing input 62 for receiving a callee identifier from a key pad, for example, or from a voice recognition unit, or from pre-stored callee identifiers stored in the parameter memory 58, for example. For illustration purposes only, a myriad of possible dialing functions for providing a callee identifier are represented by the block entitled dialing function 64. A callee identifier may be a telephone number of a callee, for example.

The I/O port 56 also includes a handset interface 66 for receiving and producing signals to and from a handset 68 that may be placed close to the user's ear and mouth, for producing and receiving audible signals for and from the user. It will be appreciated that alternatively, the handset 68 may include a camera and video screen, for example, and that video or other types of signals may be transmitted additionally or alternatively to audible signals.

The I/O port 56 also includes a non-voice network interface 70 for transmitting information to, and receiving information from, the non-voice network 16 illustrated in FIG. 1, for example, and preferably interfaces with a high-speed internet connection.

The I/O port 56 in the illustrated embodiment further includes a mobile telephone network interface 72 for transmitting signals to and receiving signals from a mobile telephone service provider over a network such as a Global System for Mobile communications (GSM) or a Code Division Multiple Access (CDMA) network, such as the mobile telephone network 15 illustrated in FIG. 1, for example. Again, for simplicity, a mobile telephone network interface is illustrated, although it will be appreciated that video signals or other signals may be handled similarly when the mobile telephone (12) is facilitating communication of one or more of these types of signals. It will also be appreciated that alternatively, the non-voice network interface 70 and mobile telephone network interface 72 need not be distinct, but may be a single interface for communication over a single network, for example, or may be configured to communicate over a plurality of different networks, for example.

In the illustrated embodiment, the parameter memory 58 includes a username field 74 and a password field 76, although it will be appreciated that the username and password may not be necessary, or may be input by the user as required, for example. The parameter memory 58 in the illustrated embodiment also includes a caller identifier field 78 for storing a caller identifier, which may be a telephone number associated with the mobile telephone (12) for identifying a "channel" such as a telephone line assigned to the mobile telephone that may be used to call back to the mobile telephone, for example. Generally, the contents of the username field 74, the password field 76, and the caller identifier field 78 are set once when the user first subscribes to the system.

The usernames referred to herein, such as the username in the username field 74, preferably include a twelve digit number such as 2001 1050 8667, for example, wherein the left-most digit is a continent code (such as "2" to indicate North America, for example), followed by a three-digit country code (such as "001" to indicate Canada and the United States, for example), a four-digit dealer code (such as "1050", for example), and a unique four-digit number code (such as "8667", for example), as discussed more generally in PCT Publication No. 2008/052340. Therefore, a prefix of a username referred to herein preferably indicates a geographical region associated with the user, or with the access code, and more preferably indicates a node associated with the user or access code.

The program memory 54 stores blocks of codes for directing the microprocessor 52 to carry out the functions of the mobile telephone (12), which are illustrated by example below.

Referring to FIGS. 2 and 3, a flow chart representing functions performed by blocks of code that direct the microprocessor 52 to initiate a call with the mobile telephone 12 to a callee is shown generally at 100. The blocks shown in FIG. 3 generally represent codes that may be stored in the program memory 54 for example, for directing the microprocessor 52 to perform various functions relating to initiating a call with the mobile telephone (12) to a callee. The actual code to implement each block may be written in any suitable programming language, such as Java, C, and/or C++, for example.

The process 100 begins at 102, in response to an interrupt produced at or for the microprocessor 52 by the dialing function 64. Upon initiation of the process 100, block 104 directs the microprocessor 52 to obtain a callee identifier from the dialing function 64 at the dialing input 62 of the I/O port 56 in the illustrated embodiment. The callee identifier is associated with a desired callee, and may be a telephone number of the callee, for example. The microprocessor 52 thus receives, from a user of the mobile telephone (12), a callee identifier associated with a callee.

Block 106 directs the microprocessor 52 to transmit, using the non-voice network interface 70 in the illustrated embodiment, an access code request message, the access code request message including the callee identifier obtained at block 104, to the access server 14 (illustrated in FIG. 1). In general, preferably block 106 directs the microprocessor 52 to cause an access code request message to be transmitted to the access server 14 over a non-voice network, such as an internet, using WiFi or GPRS technology for example. However, it will be appreciated that block 106 may direct the microprocessor 52 to transmit an access code request message to the access server 14 using any suitable technique, which may alternatively include a voice network, for example.

Referring to FIG. 4, an exemplary access code request message is shown generally at 110. The access code request message 110 includes a username field 112, a password field 114, a callee identifier field 116, and a caller identifier field 118. In the illustrated embodiment, values for the username, password, and caller identifier fields 112, 114, and 118 are retrieved from the username, password, and caller identifier fields 74, 76, and 78 respectively in the parameter memory 58 of the processor circuit 50 (illustrated in FIG. 2), and a value for the callee identifier field 116 is obtained from the dialing function 64 in block 104, and may be stored in the temporary memory (60), for example. It will be appreciated that the username field 112, password field 114, and caller identifier field 118 are not essential, although these fields are preferable in order to identify the user of the mobile telephone for billing purposes, for example.

Referring to FIGS. 1 and 4, it will be appreciated that in order to minimize charges from the mobile telephone service provider of the mobile telephone 12, the channels 20, 22, 24 will preferably be local or relatively inexpensive telephone lines associated with a geographical location, more particularly a pre-defined local calling area, associated with the mobile telephone 12. Therefore, the exemplary access code request message 110 further includes a location identifier field 119. The location identifier stored in the location identifier field 119 preferably identifies a location of the mobile telephone 12 for use in determining a local calling area associated with the mobile telephone 12.

For example, the location identifier in the location identifier field 119 may include an IP address of the mobile telephone 12 in a wireless IP network, such as the non-voice network 16 to which the non-voice network interface 70 shown in FIG. 2 is connected, because this IP address may be an indicator of a geographical location of the mobile telephone 12. The location identifier may also or alternatively include an identifier of a wireless voice signal station in wireless communication with the mobile telephone. In the illustrated embodiment, the wireless voice signal station is part of the mobile telephone network 15 that is in communication with the mobile telephone 12 through the mobile telephone network interface 72 illustrated in FIG. 2. In still other embodiments, the location identifier may include a user-configured identifier of a geographical location or local calling area where the mobile telephone 12 is or may be situated. The location identifier may thus be pre-determined and stored in the parameter memory 58 shown in FIG. 2 or may be acquired from non-voice network or wireless voice signal station or from user input, for example. Therefore, in summary, the location identifier in the location identifier field 119 may include one or more of an IP address of the mobile telephone 12 in a wireless IP network, an identifier of a wireless voice signal station in wireless communication with the mobile telephone, and a user-configured identifier.

As described below, the location identifier in the location identifier field 119 may be used to determine a local calling area associated with the mobile telephone 12, within which local calling area channels (illustrated as 20, 22, and 24 in FIG. 1) are available to the mobile telephone 12 for the lowest cost to the user. However, it will be appreciated that the location identifier may only approximately identify a local calling area, and may not necessarily identify the lowest cost channel (illustrated as 20, 22, and 24 in FIG. 1) for the mobile telephone 12. It will also be appreciated that in other embodiments, the location identifier field 119 may be omitted.

Referring back to FIG. 3, the process 100 continues at block 130, which directs the microprocessor (52) to receive an access code reply message from the access server (14) in response to the access code request message that was transmitted at block 106.

Referring to FIG. 5, an exemplary access code reply message is shown generally at 140. The access code reply message 140 includes an access code field 142 and a timeout field 144. In the illustrated embodiment, the access code field 142 stores an access code which is a telephone number associated with a telephone line associated with one of the channels 20, 22, or 24 in FIG. 1. It will be appreciated that the access code is different from the callee identifier in the callee identifier field 116 shown in FIG. 4, in that the access code identifies a channel, other than that provided by the callee identifier provided by the dialing function 64 in FIG. 2, that the mobile telephone (12) can use to initiate a call to the callee. It will be appreciated that use of the access code facilitates avoidance of long distance or roaming charges that a mobile telephone service provider would charge for a call placed directly using the callee identifier using conventional calling processes, for example.

Still referring to FIG. 5, the timeout field 144 in the illustrated embodiment stores a value that indicates a period of time, for example a number of minutes, during which the access code in the access code field 142 is associated with the callee identifier in the callee identifier field 116 of the exemplary access code request message 110 illustrated in FIG. 4, such that the access code is only temporarily associated with the callee identifier. In one embodiment, the value stored in the timeout field 144 indicates 10 minutes, for example. It will be appreciated that in other embodiments, the timeout field 144 may not be necessary, but preferably it is included.

In the illustrated embodiment, the program codes in block 130 direct the microprocessor 52 to receive the access code reply message over a non-voice network, such as a WiFi or GPRS network (illustrated at 16 in FIG. 1) via the non-voice network interface 70 shown in FIG. 2. However, it will be appreciated that the access code reply message may be received on any suitable network, even a voice network, for example.

Referring back to FIGS. 2 and 3, block 149 directs the microprocessor 52 to initiate a call with the mobile telephone (12) on the mobile telephone network 15 (illustrated in FIG. 1) using the access code received in the access code field 142 of the access code reply message 140 (shown in FIG. 5) to identify the callee. In the illustrated embodiment, the codes in block 149 direct the microprocessor 52 to initiate a call to the channel (20, 22, or 24) identified by the access code, using the mobile telephone network interface 72 of the I/O port 56 of the mobile telephone (12), to engage the mobile telephone network (15).

Referring to FIG. 1, in the embodiment shown, the access code in the access code field (142) is a telephone number identifying a channel 20, 22, or 24 that is in communication with the gateway 18 to the IP network 26. Through the gateway 18, the channel 20, 22, or 24 is thus operably configured to cooperate with the IP network 26 to cause a call from the mobile telephone 12 to the callee to be routed through the IP network. Routing the call through the IP network may involve engaging the routing controller 30 to route the call on the IP network 26 to the callee, as described below. However, it will be appreciated that in other embodiments, the access code need not be a telephone number, but may be any code identifying a channel through which the mobile telephone 12 can initiate a call. Alternatively, if the mobile telephone is capable of voice over IP communications, the access code may be used to identify an IP address in the IP network 26 to which the call is routed. In this embodiment, the IP address may act as the access code. The process 100 shown in FIG. 3 is then ended.

Access Server

Figure 6:
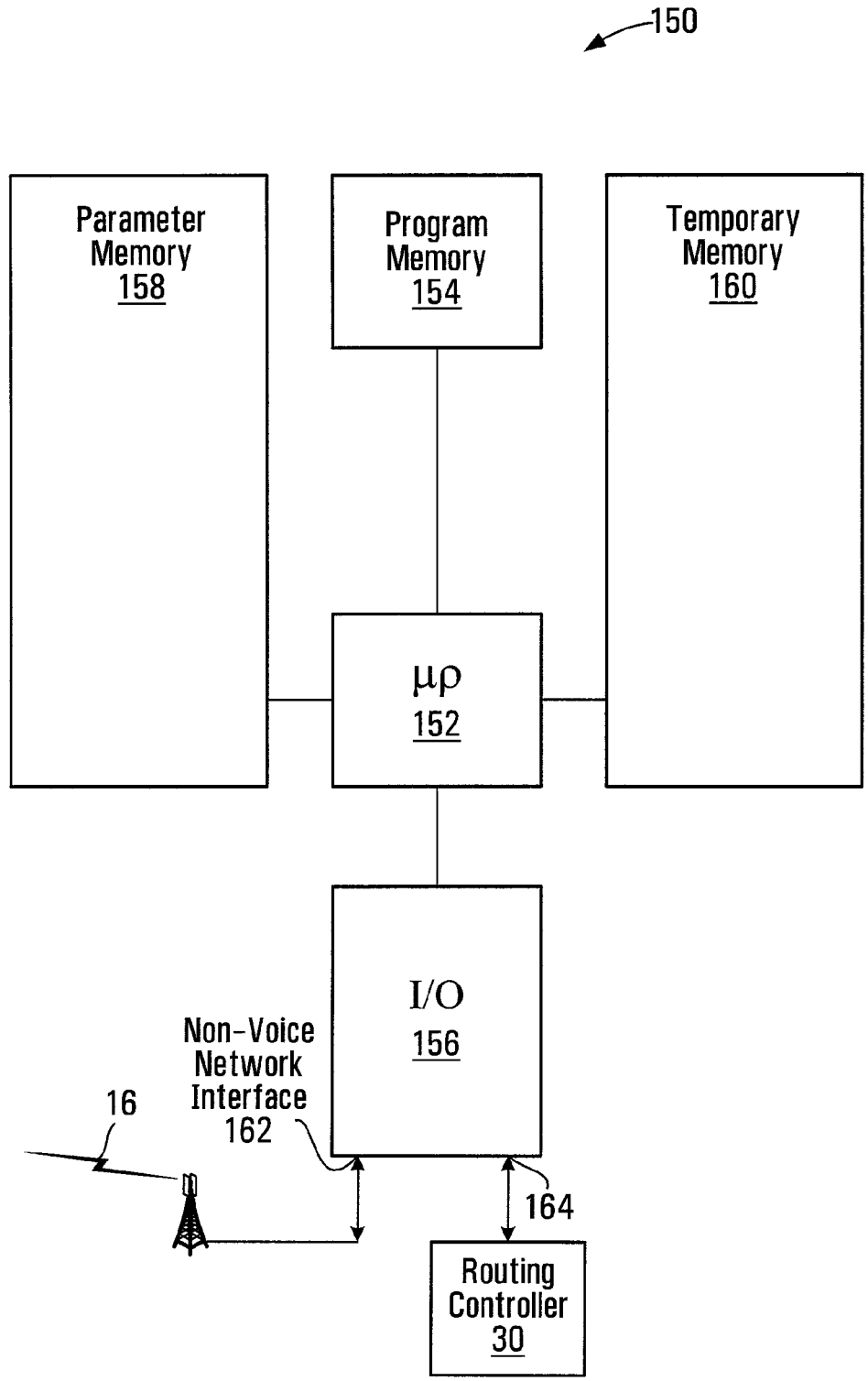
FIG. 6 is a block diagram of the access server shown in FIG. 1.

Referring to FIG. 6, the access server (14) includes a processor circuit shown generally at 150. The processor circuit 150 includes a microprocessor 152, program memory 154, an I/O port 156, parameter memory 158, and temporary memory 160. The program memory 154, I/O port 156, parameter memory 158, and temporary memory 160 are all in communication with the microprocessor 152. The processor circuit 150 may alternatively include a plurality of microprocessors or I/O ports, for example, and the components of the illustrated processor circuit 150 may also alternatively be combined into a single device.

The program memory 154 stores blocks of codes for directing the microprocessor 152 to carry out the functions of the access server 14. The I/O port 156 includes a non-voice network interface 162 for communicating with the non-voice network 16 illustrated in FIG. 1. The I/O port 156 also includes a routing controller interface 164 for interfacing with the routing controller 30 illustrated in FIG. 1.

Figure 7:
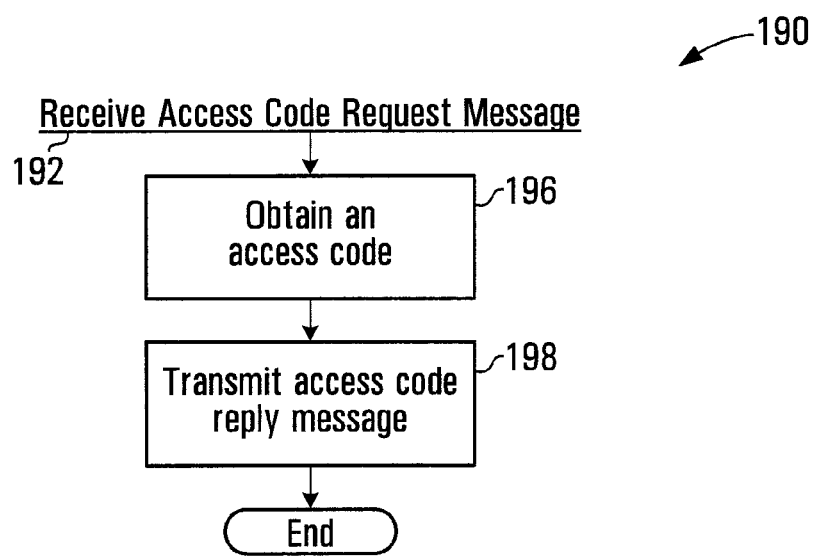
FIG. 7 is a flow chart of a process executed by the access server shown in FIG. 1.

Referring to FIGS. 6 and 7, a flow chart of blocks of code for directing the microprocessor 152 of the access server (14) to provide an access code to the mobile telephone (12) is shown generally at 190. The blocks 190 in FIG. 7 generally represent codes that may be stored in the program memory 154 for directing the microprocessor 152 to perform various functions to provide the access to the mobile telephone (12) to enable the mobile telephone to place a call through a channel (20, 22, or 24).

The process 190 begins at 192, in response to an interrupt created by or for the microprocessor 152 when it receives an access code request message 110 (as illustrated in FIG. 4) from the mobile telephone (12). In the illustrated embodiment, the access code request message (110) is received via the non-voice network interface 162 through a non-voice network (16) such as a WiFi or GPRS network, for example. However, it will be appreciated that other embodiments may use different techniques for receiving the access code request message (110) from the mobile telephone (12).

The process 190 continues at block 196, which directs the microprocessor 152 to communicate with the routing controller 30 to obtain from the routing controller an access code identifying a channel (illustrated as 20, 22, or 24 in FIG. 1) in communication with the gateway (18), wherein the access code is different from the callee identifier in the callee identifier field 116 (shown in FIG. 4) and is usable by the mobile telephone (12) to initiate a call to the callee using the channel, as further described below. Therefore, block 196 preferably causes an access code to be produced by retransmitting the access code request message 110 illustrated in FIG. 4 that was received at 192 from the mobile telephone (12), to the routing controller 30 through the routing controller interface 164 of the I/O port 156.

The process 190 continues at block 198, which directs the microprocessor 152 to transmit an access code reply message (140), including the access code obtained by block 196, to the mobile telephone (12). An exemplary access code reply message is shown in FIG. 5. In the illustrated embodiment, an access code reply message (140) is produced by the routing controller 30 in a manner described below in response to the access code request message (110) that was transmitted to the routing controller at block 196, and the access code reply message (140) is received from the routing controller through the routing controller interface 164 of the I/O port 156. Block 198 then causes the access code reply message that was received from the routing controller to be retransmitted to the mobile telephone (12). In the illustrated embodiment, the codes in block 198 direct the microprocessor 152 to transmit the access code reply message (140) using the non-voice network interface 162 to the non-voice network 16, which may be a WiFi or GPRS network, for example. However, it will be appreciated that other embodiments may employ other types of networks for communicating the access code reply message (140) to the mobile telephone (12). The process 190 is then ended.

In summary, referring to FIG. 1, the access server 14 generally acts as an interface to the routing controller 30 for relaying access code request messages and access code reply messages between the mobile telephone 12 and the routing controller. Therefore, it will be appreciated that in alternative embodiments, the access server 14 and the routing controller 30 need not be separate, but may, for example, be combined in a single component.

Routing Controller (RC)

Referring to FIG. 1, generally, the routing controller 30 executes a process to facilitate communication between callers and callees. The function of a routing controller generally in a VoIP system is described in PCT Publication No. WO 2008/052340.

Figure 8:
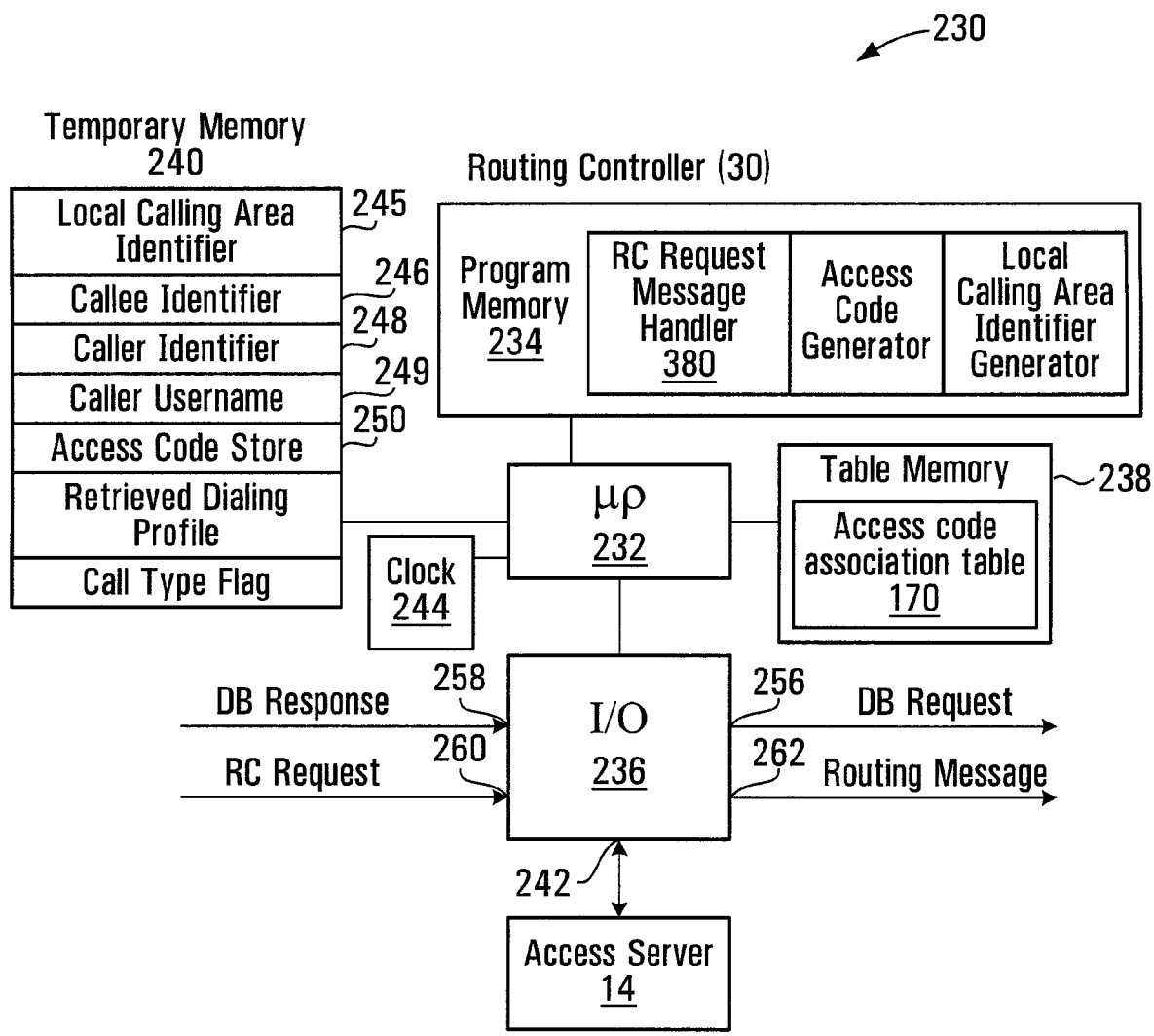
FIG. 8 is a block diagram of a routing controller shown in FIG. 1.

Referring to FIG. 8, the routing controller (30) includes a processor circuit shown generally at 230. The processor circuit 230 includes a microprocessor (or more generally a processor) 232, program memory 234, an I/O port 236, table memory 238, temporary memory 240, and a clock 244. The program memory 234, I/O port 236, table memory 238, temporary memory 240, and clock 244 are all in communication with the processor 232. The processor circuit 230 may include a plurality of microprocessors, for example, and the aforementioned components of the processor circuit 230 may be combined, for example. The program memory 234 includes blocks of code for directing the processor 232 to carry out the functions of the routing controller (30), and the I/O port 236 includes an access server interface 242 for communicating with the access server 14.

In the illustrated embodiment as described above, the access server (14) transmits (at block 196 illustrated in FIG. 7) an access code request message (110) to the routing controller (30) in order to obtain from the routing controller (30) an access code. When an access code request message (110) is received at the access server interface 242, the processor 232 preferably stores certain values from the access code request message in stores in the temporary memory 240 for ease of retrieval. In particular, the temporary memory 240 includes a callee identifier store 246 for storing the callee identifier from the callee identifier field 116 in the access code request message 110 illustrated in FIG. 4, a caller identifier store 248 for storing the caller identifier that was stored in the caller identifier field 118 of the access code request message 110 illustrated in FIG. 4, a caller username store 249 for storing the caller username that was stored in the caller username field 112 of the access code request message 110 illustrated in FIG. 4, and an access code store 250 for storing an access code that is selected when the routing controller (30) receives an access code request message (110). The temporary memory 240 also includes a local calling area identifier store 245 for storing an identifier of a local calling area associated with the mobile telephone (12). The clock 244 generally maintains and stores a representation of a current date and time.

The I/O port 236 further includes a database request port 256 through which a request to the database (23 in FIG. 1) can be made, and also includes a database response port 258 for receiving a reply from the database (23). The I/O port 236 further includes a routing controller (RC) request message input 260 for receiving an RC request message (illustrated in FIG. 17) from the call controller (13 in FIG. 1) and includes a routing message output 262 for sending a routing message back to the call controller 13. The I/O port 236 thus acts to receive a caller identifier and a callee identifier contained in an RC request message from the call controller, the RC request message being received in response to initiation of a call by a subscriber of the system, as described below.

Figures 16, 17:
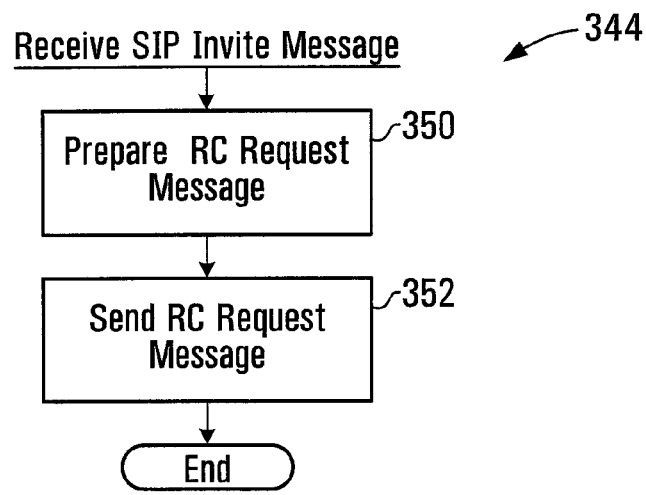
FIG. 16 is a flow chart of a process executed by the call controller illustrated in FIG. 1.
FIG. 17 is a tabular representation of an RC request message transmitted between the call controller and the routing controller illustrated in FIG. 1.

The program memory 234 includes blocks of codes for directing the processor 232 to carry out various functions of the routing controller (30). One of these blocks includes an RC request message handler 380 which directs the routing controller (30) to produce a routing message in response to a received RC request message, an example of which is illustrated in FIG. 17. The RC request message handler process is shown in greater detail at 380 in FIGS. 18A through 18C. Another of these blocks in the program memory 234 includes an access code generator, which is described at 270 in FIG. 12, and which directs the routing controller (30) to produce an access code as directed by the program codes in block 196 shown in FIG. 7. Yet another of these blocks in the program memory 234 includes a local calling area identifier generator, which directs the routing controller (30) to produce a local calling area identifier using the location identifier from the location identifier field 119 of the access code request message 110 illustrated in FIG. 4.

Local Calling Area Identifier Generator

Referring to FIG. 1, it will be appreciated that preferably, a call made by the mobile telephone 12 using the access code obtained from the access server 14 will be a local call for the mobile telephone 12, based on a geographical location of the mobile telephone. Therefore, blocks in the program memory 234 include a local calling area identifier generator, which directs the routing controller 30 to produce a local calling area identifier.

For example, the local calling area identifier generator may direct the microprocessor 152 to access a dialing profile associated with the caller. The dialing profile may be identified using the username in the username field 112 in the access code request message 110 illustrated in FIG. 4, and to store in the local calling area identifier field 245 a default location of the caller retrieved from the dialing profile associated with the caller.

Referring to FIG. 9, an exemplary dialing profile is illustrated generally at 200 and includes a username field 202, a domain field 204, and calling attributes comprising a national dialing digits (NDD) field 206, an international dialing digits (IDD) field 208, a country code field 210, a local area codes field 212, a caller minimum local number length field 214, a caller maximum local number length field 216, a reseller field 218, a maximum number of concurrent calls field 220, a current number of concurrent calls field 222, and a default local calling area identifier field 224. Therefore, in some embodiments, the local calling area identifier generator directs the microprocessor 152 to determine a local calling area associated with the mobile telephone (12) by retrieving the default local calling area identifier from the default local calling area identifier field 224 of the dialing profile 200.

Effectively, the dialing profile 200 is a record identifying calling attributes of the caller identified by the username in the username field 202. More generally, dialing profiles 200 represent calling attributes of respective users, and are discussed in more detail in PCT publication No. WO 2008/052340. As described in PCT publication No. WO 2008/052340, a dialing profile of the type shown in FIG. 9, and also other records such as direct-in-dial (DID) records, call blocking records, call forwarding records, and voicemail records, may be created whenever a user registers with the system or agrees to become a subscriber to the system.

Alternatively, the local calling area identifier generator may generate a local calling area identifier to be stored in the local calling area identifier store 245 using the location identifier from the location identifier field 119 of the access code request message 110 illustrated in FIG. 4. As described above, the location identifier field (119) may store one or more of an IP address of the mobile telephone (12) in a wireless IP network, an identifier of a wireless voice signal station in wireless communication with the mobile telephone, and a user-configured identifier. One or more of these values may be used to identify a local calling area that is or is likely to be associated with the mobile telephone (12) in order to generate a local calling area identifier to be stored in the local calling area identifier store 245.

For example, it has been found that services available from web sites such as http://www.ip2location.com/ and http://www.serviceobjects.com/products/dots_ipgeo.asp, for example, can produce a name of a location, and also latitude and longitude values, associated with an IP address. Using this information derived from an IP address, or other information from the location identifier field (119), a local calling area may be identified by hierarchical jurisdictional designations (such as country, province, and city in Canada or country, state, and city in the United States) and encoded as codes identifying the local calling area. These codes may then be stored in the local calling area identifier store 245.

Access Code Association Table

In the illustrated embodiment, the table memory 238 (shown in FIG. 8) includes an access code association table 170, an example of which is illustrated in FIG. 10, for associating access codes with callee identifiers, caller identifiers, caller usernames, timeouts, and timestamps. Although the routing controller (30) is illustrated in this embodiment as a separate component from the access server (14), it will be appreciated that in other embodiments, the routing controller (30) may be part of or integrated with the access server (14), and in these other embodiments, the access code association table 170 may be part of or integrated with the access server.

Referring to FIGS. 1 and 10, the access code association table 170 generally includes a plurality of records, each having an access code field 173 storing an access code. The access codes in the access code association table 170 may thus form a pool of access codes, where each access code may identify a respective telephone number. In the illustrated embodiment, the access codes in the access code fields 173 of records of the access code association table 170 identify respective channels (illustrated by example only as 20, 22, and 24) that are operably configured to cooperate with the IP network 26 via the gateway 18 to cause a call involving the mobile telephone 12 to be routed through the IP network.

Referring to FIG. 10, the exemplary access code association table 170 includes records 172, 174, 176, 178, and 180, each having respective fields for storing a local calling area identifier 171, an access code 173, a channel identifier 175, a callee identifier 177, a caller identifier 179, a caller username 183, a timeout 181, and a timestamp 182. Generally, a record in the access code association table 170 will be created for each access code that identifies a channel (such as the channels 20, 22, and 24 illustrated in FIG. 1) that is configured or configurable to establish communication through a gateway (such as the gateway 18 illustrated in FIG. 1) to an IP network (26 in FIG. 1) in response to a call received at the channel. When a record is created in respect of a channel, the local calling area identifier field 171 is preferably initialized with an identifier of a local calling area associated with the channel, the access code field 173 is preferably initialized with an access code associated with the channel, and the channel identifier field 175 is preferably initialized with an identifier of the channel. The remaining fields (for storing a callee identifier 177, a caller identifier 179, a caller username 183, a timeout 181, and a timestamp 182) are preferably initialized with default "null" values when a record is created. The fields for storing a local calling area identifier 171, an access code 173, a channel identifier 175 preferably remain generally constant during ordinary operation of the access code association table 170, although the values stored in the fields for storing a callee identifier 177, a caller identifier 179, a caller username 183, a timeout 181, and a timestamp 182 may vary as described below. It will be appreciated that in some embodiments, one or more of the fields for storing a local calling area identifier 171, a channel identifier 175, a caller identifier 179, a caller username 183, a timeout 181, and a timestamp 182 may not be required and be omitted.

As noted above, the local calling area identifier field 171 is preferably initialized with an identifier of a local calling area associated with the channel. The local calling area identifier field 171 preferably stores codes that are encoded in the same manner as the codes in the local calling area identifier store 245, as described above, so that an access code in the local calling area identified by the codes in the local calling area identifier store 245 may be identified by searching the access code association table 170 for an access code associated with a local calling area identifier in the associated local calling area identifier field 171 that matches the local calling area identifier in the local calling area identifier store 245. It has been found that information available from web sites such as http://en.wikipedia.org/wiki/List_of_NANP_area_codes, and services available from web sites such as http://www.serviceobjects.com/demos/PhoneExchangeDemo.asp, for example, may be used to determine a local calling area identifier associated with a given access code where, for example, the access code is a PSTN telephone number.

In the exemplary access code association table 170, the access codes in the access code fields 173 are telephone numbers for PSTN lines, three of which are in the 604 area code in Vancouver, British Columbia, Canada, and two of which are in the 416 area code in Toronto, Ontario, Canada. It will be appreciated that the access code association table 170 is an example only, and other access code association tables may include any number of access codes, which need not be PSTN telephone numbers, and which need not be limited to particular geographical areas.

In the exemplary access code association table 170, the access code field 173 in the record 174 stores an access code 1-604-345-2323, which may be a local telephone number for Vancouver, British Columbia, Canada, and the callee identifier field 177 of the record 174 stores a callee identifier 1-403-789-1234, which may be a telephone number for a callee in Calgary, Alberta, Canada for example, thereby associating the callee identifier 1-403-789-1234 with the access code 1-604-345-2323. Furthermore, the caller identifier field 179 of the record 174 stores a caller identifier 1-416-444-1441 and the caller username field 183 stores a caller username 2001 1050 8667, thereby associating the caller identifier 1-416-444-1441 and caller username 2001 1050 8667 with the aforementioned access code and callee identifier. The caller identifier 1-416-444-1441 may be associated with a mobile telephone normally geographically located in Toronto, Ontario, Canada, but which may be in Vancouver and is therefore using a Vancouver-based access code to place a call to a Calgary-based number, for example. In the example record 174, the timestamp field 182 indicates that the callee identifier 1-403-789-1234, the caller identifier 1-416-444-1441, and the caller username 2001 1050 8667 were associated with the access code 1-604-345-2323 on Jun. 15, 2008 at 10:31 am, and the timeout field 181 indicates that this association is to expire 10 minutes after the time indicated in the timestamp field.

Likewise, the exemplary record 178 indicates that the callee identifier 1-604-321-1234, the caller identifier 1-416-444-1234, and the caller username 2001 1050 4141 were associated with the access code 1-416-234-4646 on Jun. 15, 2008 at 2:21 pm, and the timeout field 181 of the record 178 indicates that this association is to expire within 10 minutes of the time in the timestamp field 182.

It will also be appreciated that the access code association table 170 may, in other embodiments, be substituted with other data structures or storage media. For example, in alternative embodiments, as described below, a DID record of the type shown at 370 in FIG. 11 may associate an access code with a callee identifier and with other information such as a caller identifier, a timeout value, and a timestamp value, additionally or alternatively to the access code association table 170.

DID Bank Table Records

As described in PCT Publication No. 2008/052340, a DID bank table record may be created and stored in a DID bank table in the database (23 in FIG. 1) when a user registers with the system, to associate the username of the user and a host name of the node with which the user is associated, with a number on the PSTN network formatted in compliance with the E.164 standard set by the International Telecommunication Union (ITU). However, as explained below, DID records may, in some embodiments, also associate usernames and host names with respective access codes, and may also associate access codes with respective callee identifiers and with other information such as caller identifiers, timeout values, and timestamp values.

Figure 11:
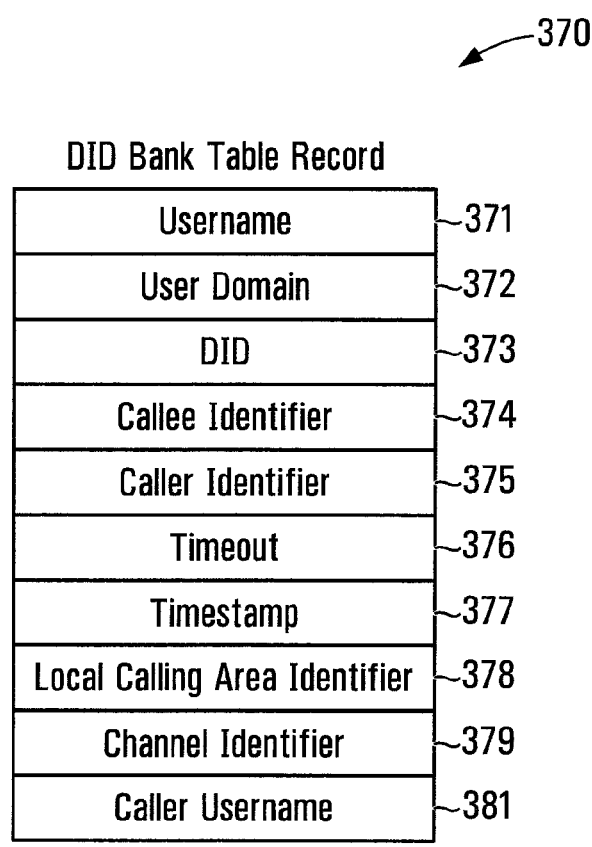
FIG. 11 is a schematic representation of a DID bank table record stored in a database shown in FIG. 1.

Referring to FIG. 11, an exemplary DID bank table record is shown generally at 370, and includes a username field 371, a user domain field 372, and a DID field 373. The username field 371 may store a username of a user of the system, in which case the user domain field 372 stores a host name of the node with which the user is associated, and the DID field 373 stores an E.164 number on the PSTN network associated with the user. Exemplary host names stored in the user domain field 372 include sp.yvr.digifonica.com for Vancouver, British Columbia, Canada and sp.lhr.digifonica.com for London England, for example, as described in PCT Publication No. 2008/052340. If the user has multiple telephone numbers, then multiple records of the type shown at 370 would be included in the DID bank table, each having the same username and user domain, but different DID field 373 contents reflecting the different telephone numbers associated with that user.

However, DID fields 373 of DID bank table records 370 may also store access codes, in which case the username field 371 may store a username associated with the access code. In these DID bank table records 370, the user domain field 372 stores a host name of the node with which the access code is associated. Therefore, DID bank table records 370 may, in some embodiments, associate usernames and host names with respective access codes.

The exemplary DID bank table record 370 further includes a callee identifier field 374, a caller identifier field 375, a timeout field 376, a timestamp field 377, a local calling area identifier field 378, a channel identifier field 379, and a caller username field 381, which may be used in an analogous manner to the callee identifier field 177, the caller identifier field 179, the timeout field 181, the timestamp field 182, the local calling area identifier field 171, the channel identifier field 175, and the caller username field 183 respectively of the access code association table 170 illustrated in FIG. 10. The DID bank table records 370 may thus associate access codes with respective local calling area identifiers, callee identifiers, caller identifiers, caller usernames, timeouts, and timestamps, although the caller identifier field 375, timeout field 376, timestamp field 377, local calling area identifier field 378, channel identifier field 379, and caller username field 381 may not be necessary, and one or more of these fields may be omitted in some embodiments.

Furthermore, it will be appreciated that the callee identifier field 374, caller identifier field 375, timeout field 376, and timestamp field 377 of the DID bank table record 370 may be omitted for DID table records that are not in respect of access codes, but rather are in respect of telephone numbers of users of the system, for example, as described in PCT Publication No. 2008/052340. The callee identifier field 374, caller identifier field 375, timeout field 376, and timestamp field 377 of the DID bank table record 370 may also be omitted in embodiments where the access code association table 170 includes records with these types of fields.

For simplicity, the following description is directed to embodiments wherein an access code association table 170 associates access codes with respective callee identifiers, caller identifiers, timeout values, and timestamp values. However, it will be appreciated that the processes described herein for records in the access code association table 170 may additionally or alternatively be applied to DID bank table records 370 in an analogous manner.

Access Code Generator

Referring back to FIGS. 1, 4, and 8 in the illustrated embodiment as described above, the access server 14 transmits (at block 196 illustrated in FIG. 7) an access code request message 110 to the routing controller 30 in order to obtain from the routing controller 30 an access code. When an access code request message 110 is received at the access server interface 242, the processor 232 preferably authenticates the user by making various enquiries of databases to which it has access, to determine whether or not the password in the password field 114 of the access code request message 110 matches a password stored in the database in association with the username in the username field 112. Various functions may be used to pass encryption keys or hash codes back and forth to ensure that the transmittal of passwords is secure. If the user is successfully authenticated, the processor 232 then preferably produces an access code.

Figure 12:
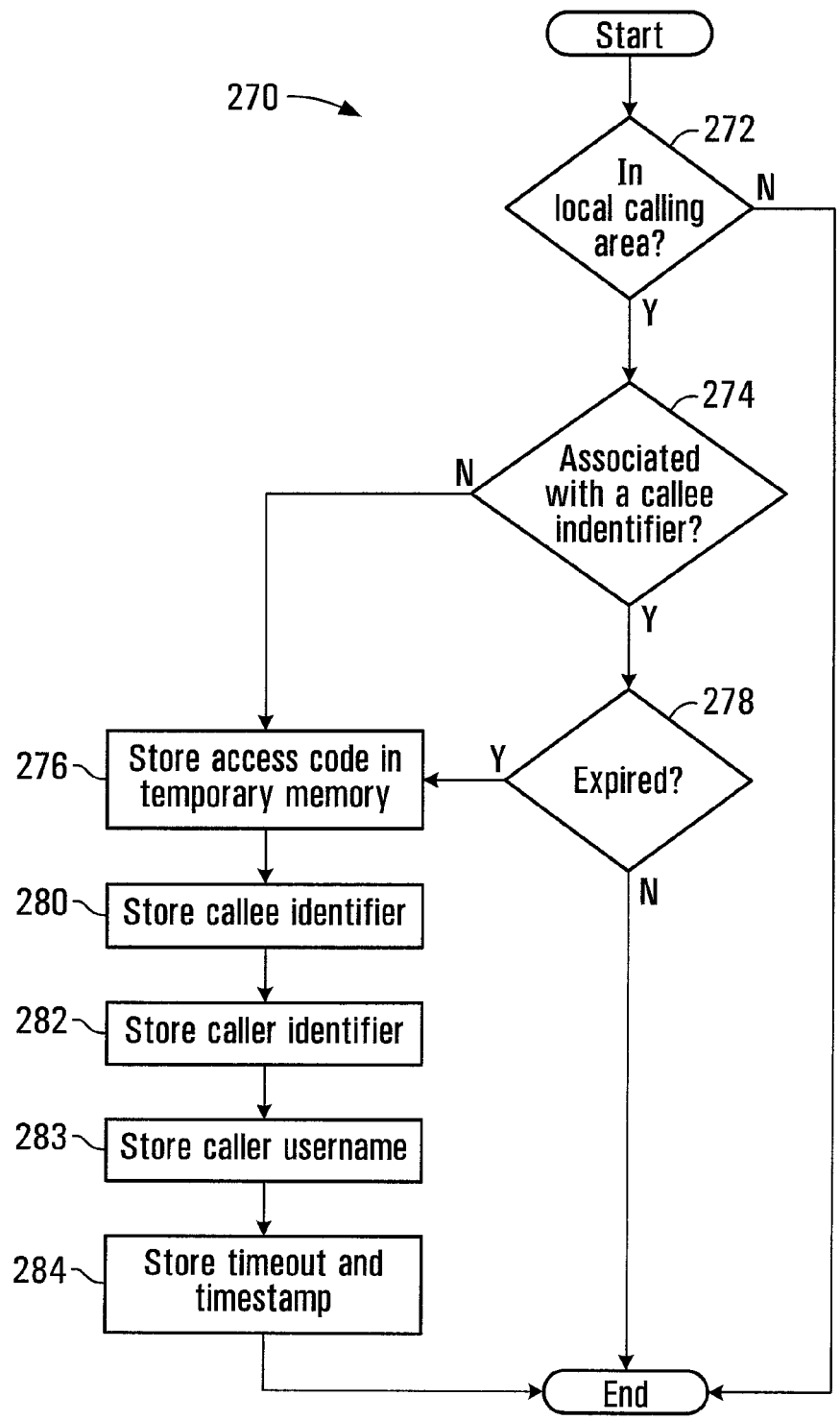
FIG. 12 is a flow chart of a process executed by the routing controller illustrated in FIG. 1.

Referring to FIGS. 8 and 12, a process for producing an access code is shown generally at 270. Essentially the process 270 determines whether the access code in a given record (referred to below as the "currently addressed record") in the access code association table shown at 170 in FIG. 10 is within the local calling area identified by the local calling area identifier store 245, and whether the access code is currently available for association with a callee identifier. In order to produce an access code in response to receiving an access code request message (110) from the access server (14), the processor 232 of the routing controller (30) preferably searches the pool of access codes in the access code association table (170) to identify an access code identifying a channel usable by the mobile telephone (12) to initiate a call to the callee, using the process 270 until an available access code in the local calling area identified by the local calling area identifier store 245 is identified. The access code generator thus preferably selects an access code from the pool of access codes in the access code association table (170), and preferably selects an access code in a local calling area associated with the mobile telephone (12).

Starting with the first record in the access code association table, the process 270 begins at block 272, which directs the processor 232 of the routing controller (30) to determine whether the access code in the currently addressed record of the access code association table 170 is associated with the same local calling area as the mobile telephone (12) as identified by the contents of the local calling area identifier store 245. If at block 272 the access code of the currently addressed record is not associated with the same local calling area as the mobile telephone (12), the process 270 ends, the next record in the access code association table 170 is addressed, and the process is repeated for the next record in the access code association table.

However, if at block 272 the access code of the currently addressed record is associated with the same local calling area as the mobile telephone (12), or if the access code request message 110 (illustrated in FIG. 4) did not include a local calling area identifier, then the process 270 continues at block 274, which directs the processor 232 to determine whether the access code of the currently addressed record is associated with a callee identifier. To do this, the processor 232 determines whether the callee identifier field (177) of the currently addressed record stores a "null" value that was assigned to it on initialization, or whether the callee identifier field instead stores a callee identifier. In other words the processor checks to see whether the currently addressed record has already been in use.

If at block 274 the callee identifier field (177) of the currently addressed record in the access code association table (170) does store a callee identifier and not the "null" value that was assigned to the callee identifier field on initialization (for example, records 174 and 178 in FIG. 10), then the access code of that record is associated with a callee identifier, and the process 270 continues at block 278, which directs the processor 232 to determine whether the association of the callee identifier with the access code has expired. In the illustrated embodiment, the codes at block 278 direct the processor 232 to determine whether the sum of the contents of the timestamp field (182) and of the timeout field (181) in the currently addressed record of the access code association table 170 (shown in FIG. 10) is less than the current time represented by the clock 244. If at block 278 the sum of the timeout and timestamp fields in the currently addressed record of the access code association table 170 is less than the time represented by the clock 244, then the association of the callee identifier with the access code is not expired and the process 270 ends, the next record in the access code association table (170) is addressed, and the process 270 is repeated for the next record in the access code association table.

However, if at block 278 the sum of the contents of the timeout and timestamp fields (181 and 182) in the currently addressed record of the access code association table (170) is not less than the time represented by the clock 244, then the association of the callee identifier with the access code has expired, and the process 270 continues at block 276 which directs the processor 232 to store the contents of the access code field 173 of the currently addressed record in the access code store 250 of the temporary memory 240 of the routing controller 30.

Referring to FIGS. 8, 10, and 12, if at block 274 the callee identifier field in the currently addressed record does not store a callee identifier but stores instead the "null" value that was assigned to the callee identifier field on initialization (for example, records 172, 176, and 180), then the access code of that record is not associated with a callee identifier, and the process 270 continues at block 276, which directs the processor 232 to store the access code from the access code field 173 of the currently addressed record, in the access code store 250 in the temporary memory 240.

After the selected access code is stored in the access code store 250 at block 276, the process 270 continues at block 280, which directs the processor 232 to store the callee identifier from the callee identifier store 246 in the callee identifier field 177 of the currently addressed record, thereby creating an association of the callee identifier with the selected access code.

The process 270 then continues at block 282, which directs the processor 232 to store the caller identifier from the caller identifier store 248 (which identifies the mobile telephone 12 shown in FIG. 1) in the caller identifier field 179 of the currently addressed record of the access code association table 170, thereby also storing the caller identifier in association with the selected access code.

The process 270 then continues at block 283, which directs the processor 232 to store the caller username from the caller username store 249 in the caller username field 183 of the currently addressed record of the access code association table 170, thereby also storing the caller username in association with the selected access code.

The process 270 then continues at block 284, which directs the processor 232 to store timeout and timestamp values in the timeout and timestamp fields 181 and 182 of the currently addressed record of the access code association table 170, thus further storing, in association with the selected access code, a timestamp for use in determining when the usability of the access code to initiate a call to the callee will expire. A default value, such as 10 minutes, for example may be stored in the timeout field 181 of the currently addressed record. Also, the current time indicated by the clock 244 is preferably stored in the timestamp field 182 of the currently addressed record.

In alternative embodiments, the access code association table (170) might not include fields for a caller identifier, caller username, a timeout, or a timestamp. In these embodiments, one or more of blocks 282, 283, and 284 described above are not necessary, and one or more of the caller identifier store 248 and the caller username store 249 may be omitted.

In summary, the access code generator in the illustrated embodiment responds to receiving an access code request message 110 illustrated in FIG. 4 from the access server (14) by first authenticating the user, and then by searching through a pool of access codes, using the process 270 shown in FIG. 12, to identify an access code that is associated with the local calling area identified by the local calling area identifier store (245) and that is not previously and validly associated with another callee identifier. It will be appreciated that in alternative embodiments, different data structures and algorithms may be preferable for identifying an access code that meets the aforementioned criteria. For example, in accordance with conventional database design that is well-known in the art, the records illustrated in the access code association table 170 illustrated in FIG. 10 may alternatively be organized in a binary tree according to the value in the local calling area identifier field 171, or in separate tables for respective local calling area identifiers, for example, in order to enable a more efficient search of the access code association table for an access code that satisfies the aforementioned criteria. Therefore, the access code association table (170) and the process 270 illustrated in FIG. 12 are examples only, and one of ordinary skill in the art will readily appreciate numerous alternative data structures and algorithms.

Gateway

Figures 13, 14:
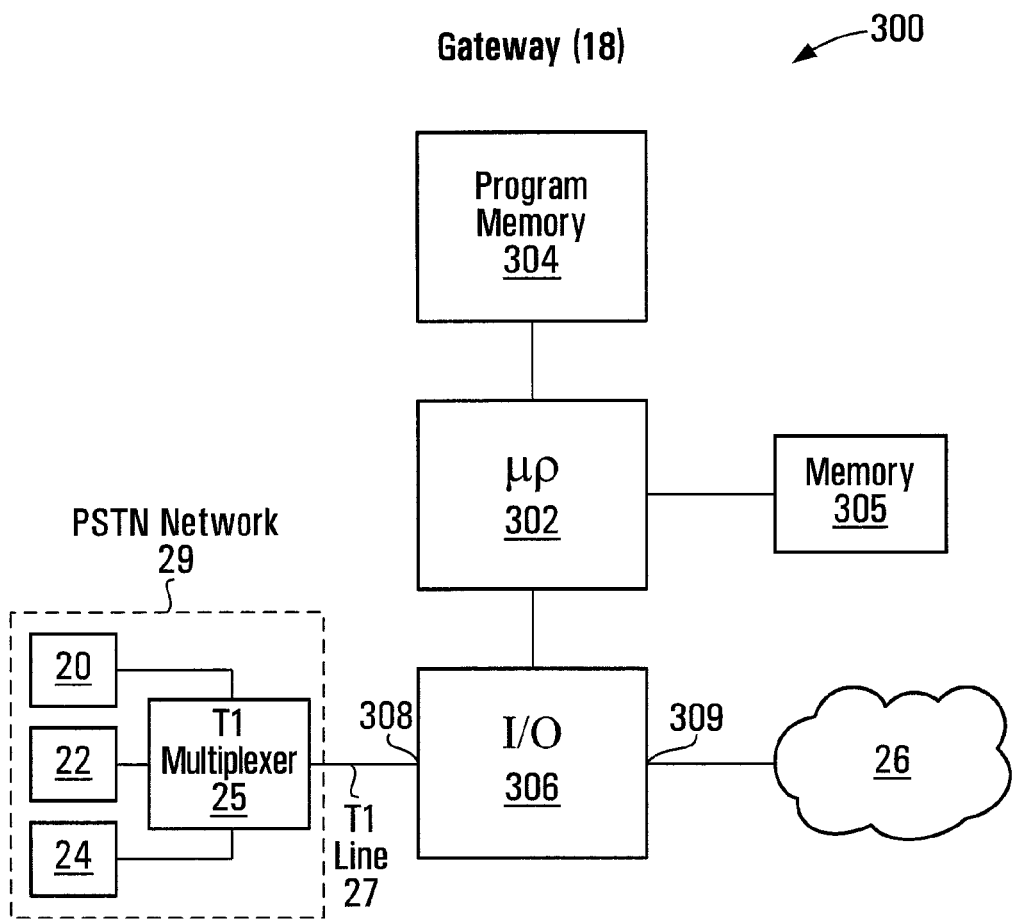
FIG. 13 is a block diagram of a gateway shown in FIG. 1.
FIG. 14 is a tabular representation of an SIP invite message transmitted between the gateway and a call controller illustrated in FIG. 1.

Referring to FIG. 13, in this embodiment, the gateway (18) includes a processor circuit shown generally at 300, which includes a microprocessor 302. The processor circuit 300 also includes a program memory 304, a memory 305, and an I/O port 306, all of which are in communication with the microprocessor 302. The processor circuit 300 may include multiple processors etc., and the aforementioned components of the processor circuit 300 may alternatively be combined.

The I/O port 306 includes a channel interface 308, which, in the illustrated embodiment, is in communication with the channels 20, 22, and 24 that were also illustrated in FIG. 1. Where, as in the illustrated embodiment, the channels 20, 22, and 24 are PSTN telephone lines in the PSTN network 29, the channel interface 308 may, for example, be a T1 port for communication with one or more T1 lines (illustrated at 27 in FIG. 1) of a PSTN service provider, in a manner well-known in the art. The I/O port in the illustrated embodiment also includes an internet interface 309 for interfacing with the Internet Protocol (IP) network 26 illustrated in FIG. 1. The program memory 304 stores blocks of codes for directing the microprocessor 302 to carry out the functions of the gateway (18). It has been found that the AS5350 Universal Gateway available from Cisco Systems, Inc. of San Jose, Calif. may, for example, be suitable as the gateway (18).

Referring back to FIG. 1, and also still to FIG. 13, when a call is received on one of the channels 20, 22, or 24, the microprocessor 302 causes the I/O port 306 to use the internet interface 309 to send a Session Initiation Protocol (SIP) Invite message to a pre-determined node with which the gateway 18 is associated, which in the illustrated embodiment is the first node 11. Generally, the gateway 18 will be associated with a node that is geographically closest to the gateway, in order to minimize transmission times over the IP network 26. In response to the SIP Invite message, the call controller 13 sends an RC request message to the routing controller 30 which makes various enquiries of the database 23 to produce a routing message that is sent back to the call controller 13. The call controller 13 then communicates with the media relay 28 to cause a communications link including an audio path (and a videopath if a videophone call) to be established through the media relay to the same node, a different node, or to a communications supplier gateway as shown generally at 34 to carry audio, and where applicable, video traffic to the call recipient or callee.

Referring to FIG. 14, an exemplary SIP Invite message is shown generally at 310 and includes a caller identifier field 312, a callee identifier field 314, a digest parameter field 315, a call identifier field 316, an IP address field 317, and a gateway UDP port field 318. Examples of values for the fields in the SIP Invite message 310 are shown for illustration purposes only in FIG. 14. The caller identifier in the caller identifier field 312 is preferably in the form of the telephone number of the caller followed by the "@" symbol, which in turn is followed by the IP address of the gateway (18) in the IP network (26). The caller identifier may be determined by retrieving calling line identification (CLID) information from the signal provided by the PSTN network (29) to the gateway (18) for example. Where the caller identification information is not available to the gateway (18), the caller identifier in the caller identifier field 312 preferably includes a pre-assigned number (such as 11111, for example) indicating that the caller identification information was not available, followed by the "@" symbol and then by the IP address of the gateway (18).

The callee identifier in the callee identifier field 314 is the access code identifying the channel (20, 22, or 24 in the example of FIG. 1) on which the call was placed, and which was received from the access server (14). In the illustrated example, the access code is the PSTN telephone number 1-604-345-1212 corresponding to the channel 20 illustrated in FIG. 1, and to the access code stored in the access code field 173 of the record 172 in the exemplary access code association table 170 illustrated in FIG. 10.

The digest parameter in the digest parameter field 315 is generated by the gateway (18) and may uniquely identify the SIP session that is initiated with the SIP Invite message 310.

The call identifier in the call identifier field 316 is, in the illustrated embodiment, a four-digit hexadecimal number generated by the gateway (18) to identify the call, followed by the "@" symbol, which in turn is followed by the IP address of the gateway.

The IP address in the IP address field 317 is the IP address of the gateway (18) in the IP network (26), and the gateway UDP port number in the gateway UDP port field 318 includes a UDP port identifier identifying a UDP port at which the audio/video path will be terminated at the gateway (18).

It should be noted that throughout the description of the embodiments of this invention, the IP/UDP addresses of all elements such as the gateway (18) will be assumed to be valid IP/UDP addresses directly accessible via the Internet or a private IP network, for example, depending on the specific implementation of the system. As such, it will be assumed, for example, that the gateway (18) will have an IP/UDP address directly accessible by the call controllers and the media relays on their respective nodes, and those addresses will not be obscured by Network Address Translation (NAT) or similar mechanisms. In other words, the IP/UDP information contained in SIP messages (for example the SIP Invite message or the RC Request message which will be described below) will match the IP/UDP addresses of the IP packets carrying these SIP messages.

It will be appreciated that in many situations, the IP addresses assigned to various elements of the system may be in a private IP address space, and thus not directly accessible from other elements. Furthermore, it will also be appreciated that NAT is commonly used to share a "public" IP address between multiple devices, for example between home PCs and IP telephones sharing a single Internet connection. For example, the gateway (18) may be assigned an IP address such as 192.168.0.5. This address is located in so called "non-routable" (IP) address space and cannot be accessed directly from the Internet. In order for this device to communicate with other computers located on the Internet, the IP address has to be converted into a "public" IP address, for example 24.14.102.5 assigned by the Internet Service Provider, by a device performing NAT, typically a router. In addition to translating the IP address, NAT typically also translates UDP port numbers, for example an audio path originating at the gateway (18) and using a UDP port 12378 at its private IP address, may have be translated to a UDP port 23465 associated with the public IP address of the NAT device. In other words, when a packet originating from the gateway (18) arrives at an Internet-based node, the source IP/UDP address contained in the IP packet header will be 24.14.102.5:23465, whereas the source IP/UDP address information contained in the SIP message inside this IP packet will be 192.168.0.5:12378. The mismatch in the IP/UDP addresses may cause a problem for SIP-based VoIP systems because, for example, a node will attempt to send messages to a private address but the messages will never get there.

Call Controller

Figure 15:
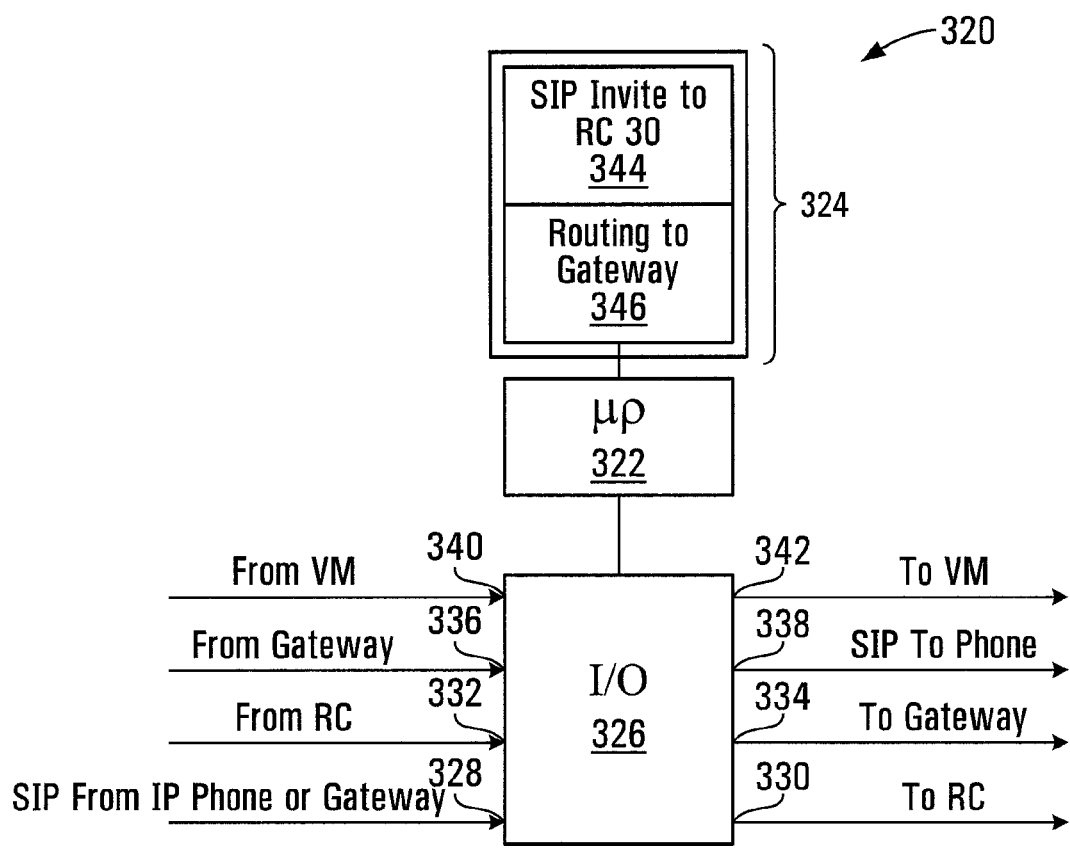
FIG. 15 is a block diagram of the call controller illustrated in FIG. 1.

Referring to FIG. 15, the call controller (13) includes a processor circuit shown generally at 320. The processor circuit 320 includes a microprocessor 322, program memory 324, and an I/O port 326. The program memory 324 and the I/O port 326 are in communication with the microprocessor 322. The processor circuit 320 may include a plurality of microprocessors, a plurality of program memories, and a plurality of I/O ports to be able to handle a large volume of calls. However, for simplicity, the processor circuit 320 will be described as having only one microprocessor 322, program memory 324, and I/O port 326, it being understood that there may be more.

Generally, the I/O port 326 includes an input 328 for receiving messages such as the SIP Invite message from the gateway (18) or from a VoIP telephone (36 in FIG. 1, for example). The I/O port 326 also has an RC request message output 330 for transmitting an RC request message to the routing controller 30 of FIG. 1, an RC message input 332 for receiving routing messages from the routing controller 30, a gateway output 334 for transmitting messages to the gateway 18 and/or 34 shown in FIG. 1 to advise the gateway 18 and/or 34 to establish an audio path, for example, and a gateway input 336 for receiving messages from the gateway 18 and/or 34. The I/O port 326 further includes a SIP output 338 for transmitting messages to the gateway (18 and/or 34) or VoIP telephone (36, for example) to advise the gateway 18 and/or 34 or IP telephone of the IP addresses of the gateways which will establish the audio/video path. The I/O port 326 further includes a voicemail server input and output 340 and 342 respectively for communicating with the voicemail server 19 shown in FIG. 1.

While certain inputs and outputs have been shown as separate, it will be appreciated that some may be a single IP address and IP port. For example, the messages sent to the routing controller (30) and received from the routing controller (30) may be transmitted and received on the same single IP port.

The program memory 324 includes blocks of code for directing the microprocessor 322 to carry out various functions of the call controller (13). For example, these blocks of code include a first block 344 for causing the processor circuit 320 to execute a SIP Invite to RC Request process to produce an RC Request Message in response to a received SIP Invite message. In addition, there is a Routing Message to Gateway message block 346 which causes the processor circuit 320 of the call controller to produce a gateway query message in response to a received routing message from the routing controller (30).

Referring to FIGS. 15 and 16, the SIP Invite to RC Request process is shown in more detail at 344. On receipt of a SIP Invite message of the type shown in FIG. 14, block 350 directs the processor circuit 320 to produce an RC Request Message. Block 352 then directs the processor circuit 320 to cause the RC Request Message to be sent to the routing controller 30 illustrated in FIG. 1.

Referring to FIG. 17, an exemplary RC request message is shown generally at 360 and includes a caller identifier field 362, a callee identifier field 364, a digest parameters field 366, and a call identifier field 368. These fields may be populated with the contents of the caller identifier field 312, callee identifier field 314, digest parameter field 315, and call identifier field 316 respectively of the SIP Invite message 310 illustrated in FIG. 14. In other embodiments, the RC request message may further include a type field (not shown) containing a type code to indicate whether the call is from a third party or from a system subscriber. Other variations of an RC request message are explained in PCT Publication No. WO 2008/052340. A type field (not shown) in the RC request message 360 may be advantageous in embodiments where SIP Invite messages may also be received from an IP telephone that is using VoIP software to make a voice call. However, in the embodiments that are illustrated herein, SIP Invite messages originate from the gateway (18), and therefore a type designation is not necessary and may be omitted from the RC request message 360. In embodiments where a SIP Invite message may be received from an IP telephone, the SIP invite to RC request process shown in FIG. 16 may require additional steps, as illustrated in FIG. 5 of PCT Publication No. WO 2008/052340.

RC Request Message Handler

Figure 18A:
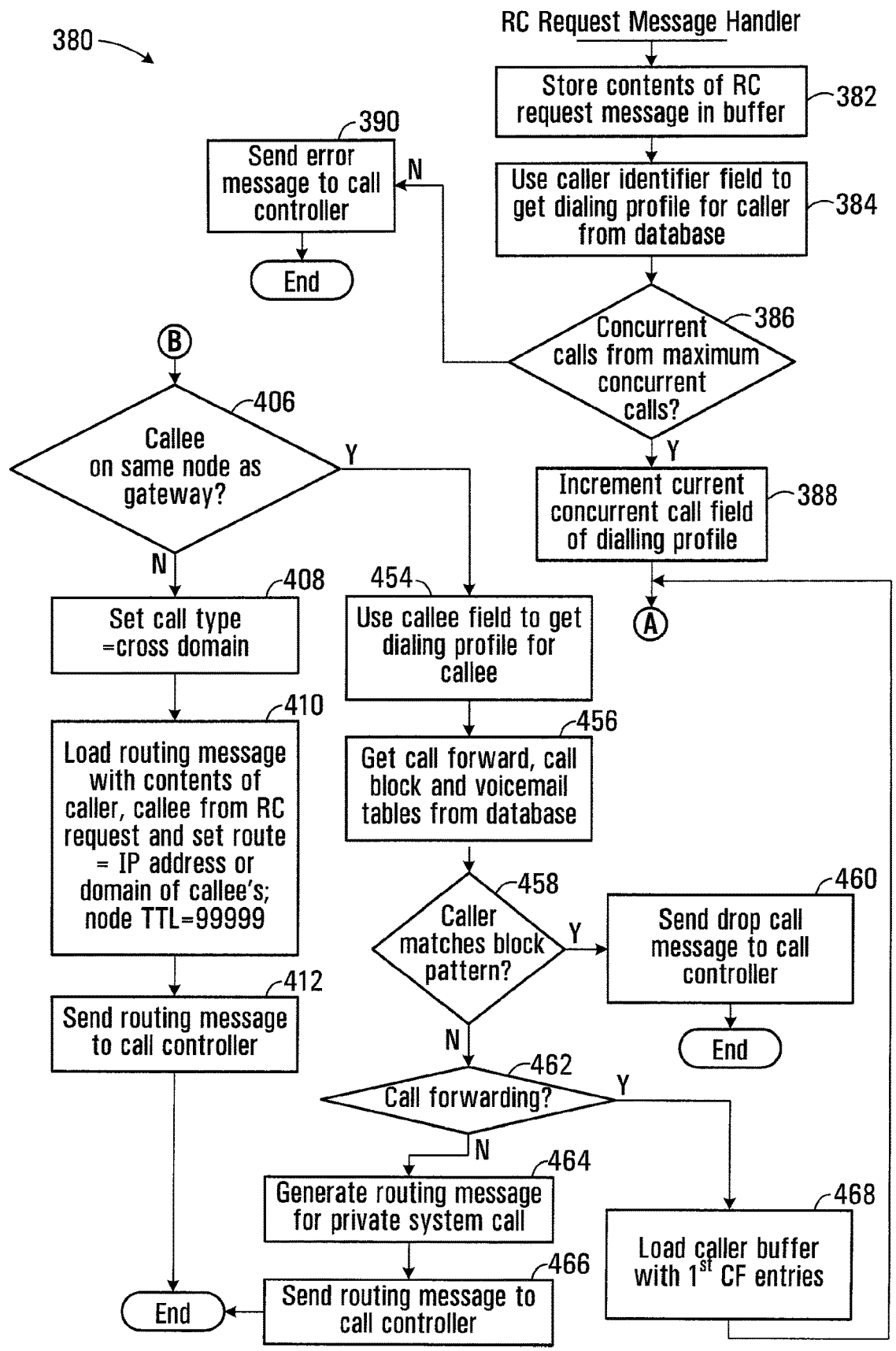
FIGS. 18A-18C are a flow chart of a process executed by the routing controller illustrated in FIG. 1.

As illustrated in FIG. 8, the program memory 234 includes an RC request message handler 380 which directs the routing controller (30) to produce a routing message in response to a received RC request message (360). Referring to FIG. 18A, the RC request message handler 380 begins with a first block 382 that directs the RC processor circuit (230) to separately store the contents of the callee identifier field 364 and caller identifier field 362 of the RC request message (360) in the callee identifier store 246 and the caller identifier store 248 respectively of FIG. 8.

Block 384 then directs the RC processor circuit (230) to use the contents of the caller username store 249 to locate and retrieve from the database (23) a dialing profile 200 associated with the caller, as described above and illustrated in FIG. 9, for example. The retrieved dialing profile may then be stored in the temporary memory 240, for example.

Figure 18B:
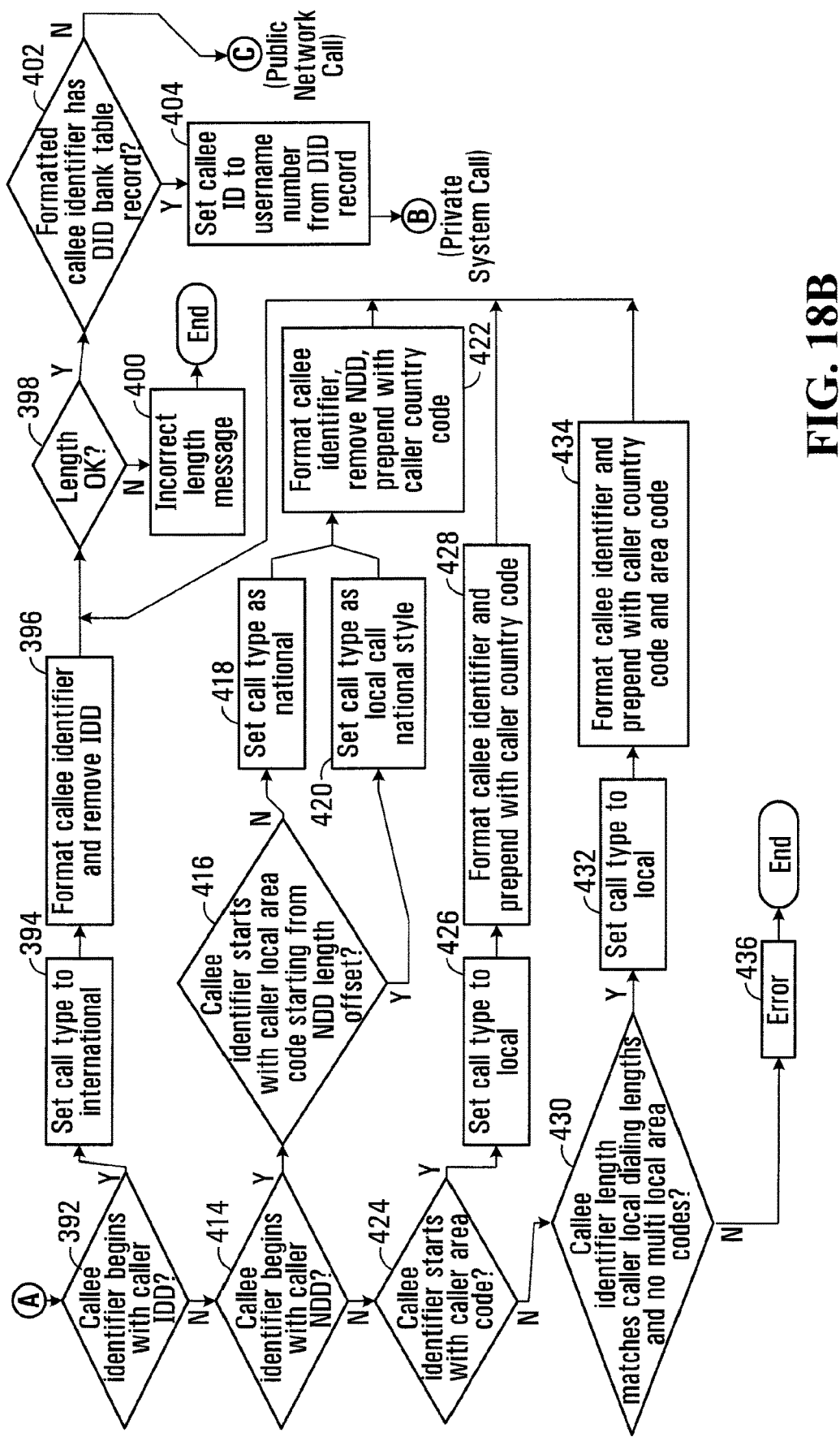

The RC request message handler 380 continues at block 386, which directs the processor circuit (230) of the routing controller to determine whether the contents of the current number of concurrent calls field 222 of the dialing profile 200 shown in FIG. 9 are less than the contents of the maximum number of concurrent calls field 220 of the dialing profile for the caller and, if so, block 388 directs the processor circuit to increment the contents of the current number of concurrent calls field 222 and the processor circuit (230) is directed to point A in FIG. 18B. If the contents of the current number of concurrent calls field 222 are equal to or greater than the contents of the maximum number of concurrent calls field 220, then block 390 directs the processor circuit (230) to send an error message back to the call controller (13) to cause the call controller to notify the caller that the maximum number of concurrent calls has been reached and no further calls can exist concurrently, including the presently requested call.

Assuming that block 386 allows the call to proceed, the RC processor circuit (230) is directed to perform certain checks on the callee identifier in the callee identifier field 246 in FIG. 8. These checks are shown in greater detail in FIG. 18B.

Referring to FIG. 18B, the RC processor circuit (230) is directed to a first block 392 that causes it to determine whether a digit pattern of the callee identifier includes a pattern that matches the contents of the international dialing digits (IDD) field 208 in the dialing profile 200 (shown in FIG. 9) associated with the caller. If so, then block 394 directs the RC processor circuit (230) to set a call type code identifier variable maintained by the processor to indicate that the call is an international call, and block 396 directs the processor to produce a reformatted callee identifier by reformatting the callee identifier into a predefined digit format. In this embodiment, this is done by removing the pattern of digits matching the IDD field contents (208) of the caller dialing profile 200 to effectively shorten the callee identifier. Then, block 398 directs the RC processor circuit (230) to determine whether or not the callee identifier has a length which meets criteria establishing it as a number compliant with the E.164 Standard set by the ITU. If the length does not meet these criteria, then block 400 directs RC processor circuit (230) to send back to the call controller (13) a message indicating the length is not correct. The process 380 is then ended. At the call controller 13, routines (not shown) stored in the program memory 324 may direct the processor circuit (320 of FIG. 15) to respond to the incorrect length message by transmitting a message back to the mobile telephone (12 shown in FIG. 1) to indicate that an invalid number has been dialed.

If the length of the amended callee identifier meets the criteria set forth at block 398, then block 402 directs the RC processor circuit (230) to make a database request to the database (23) to determine whether or not the amended callee identifier is found in the DID field (373) of a record such as shown in FIG. 11 in the DID bank table. If at block 402 the RC processor circuit (230) receives a response from the database (23) indicating that the reformatted callee identifier produced at block 396 is found in the DID field (373) of a record in the DID bank table, then the callee is a subscriber to the system and the call is classified as a private network call by directing the processor to block 404, which directs the RC processor circuit (230) to copy the contents of the corresponding username field (371 in FIG. 11) from the callee DID bank table record (370 in FIG. 11) into the callee identifier store (246 in FIG. 8). Thus, the RC processor circuit (230) locates a subscriber username associated with the reformatted callee identifier. The processor (232) is then directed to point B in FIG. 18A.

Calls to Subscribers in Different Nodes

Referring back to FIG. 1, as noted above, the gateway 18 is preferably associated with a pre-determined node, which in the illustrated embodiment is the first node 11. Referring back to FIG. 18A, block 406 directs the processor (232 of FIG. 8) to execute a process to determine whether or not the node associated with the reformatted callee identifier in the callee identifier store (246 in FIG. 8, which, at block 404, was set to be a username of the callee) is the same node that is associated with the gateway 18 illustrated in FIG. 1.

To do this, the processor (232) may, for example, identify a node associated with the gateway (18) by using an IP address associated with the gateway to determine a node identifier of the gateway. An IP address associated with the gateway (18) may, for example, be obtained from either the caller identifier field 362 or the call identifier field 368 of the RC request message 360 illustrated in FIG. 17, as each of these fields includes a portion following an "@" symbol that indicates an IP address of the gateway. In order to determine a node identifier associated with the gateway (18) using the IP address associated with gateway (18), the processor 232 (illustrated in FIG. 8) may access a gateway node association table stored in the database 23 (illustrated in FIG. 1).

Referring to FIG. 19, an exemplary gateway node association table is shown generally at 480. The exemplary gateway node association table 480 includes first and second records 482 and 484, each having a respective gateway IP address field 486 and a respective node identifier field 488. It will be appreciated that the exemplary gateway node association table 480 is an example for illustration purposes only. The values in the gateway IP address fields 486 are preferably initialized when a gateway (such as the gateway 18 illustrated in FIG. 1) is installed as part of the system (10), and are preferably updated as the IP addresses of the respective gateways may change from time to time. The values in the node identifier fields 488 are also preferably initialized when a gateway (such as the gateway 18 illustrated in FIG. 1) is installed as part of the system (10).

As indicated above, the reformatted callee identifier in the callee identifier store (246 in FIG. 8) was set at block 404 in FIG. 18B to be a username of the callee from the username field 371 (illustrated in FIG. 11), and in this embodiment, a prefix of the username of the callee preferably indicates a node associated with the callee. In the illustrated embodiment, the left-most digit in the username of the callee is a continent code, which is a sufficient prefix to identify a node associated with the callee. However, it will be appreciated that in other embodiments, other prefixes or other information may identify the associated node. Preferably, the values in the node identifier fields 488 correspond to the prefixes of the usernames in the username fields 371 (illustrated in FIG. 11), so that the node associated with the callee is the same node that is associated with the gateway 18 illustrated in FIG. 1 if the prefix of the username of the callee matches the node identifier associated with the gateway (18). Therefore, in the illustrated embodiment, if the reformatted callee identifier in the callee identifier store (246 in FIG. 8) is 2001 1050 8667, for example, then in the example of FIG. 19, the node associated with the callee is the same node as the node identified by the continent code "2" that is associated with the gateway associated with the IP address 20.14.102.5 in the record 482, but is not the same node as the node identified by the continent code "5" that is associated with the gateway associated with the IP address 104.12.131.12 in the record 484.

Referring back to FIG. 18A, if at block 406 the prefix of the username of the callee does not match the node identifier associated with the gateway (18), then the call is a "cross-domain" call, and block 408 in FIG. 18A directs the processor (232 in FIG. 8) to set a call type flag in the temporary memory (240 in FIG. 8) to indicate the call is a cross-domain call. Then, block 410 of FIG. 18A directs the processor (232 of FIG. 8) to produce a routing message identifying an address on the private network with which the callee identified by the contents of the callee ID buffer is associated and to set a time to live for the call at a maximum value of 99999, for example. Routing messages and time to live values, and also a method of determining the node in the system with which the callee is associated, are further described in PCT Publication No. WO 2008/052340. Once a routing message is produced at block 410, block 412 directs the processor (232 in FIG. 8) to cause the routing message to be sent to the call controller 13 shown in FIG. 1, and the process ends.

Referring back to FIG. 18B, if at block 392, the callee identifier stored in the callee identifier store (246 in FIG. 8) does not begin with an international dialing digit, then block 414 directs the processor (232) to determine whether or not the callee identifier begins with the same national dial digit code as assigned to the caller. To do this, the processor (232) is directed to refer to the retrieved caller dialing profile as shown in FIG. 9. In FIG. 9, the national dialing digit code 206 is the number 1. Thus, if the callee identifier begins with the number 1, then the processor (232) is directed to block 416 in FIG. 18B.

Block 416 directs the processor (232 of FIG. 8) to examine the callee identifier to determine whether or not the digits following the NDD digit identify an area code that is the same as any of the area codes identified in the local area codes field 212 of the caller dialing profile 200 shown in FIG. 9. If not, block 418 of FIG. 18B directs the processor (232) to set the call type flag to indicate that the call is a national call. If the digits following the NDD digit identify an area code that is the same as a local area code associated with the caller as indicated by the caller dialing profile, block 420 directs the processor (232) to set the call type flag to indicate a local call, national style. After executing block 418 or 420, block 422 directs the processor (232) to format the callee identifier into a pre-defined digit format to produce a re-formatted callee identifier by removing the national dialed digit and prepending a caller country code identified by the country code field 210 of the caller dialing profile shown in FIG. 9. The processor (232) is then directed to block 398 of FIG. 18B to perform other processing as already described above.

If at block 414, the callee identifier does not begin with a national dialed digit, block 424 directs the processor (232) to determine whether the callee identifier begins with digits that identify the same area code as the caller. Again, the reference for this is the retrieved caller dialing profile shown in FIG. 9. The processor (232) determines whether or not the first few digits of the callee identifier identify an area code corresponding to the contents of any area code identifier stored in the local area code field 212 of the retrieved caller dialing profile 200 (illustrated in FIG. 9). If so, then block 426 directs the processor (232) to set the call type flag to indicate that the call is a local call. It should be noted that the call will not necessarily be a local call in every case where the first few digits of the callee identifier identify an area code corresponding to the contents of an area code identifier stored in the local area code field 212 (illustrated in FIG. 9), and other determinations of when a call is to be considered local may be appropriate. However, it has been found that the determination described above for block 424 is satisfactory for some purposes. Next, block 428 directs the processor (232) to format the callee identifier into a pre-defined digit format to produce a reformatted callee identifier by prepending the caller country code to the callee identifier, the caller country code being determined from the country code field 210 of the retrieved caller dialing profile 200 shown in FIG. 9. The processor (232) is then directed to block 398 for further processing as described above.

If at block 424, the callee identifier does not start with the same area code as the caller, block 430 directs the processor (232 of FIG. 8) to determine whether the number of digits in the callee identifier, i.e. the length of the callee identifier, is within the range of digits indicated by the caller minimum local number length field 214 and the caller maximum local number length field 216 of the retrieved caller dialing profile 200 shown in FIG. 9, and whether there is more than one area code identifier stored in the local area code field 212 of the retrieved caller dialing profile. If the number of digits in the callee identifier is within the aforementioned range and there is only one area code identifier stored in the local area code field (212), then block 432 directs the processor (232) to set the call type flag to indicate a local call and block 434 directs the processor (232) to format the callee identifier into a pre-defined digit format to produce a reformatted callee identifier by prepending to the callee identifier the caller country code (as indicated by the country code field 210 of the retrieved caller dialing profile 200 shown in FIG. 9) followed by the caller area code as indicated by the local area code stored in the local area code field 212 of the caller dialing profile 200 shown in FIG. 9. The processor (232) is then directed to block 398 of FIG. 18B for further processing as described above.

If at block 430, the callee identifier has a length that does not fall within the range specified by the caller minimum local number length field (214 in FIG. 9) and the caller maximum local number length field (216 in FIG. 9), or if there is more than one area code identifier stored in the local area code field 212 of the retrieved caller dialing profile 200 illustrated in FIG. 9, then block 436 directs the processor (232) to send an error message back to the call controller (13), and the process ends.

In alternative embodiments, such as those illustrated in PCT Publication No. WO 2008/052340, an additional block (402 in FIG. 8B of PCT Publication No. WO 2008/052340) may determine whether the callee identifier is a valid username. However, in the embodiment disclosed herein, the callee identifier is assumed to be a telephone number of the callee, and not a username.

From FIG. 18B, it will be appreciated that there are certain groups of blocks of codes that direct the processor 232 in FIG. 8 to determine whether the callee identifier has certain features such as an international dialing digit, a national dialing digit, an area code and a length that meet certain criteria, and cause the processor 232 to reformat the callee identifier stored in the callee identifier store 246 in FIG. 8, as necessary into a predetermined target format including only a country code, area code, and a normal telephone number, for example, to cause the callee identifier to be compatible with the E.164 number plan standard in this embodiment. This enables block 402 in FIG. 18B to have a consistent format of callee identifiers for use in searching through the DID bank table records 370 of the type shown in FIG. 11 to determine how to route calls to subscribers on the same system. Effectively, therefore blocks 392, 414, 424, and 430 establish call classification criteria for classifying the call as a public network call or a private network call. Block 402 classifies the call, depending on whether or not the formatted callee identifier has a DID bank table record, and this depends on how the call classification criteria are met.

Calls to Non-Subscribers

Not all calls will be to subscribers, and this will be detected by the processor 232 of FIG. 8 when it executes block 402 in FIG. 18B, and does not find a DID bank table record (370 illustrated in FIG. 11) that is associated with the callee, in the DID bank table. When this occurs, the call is classified as a public network call, by directing the processor (232) to point C in FIG. 18C.

Figure 18C:
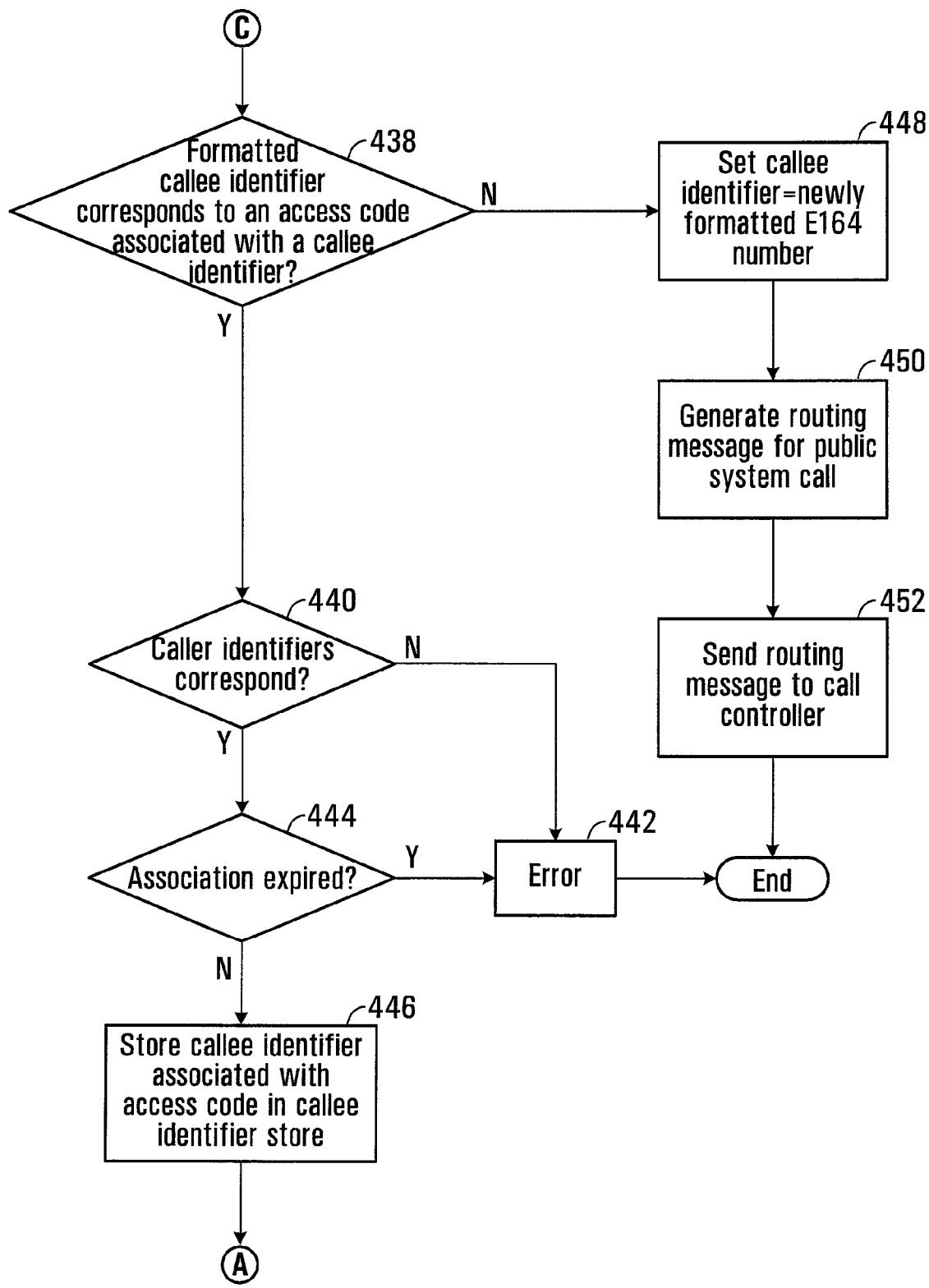

Referring to FIG. 18C, block 438 directs the processor (232) to determine whether the formatted callee identifier in the callee identifier store 246 in FIG. 8 corresponds to an access code in the access code field 173 of a record in the access code association table 170 illustrated in FIG. 10 that is associated with a callee identifier. Because the callee identifier in the callee identifier store 246 in FIG. 8 has been formatted as described above with reference to FIG. 18B, block 438 may involve determining whether an access code in the access code field 173 of a record of the access code association table 170 (illustrated in FIG. 10) matches the formatted callee identifier in the callee identifier store 246 in FIG. 8, and also whether a callee identifier (as opposed to the "null" value assigned on initialization) is stored in the callee identifier field 177 in association with the access code. As noted above, for simplicity, this description is directed to embodiments wherein an access code association table 170 associates access codes with respective callee identifiers, caller identifiers, timeout values, and timestamp values, although it will be appreciated that the processes described herein for records in the access code association table 170 may additionally or alternatively be applied to DID bank table records 370 in an analogous manner.

If at block 438 the formatted callee identifier in the callee identifier store 246 in FIG. 8 is the same as an access code in the access code field (173) of a record of the access code association table 170 illustrated in FIG. 10 that is associated with a callee identifier, then block 440 directs the processor (232) to determine whether the caller identifier in the caller identifier store 248 (illustrated in FIG. 8) is the same as the caller identifier in the caller identifier field (179) of the record of the access code association table (170), and thus whether the caller identifier in the caller identifier field (179) of the record of the access code association table (170) identifies the mobile telephone identified by the caller identifier in the caller identifier store 248. If not, then block 442 directs the processor (232) to send an error message to the call controller (13), and the process ends.

But if at block 440 the caller identifier in the caller identifier store 248 (illustrated in FIG. 8) corresponds to the caller identifier in the caller identifier field (179) of the record of the access code association table (170), then the routing controller (30) will produce a routing message that will cause the call controller to establish communication through the IP network (26) to the callee in response to a call received at a channel (20, 22, or 24). Preferably, block 444 includes codes that direct the processor (232) to determine whether the association of the access code with the callee identifier has expired, and thus whether the usability of the access code to initiate a call to the callee has expired, in the manner described above for block 278 in FIG. 12. If at block 444 the association of the access code with the callee identifier has expired, then block 442 directs the processor (232) to send an error message to the call controller (13), and the process ends. Thus the routing controller produces a routing message that causes the call controller to establish the call only when the association of the access code with the callee identifier has not expired.

It will be appreciated that in alternative embodiments, one or more of the caller identifier, timeout, and timestamp fields 179, 181, and 182 may be omitted from the access code association table 170 illustrated in FIG. 10, and in these embodiments, one or more of the blocks 440, 442, and 444 may also be omitted.

If at block 444 the association of the access code with the callee identifier has not expired, or if one or both of blocks 440 and 444 is omitted, then block 446 directs the processor (232) to store the callee identifier from the callee identifier field 177 of the record of the access code association table (170) in the callee identifier store 246 illustrated in FIG. 8. The processor (232) is then directed to point A in FIG. 18B to repeat the steps illustrated in FIG. 18B using the callee identifier retrieved from the callee identifier field (177) in the record of the access code association table (170).

However, if at block 438 the formatted callee identifier in the callee identifier store 246 in FIG. 8 does not correspond to an access code in a record of the access code association table 170 illustrated in FIG. 10 that is associated with a callee identifier, then block 448 of FIG. 18B causes the processor (232) to set the contents of the callee identifier store 246 of FIG. 8 to be the newly formatted callee identifier, i.e., a number compatible with the E.164 standard. Then, block 450 of FIG. 18B directs the processor (232) to generate a routing message identifying a gateway to the public network usable by the call controller (13) to establish a "public system" call. In one embodiment, block 450 includes codes that, for example, direct the processor (232) to search a database of route or master list records and to search a database of supplier records to identify at least one supplier operable to supply a communications link for the call, and to load a routing message buffer with supplier information, time to live values, and timeout values. An example of an implementation of these steps is described with reference to blocks 410, 412, 560, 562, 563, 564, 566, and 571 in FIGS. 8B and 8D in PCT Publication No. WO 2008/052340. Next, block 452 directs the processor 232 of FIG. 10 to send the routing message to the call controller 13 in FIG. 1, and the process ends.

Calls to Subscribers within the Same Node

Referring back to FIG. 18A, if at block 406, the prefix of the username of the callee matches the node identifier associated with the gateway (18), then the call is on one domain, and block 454 directs the processor (232) to use the callee identifier in the callee identifier store 246 illustrated in FIG. 8 (which, at block 404, was set to be a username of the callee) to locate and retrieve a dialing profile for the callee. The dialing profile may be of the type shown in FIG. 9, for example. Block 456 of FIG. 18A then directs the processor 232 of FIG. 8 to get call block, call forward, and voicemail records from the database 23 of FIG. 1, based on the username identified in the callee dialing profile retrieved by the processor at block 454. Exemplary call block, call forward, and voicemail records are described in PCT Publication No. WO 2008/052340.

Then block 458 directs the processor 232 of FIG. 8 to determine whether or not the caller identifier received in the RC request message matches a block pattern stored in the call block record associated with the callee and retrieved at block 454. If the caller identifier matches a block pattern, then block 460 directs the processor to send a drop call or non-completion message to the call controller (13) and the process is ended. If the caller identifier does not match a block pattern associated with the callee, then block 462 directs the processor (232) to determine whether or not call forwarding is required, as described in PCT Publication No. WO 2008/052340.

If at block 462, the call forwarding record for the callee indicates that no call forwarding is required, then the processor (232) is directed to block 464, which directs the processor (232) to generate a routing message identifying an address on the private network, associated with the callee for a "private system" call. In one embodiment, block 464 includes codes that, for example, direct the processor (232) to store, in a routing message buffer, a username and domain of the callee, time to live values, and an IP address of the current node, to determine whether or not the user identified by the callee identifier has paid for voicemail service and if so, to store voicemail information in the routing message buffer. An example of an implementation of these steps is described with reference to blocks 609, 620, 640, 642, and 644 in FIGS. 8A and 8C in PCT Publication No. WO 2008/052340, which is incorporated herein by reference. Next, block 466 directs the processor 232 of FIG. 8 to cause the routing message to be sent to the call controller 13 in FIG. 1, and the process ends.

But if at block 462, the call forwarding record for the callee indicates that call forwarding is required, then block 468 directs the processor (232) to search a dialing profile table to find a dialing profile record as shown in FIG. 9, for the user identified by the destination number field of the call forward record, as illustrated in PCT Publication No. WO 2008/052340. The processor (232) is further directed to store the username and domain for that user and a time to live value in a routing message buffer, an example of which is described in PCT Publication No. WO 2008/052340. This process is repeated for each call forwarding record associated with the callee identified by the callee identifier store 246 in FIG. 8 to add to the routing message buffer all call forwarding usernames and domains associated with the callee.

Referring to FIGS. 1, 18A, and 18C, the routing message sent at one of blocks 412, 452, and 466 is received at the call controller 13 and the call controller interprets the receipt of the routing message as a request to establish a call. Referring to FIG. 15, the program memory 324 of the call controller 13 includes a routing to gateway routine depicted generally at 346.

Where a routing message received at the call controller 13 is of the type produced at block 464 shown in FIG. 18A, indicating that the callee is a system subscriber on the same node as the gateway (18) (such as a user of the VoIP telephone 36 illustrated in FIG. 1), the routing to gateway routine 346 may direct the microprocessor 322 to cause a message to be sent back through the IP network 26 shown in FIG. 1 to the VoIP telephone (36), using the IP address of the VoIP telephone (36) that is available from the callee username.

Alternatively, if the routing message received at the call controller 13 is of the type produced at block 410 shown in FIG. 18A, identifying a domain associated with another node in the system, the call controller 13 may send a SIP invite message along the high speed/high data throughput link 17 in communication with the other node. The other node may function as explained above and in PCT Publication No. WO 2008/052340, in response to receipt of a SIP invite message.

If the routing message received at the call controller 13 is of the type produced at block 450 shown in FIG. 18C, indicating that the callee is not a subscriber to the system (such as a user of the PSTN telephone 32 that is in communication with the IP network 26 through the gateway 34 as illustrated in FIG. 1), the call controller sends one or more SIP invite messages to the suppliers identified in the routing message to identify the IP address of a supplier that is able to carry the call, such as the IP address of the gateway 34 illustrated in the example of FIG. 1. A process for identifying the IP address of a supplier that is able to carry the call is given in PCT Publication No. WO 2008/052340, which is incorporated herein by reference. In some cases, the gateway of the supplier that is able to carry the call will be the gateway 18 illustrated in FIG. 1, that is, the same gateway through which the caller telephone (12) initiated the call. For simplicity, the following description assumes that the gateways 18 and 34 are distinct gateways. It will be understood that in some cases, they may be the same gateway, but in these cases, the following steps may still be applied.

Referring to FIG. 1, the IP address of the gateway 34 is sent in a message from the call controller 13 to the media relay 28, which responds with a message indicating an IP address to which the gateway 18 should send its audio/video traffic, and an IP address to which the gateway 34 should send its audio/video for the call. The call controller conveys the IP address at which the media relay 28 expects to receive audio/video from the gateways 18 and 34, to the gateways 18 and 34 in one or more messages. The gateway 18 replies to the call controller 13 with an IP address at which it would like to receive audio/video, and the call controller conveys that IP address to the media relay 28. The call may then be conducted between the caller and callee through the media relay 28 and the gateways 18 and 34.

If the call controller 13 receives a routing message of the type produced at block 464 shown in FIG. 18A, indicating that the callee is a system subscriber on the same node as the gateway (18) (such as a user of the VoIP telephone 36 illustrated in FIG. 1), and which has at least one call forwarding number and/or a voicemail number, the call controller attempts to establish a call to the callee VoIP telephone 36 by seeking from the callee telephone a message indicating an IP address to which the media relay 28 should send audio/video. If no such message is received from the callee telephone, no call is established. If no call is established within a pre-determined time, the call controller 13 attempts to establish a call with the next user identified in the call routing message in the same manner. This process is repeated until all call forwarding possibilities have been exhausted, in which case the call controller communicates with the voicemail server 19 identified in the routing message to obtain an IP address to which the media relay 28 should send audio/video and the remainder of the process mentioned above for establishing IP addresses at the media relay and the caller telephone is carried out to establish audio/video paths to allowing the caller to leave a voicemail message with the voicemail server.

When an audio/video path through the media relay 28 is established, a call timer maintained by the call controller 13 preferably logs the start date and time of the call and logs the call ID and an identification of the route (i.e., audio/video path IP address) for later use in billing.

Terminating the Call

Referring back to FIG. 1, in the event that the caller terminates a call, the gateway 18 sends a SIP bye message to the call controller 13. Similarly, in the event that the callee terminates the call, the gateway 34 or the VoIP telephone 36 of the callee sends a SIP bye message to the call controller 13. Exemplary SIP bye messages are described in PCT Publication No. WO 2008/052340. The SIP bye message is received at the call controller 13, and the call controller executes a process that involves decrementing the contents of the current number of concurrent calls field 222 dialing profile 200 of the caller as illustrated in FIG. 9, generating an RC call stop message (not shown), sending the RC call stop message to the routing controller 30, and sending a "bye" message to the party that did not terminate the call. An exemplary RC call stop message, and an example of how these steps may be implemented, are described in PCT Publication No. WO 2008/052340, which is incorporated herein by reference.

When the routing controller 30 receives the RC call stop message from the call controller 13, the routing controller executes an RC call stop message process that involves making various updates to subscriber, reseller, and supplier account records (not shown) following the call. Examples of subscriber, reseller, and supplier account records, and of updates to subscriber, reseller, and supplier account records, are described in PCT Publication No. WO 2008/052340, which is incorporated herein by reference.

While specific embodiments of the invention have been described and illustrated, such embodiments should be considered illustrative of the invention only and not as limiting the invention.

What is claimed is:

1. A method of establishing communications between a wireless device and a destination node of a communications network, the method comprising:
   receiving from a user of the wireless device a destination node identifier associated with the destination node;
   transmitting an access code request message to an access server, the access code request message including the destination node identifier and a location identifier identifying a geographical location of the wireless device;
   receiving an access code reply message from the access server in response to the access code request message, the access code reply message including an access code based on the location identifier in the access code request message, the access code identifying a communications channel on a gateway through which communications between the wireless device and the destination node can be conducted, the access code being distinct from the destination node identifier; and
   in response to receiving the access code reply message, causing the wireless device to use the access code received in the access code reply message to initiate communications from the wireless device to the destination node through the channel identified by the access code, wherein the access code is based on the location identifier transmitted in the access code request message and enables the communications to be established from the wireless device to the destination node through the channel on the gateway identified by the access code.

2. The method of claim 1, wherein transmitting comprises transmitting the access code request message to the access server on a non-voice network.

3. The method of claim 1, wherein transmitting comprises transmitting the access code request message as a Short Messaging Service (SMS) message.

4. The method of claim 1, wherein transmitting comprises transmitting the access code request message on a voice network.

5. The method of claim 4, wherein transmitting the access code request message on a voice network comprises transmitting the access code request message as a Short Messaging Service (SMS) message.

6. The method of claim 1, wherein the location identifier comprises an Internet Protocol (IP) address of the wireless device in a wireless Internet Protocol (IP) network.

7. The method of claim 1, wherein the location identifier comprises an identifier of a wireless voice signal station in wireless communication with the wireless device.

8. The method of claim 1, wherein the location identifier comprises a user-configured identifier of a location associated with the wireless device.

9. The method of claim 1, wherein receiving the access code reply message comprises receiving the access code reply message from the access server on a non-voice network.

10. The method of claim 1, wherein receiving the access code reply message comprises receiving the access code reply message as a Short Messaging Service (SMS) message.

11. The method of claim 1, wherein receiving comprises receiving the access code reply message on a voice network.

12. The method of claim 11, wherein receiving the access code reply message on a voice network comprises receiving the access code reply message as a Short Messaging Service (SMS) message.

13. The method of claim 1, wherein receiving the access code reply message comprises receiving, in the access code reply message, an access code temporarily associated with the destination node identifier.

14. The method of claim 1, wherein receiving the access code reply message comprises receiving, in the access code reply message, a telephone number or an Internet Protocol (IP) address.

15. The method of claim 14, wherein establishing communications between the wireless device and the destination node comprises engaging a routing controller to route the call on a public switched telephone network (PSTN) or an IP network to the destination node.

16. The method of claim 1 further comprising:
   receiving at the access server, the access code request message from the wireless device;
   causing the access server to communicate with a routing controller to obtain from the routing controller the access code, wherein the access code identifies a communications channel associated with the location identifier and wherein the access code is useable by the wireless device in a subsequent communication to cause the routing controller to establish a call to the destination node using the communications channel; and
   causing the access server to transmit the access code reply message to the wireless device.

17. The method of claim 16, wherein transmitting the access code reply message comprises transmitting the access code reply message as a Short Messaging Service (SMS) message.

18. The method of claim 16, wherein transmitting the access code reply message comprises transmitting the access code reply message on a voice network.

19. The method of claim 18, wherein transmitting the access code reply message on a voice network comprises transmitting the access code request message as a Short Messaging Service (SMS) message.

20. A wireless apparatus comprising:
   means for receiving from a user of the wireless apparatus a destination node identifier associated with a destination node with which the user wishes to communicate;
   means for transmitting an access code request message to an access server, the access code request message including the destination node identifier and a location identifier identifying a geographical location of the wireless apparatus;
   means for receiving an access code reply message from the access server in response to the access code request message, the access code reply message including an access code based on the location identifier in the access code request message, the access code identifying a communications channel on a gateway through which communications between the wireless apparatus and the destination node can be conducted, the access code being distinct from the destination node identifier; and
   means for causing the wireless apparatus to establish communications with the destination node through the communications channel identified by the access code in the access code reply message, the access code being based on the location identifier transmitted in the access code request message.

21. The apparatus of claim 20, wherein the means for transmitting comprises a non-voice network interface for transmitting the access code request message to the access server on a non-voice network.

22. The apparatus of claim 20, wherein the means for transmitting includes means for transmitting the access code request message as a Short Messaging Service (SMS) message.

23. The apparatus of claim 20, wherein the means for transmitting comprises means for transmitting the access code request message on a voice network.

24. The apparatus of claim 23, wherein the means for transmitting the access code request message on a voice network comprises means for transmitting the access code request message as a Short Messaging Service (SMS) message.

25. The apparatus of claim 20, wherein the location identifier comprises an Internet Protocol (IP) address of the wireless apparatus in a wireless IP network.

26. The apparatus of claim 20, wherein the location identifier comprises an identifier of a wireless voice signal station in wireless communication with the wireless apparatus.

27. The apparatus of claim 20, wherein the location identifier comprises a user-configured identifier of a location associated with the wireless apparatus.

28. The apparatus of claim 20, wherein the means for receiving an access code reply message comprises a non-voice network interface for receiving the access code reply message on a non-voice network.

29. The apparatus of claim 20, wherein the means for receiving the access code request message comprises means for receiving the access code request message as a Short Messaging Service (SMS) message.

30. The apparatus of claim 20, wherein the means for receiving the access code request message comprises means for receiving the access code request message on a voice network.

31. The apparatus of claim 30, wherein the means for receiving the access code request message on a voice network comprises means for receiving the access code request message as a Short Messaging Service (SMS) message.

32. The apparatus of claim 20, wherein the access code includes a telephone number or an IP address.

33. The wireless apparatus of claim 20, wherein the means for causing the wireless apparatus to establish communications comprises a mobile telephone network interface.

34. A system for enabling roaming by a wireless apparatus, the system comprising the wireless apparatus of claim 20 and further comprising:
a routing controller;
the access server, wherein the access server comprises:
means for receiving from the wireless apparatus the access code request message;
means for communicating with the routing controller to obtain from the routing controller the access code wherein the access code identifies a communications channel associated with the location identifier and wherein the access code is useable by the wireless apparatus to cause the routing controller to establish a call to the destination node using the communications channel; and
means for transmitting the access code reply message including the access code to the wireless apparatus.

35. The system of claim 34, wherein the means for transmitting the access code reply message comprises means for transmitting the access code reply message as a Short Messaging Service (SMS) message.

36. The system of claim 34, wherein the means for transmitting the access code reply message comprises means for transmitting the access code reply message on a voice network.

37. The system of claim 36, wherein the means for transmitting the access code reply message on a voice network comprises means for transmitting the access code request message as a Short Messaging Service (SMS) message.

38. A wireless apparatus comprising:
a processor circuit comprising at least one processor;
a network interface in communication with the processor circuit; and
a non-transitory computer readable medium having computer executable codes stored thereon for directing the processor circuit to:
receive from a user of the wireless apparatus a destination node identifier associated with a destination node with which the user wishes to communicate;
transmit an access code request message to an access server, the access code request message including the destination node identifier and a location identifier identifying a geographical location of the wireless apparatus;
receive an access code reply message from the access server in response to the access code request message, the access code reply message including an access code based on the location identifier in the access code request message, the access code identifying a communications channel on a gateway through which communications between the wireless apparatus and the destination node can be conducted, the access code being distinct from the destination node identifier; and
initiate communications from the wireless apparatus, via the network interface, using the access code based on the location identifier, to establish communications between the wireless apparatus and the destination node through the communications channel identified by the access code.

39. The apparatus of claim 38, wherein the network interface comprises a non-voice network interface, and wherein the codes for directing the processor circuit to cause the access code request message to be transmitted include codes for directing the processor circuit to cause the access code request message to be transmitted to the access server using the non-voice network interface on a non-voice network.

40. The apparatus of claim 38, wherein the codes for directing the processor circuit to cause an access code to be transmitted to the access code server include codes for directing the processor circuit to cause the access code request message to be transmitted as a Short Messaging Service (SMS) message.

41. The apparatus of claim 38, wherein the network interface comprises a voice network interface and wherein the codes for directing the processor circuit to cause an access code to be transmitted to the access code server include codes for directing the processor circuit to cause the access code request message to be transmitted on a voice network.

42. The apparatus of claim 41, wherein the codes for directing the processor circuit to cause an access code to be transmitted to the access code server include codes for directing the processor circuit to cause the access code request message to be transmitted as a Short Messaging Service (SMS) message on the voice network.

43. The wireless apparatus of claim 38, wherein the location identifier comprises an Internet Protocol (IP) address of the wireless apparatus in a wireless IP network.

44. The wireless apparatus of claim 38, wherein the location identifier comprises an identifier of a wireless voice signal station in wireless communication with the wireless apparatus.

45. The wireless apparatus of claim 38, wherein the location identifier comprises a user-configured identifier of a location associated with the wireless apparatus.

46. The wireless apparatus of claim 38, wherein the network interface comprises a non-voice network interface, and wherein the codes for directing the processor circuit to receive an access code reply message include codes for directing the processor circuit to cause the access code reply message to be received from the access server using the non-voice network interface on a non-voice network.

47. The wireless apparatus of claim 38, wherein the access code includes a telephone number or an IP address.

48. The wireless apparatus of claim 38, wherein the network interface comprises a mobile telephone network interface, and wherein the codes for directing the processor circuit to establish communications between the wireless apparatus and the destination node include codes for directing the processor circuit to cause a call to be initiated using the mobile telephone network interface on a mobile telephone network.

49. A system for enabling roaming by a wireless apparatus, the system comprising the wireless apparatus of claim 38 and further comprising:
a routing controller; and
an access server comprising a processor circuit and a computer readable medium in communication with the processor circuit, the computer readable medium encoded with codes for directing the processor circuit of the access server to:
receive the access code request message from the wireless apparatus;
communicate with the routing controller to obtain from the routing controller the access code wherein the access code identifies a communications channel associated with the location identifier and wherein the access code is useable by the wireless apparatus to cause the routing controller to establish a call to the destination node using the communications channel; and
transmit the access code reply message to the wireless apparatus.

50. A non-transitory computer readable medium having stored thereon computer executable codes for directing a processor circuit of a wireless device to establish communications with a destination node on a network, the codes comprising codes for directing the processor circuit to:
cause the wireless device to receive from a user of the wireless device a destination node identifier associated with the destination node;
cause the wireless device to transmit an access code request message to an access server, the access code request message including the destination node identifier and a location identifier identifying a geographical location of the wireless device;
cause the wireless device to receive an access code reply message comprising an access code identifying an Internet Protocol (IP) address based on the location identifier in the access code request message, the access code representing a communications channel of a network element in the network through which communications between the wireless device and the destination node can be conducted, the communications channel being associated with the geographical location of the wireless device, the access code being distinct from the destination node identifier; and
cause the wireless device to use the access code comprising the Internet Protocol (IP) address based on the location identifier to establish communications between the wireless device and the destination node through the communications channel of the network element identified by the access code.

51. A method for enabling a wireless device to establish communications with a destination node, the method comprising:
receiving from the wireless device an access code request message including a destination node identifier associated with the destination node and a location identifier identifying a geographical location of the wireless device;
in response to receiving the access code request message, causing a routing controller to produce an access code identifying a communications channel on a gateway through which communications between the wireless device and the destination node can be conducted, the access code being based on the location identifier of the access code request message received from the wireless device, wherein the access code is useable by the wireless device to initiate communications with the destination node through the communications channel; and
transmitting, to the wireless device, an access code reply message including the access code based on the location identifier, to cause the wireless device to use the access code to initiate communications with the destination node through the communications channel.

52. The method of claim 51, wherein receiving comprises receiving the access code request message on a non-voice network.

53. The method of claim 51, wherein receiving the access code request message comprises receiving the access code request message as a Short Messaging Service (SMS) message.

54. The method of claim 51, wherein receiving comprises receiving the access code request message on a voice network.

55. The method of claim 54, wherein receiving the access code request message on a voice network comprises receiving the access code request message as a Short Messaging Service (SMS) message.

56. The method of claim 51, wherein the routing controller is operably configured to route a call between the wireless device and the destination node when the wireless device uses the access code to establish communications between the wireless device and the destination node.

57. The method of claim 51, wherein causing the routing controller to produce the access code comprises causing the access code to be selected from a pool of access codes.

58. The method of claim 57 further comprising determining from the location identifier a local calling area associated with the wireless device and causing the access server to select an access code associated with a calling area matching the local calling area associated with the wireless device.

59. The method of claim 57, further comprising accessing a location field of a dialing profile associated with the wireless device when a local calling area cannot be determined from the location identifier and determining a local calling area associated with the wireless device from the contents of the location field and selecting an access code associated with a calling area matching the local calling area associated with the wireless device.

60. The method of claim 51, wherein the location identifier comprises an Internet Protocol (IP) address of the wireless device in a wireless IP network.

61. The method of claim 51, wherein the location identifier comprises an identifier of a wireless voice signal station in wireless communication with the wireless device.

62. The method of claim 51, wherein the location identifier comprises a user-configured identifier of a location associated with the wireless device.

63. The method of claim 57, wherein at least one of the access codes in the pool of access codes identifies an IP network address as a possible communications channel through which the communications can be conducted.

64. The method of claim 51, wherein the access code identifies an IP network address as a possible communications channel through which the communications can be conducted, the method further comprising enabling communications between the wireless device and the destination node to be established through an IP network in response to a call received at the IP network address from the wireless device using the access code identifying the IP network address.

65. The method of claim 57, wherein at least one of the access codes identifies a telephone number as a possible communications channel through which the communications can be conducted.

66. The method of claim 65, further comprising enabling communications between the wireless device and the destination node to be established through a public switched telephone network (PSTN) in response to a call received at the telephone number from the wireless device using the access code identifying the telephone number.

67. The method of claim 51, wherein the access code request message includes a caller identifier and wherein the method further comprises associating the caller identifier included in the access code request message with the access code produced by the routing controller.

68. The method of claim 64, further comprising enabling the routing controller to facilitate communications in response to use of the access code by the wireless device only if the caller identifier associated with the access code used by the wireless device to establish communications with the destination node identifies the wireless device.

69. The method of claim 67, further comprising associating the destination node identifier included in the access code request message with the access code produced by the routing controller.

70. The method of claim 69, wherein the associating the caller identifier and the destination node identifier with the selected access code occurs only when:
   a) the access code is not already associated with a destination node identifier; or
   b) the access code is already associated with another destination node identifier, and a timeout value associated with the another destination node identifier has expired.

71. The method of claim 51, further comprising causing a timestamp to be associated with the access code, for use in determining when the usability of the access code to initiate a call to the destination node will expire, and causing the timestamp to be included in the access code reply message transmitted to the wireless device.

72. The method of claim 71, further comprising causing communications to be permitted between the wireless device and the destination node when the wireless device seeks to establish a call to the destination node using the access code transmitted in the access code reply message when the timestamp associated with the access code indicates the usability of the access code has not expired, and causing the communications to be prevented when the timestamp indicates the usability of the access code has expired.

73. The method of claim 51, wherein transmitting comprises transmitting the access code reply message on a non-voice network.

74. The method of claim 51, wherein transmitting the access code reply message comprises transmitting the access code reply message as a Short Messaging Service (SMS) message.

75. The method of claim 51, wherein transmitting comprises transmitting the access code reply message on a voice network.

76. The method of claim 75, wherein transmitting the access code reply message on a voice network comprises transmitting the access code reply message as a Short Messaging Service (SMS) message.

77. An apparatus for enabling a wireless device to establish communications with a destination node, the apparatus comprising:
   means for receiving from the wireless device an access code request message including a destination node identifier associated with the destination node and a location identifier identifying a geographical location of the wireless device;
   means for causing a routing controller to produce an access code identifying a communications channel on a gateway through which communications between the wireless device and the destination node can be conducted, in response to receiving the access code request message, such that the access code is produced based on the location identifier of the access code request message received from the wireless device and such that the access code is useable by the wireless device to initiate communications with the destination node through the communications channel; and
   means for transmitting an access code reply message including the access code to the wireless device, wherein the access code in the access code reply message is based on the location identifier and is used by the wireless device to initiate communications with the destination node through the communications channel on the gateway.

78. The apparatus of claim 77, wherein the means for receiving comprises a non-voice network interface for receiving the access code request message on a non-voice network.

79. The apparatus of claim 77, wherein the means for receiving the access code request message comprises means for receiving the access code request message as a Short Messaging Service (SMS) message.

80. The apparatus of claim 77, wherein the means for receiving comprises means for receiving the access code request message on a voice network.

81. The apparatus of claim 80, wherein the means for receiving the access code request message on a voice network comprises means for receiving the access code request message as a Short Messaging Service (SMS) message.

82. The apparatus of claim 77, further comprising the routing controller and wherein routing controller is operably configured to route a call between the wireless device and the destination node.

83. The apparatus of claim 82, wherein the routing controller is operably configured to select the access code from a pool of access codes.

84. The apparatus of claim 83, wherein the routing controller is operably configured to determine a local calling area associated with the wireless device from the location identifier and to select an access code associated with a calling area matching the local calling area associated with the wireless device.

85. The apparatus of claim 83, further comprising:
a dialing profile associated with the wireless device, the dialing profile including a location field; and
wherein the routing controller is operably configured to determine a local calling area associated with the wireless device from the contents of the location field and to select an access code associated with a calling area matching the local calling area associated with the wireless device, when a local calling area associated with the wireless device cannot be determined from the location identifier.

86. The apparatus of claim 77, wherein the location identifier includes an Internet Protocol (IP) address of the wireless device in a wireless IP network.

87. The apparatus of claim 77, wherein the location identifier includes an identifier of a wireless voice signal station in wireless communication with the wireless device.

88. The apparatus of claim 77, wherein the location identifier includes a user-configured identifier of a location associated with the wireless device.

89. The apparatus of claim 83, wherein at least one of the access codes in the pool of access codes identifies an IP network address as a possible communications channel through which the communications can be conducted.

90. The apparatus of claim 77, wherein the access code identifies an IP network address as a possible communications channel through which the communications can be conducted, and wherein the routing controller is operably configured to enable communications between the wireless device and the destination node to be established through an IP network in response to a call received at the IP network address from the wireless device using the access code identifying the IP network address.

91. The apparatus of claim 83, wherein at least one of the access codes in the pool of access codes identifies a telephone number as a possible communications channel through which the communications can be conducted.

92. The apparatus of claim 91, wherein the routing controller is operably configured to enable communications between the wireless device and the destination node to be established through a public switched telephone network (PSTN) in response to a call received at the telephone number from the wireless device using the access code identifying the telephone number.

93. The apparatus of claim 83, wherein the access code request message includes a caller identifier and wherein the routing controller is operably configured to associate the caller identifier with the selected access code.

94. The apparatus of claim 93, wherein the routing controller is operably configured to facilitate communications between the wireless device and the destination node in response to use of the access code by the wireless device only if the caller identifier associated with the access code used by the wireless device to establish communications with the destination node identifies the wireless device.

95. The apparatus of claim 93, wherein the routing controller is operably configured to associate the destination node identifier included in the access code request message with the selected access code.

96. The apparatus of claim 95, wherein the routing controller is operably configured to associate the caller identifier and the destination node identifier with the selected access code only when:
a) the access code is not already associated with a destination node identifier; or
b) the access code is already associated with another destination node identifier, and a timeout value associated with the another destination node identifier has expired.

97. The apparatus of claim 82, wherein the routing controller is operably configured to associate a timestamp with the access code, for use in determining when the usability of the access code to initiate a call to the destination node will expire, and to cause the timestamp to be included in the access code reply message transmitted to the wireless device.

98. The apparatus of claim 97, wherein the routing controller is operably configured to enable communications to be established between the wireless device and the destination node when the wireless device seeks to establish a call to the destination node using the access code transmitted in the access code reply message when the timestamp associated with the access code indicates the usability of the access code has not expired and to prevent the communications from being established when the timestamp indicates the usability of the access code has expired.

99. The apparatus of claim 77, wherein the means for transmitting comprises a non-voice network interface for transmitting the access code reply message on a non-voice network.

100. The apparatus of claim 77, wherein the means for transmitting the access code reply message comprises means for transmitting the access code reply message as a Short Messaging Service (SMS) message.

101. The apparatus of claim 77, wherein the means for transmitting comprises means for transmitting the access code reply message on a voice network.

102. The apparatus of claim 101, wherein the means for transmitting the access code reply message on a voice network comprises means for transmitting the access code reply message as a Short Messaging Service (SMS) message.

103. An apparatus for enabling a wireless device to establish communications with a destination node, the apparatus comprising:
a processor circuit including at least one processor;
a network interface in communication with the processor circuit; and
a non-transitory computer readable medium having stored thereon computer executable codes for directing the at least one processor to:
receive from the wireless device an access code request message including a destination node identifier associated with the destination node and a location identifier identifying a geographical location of the wireless device;
cause a routing controller to produce an access code identifying a communications channel on a gateway through which communications between the wireless device and the destination node can be conducted, in response to receiving the access code request message, such that the access code is produced based on the location identifier of the access code request message received from the wireless device and such that the access code is useable by the wireless device to initiate communications with the destination node through the communications channel; and transmit an access code reply message including the access code to the wireless device, wherein the access code in the access code reply message is based on the location identifier and is used by the wireless device to initiate communications with the destination node through the communication channel.

104. The apparatus of claim 103, wherein the network interface comprises a non-voice network interface, and wherein the codes for directing the processor circuit to receive include codes for directing the processor circuit to cause the access code request message to be received using the non-voice network interface on a non-voice network.

105. The apparatus of claim 103, wherein the codes includes codes for directing the processor circuit to receive the access code request message as a Short Messaging Service (SMS) message.

106. The apparatus of claim 103, wherein the codes include codes for directing the processor circuit to receive the access code request message on a voice network.

107. The apparatus of claim 106, wherein the codes include codes for directing the processor circuit to receive the access code request message as a Short Messaging Service (SMS) message.

108. The apparatus of claim 103 further comprising the routing controller.

109. The apparatus of claim 108, wherein the routing controller is operably configured to cause the access code to be selected from a pool of access codes, wherein none of the access codes in the pool of access codes identifies a respective telephone number.

110. The apparatus of claim 109, wherein the routing controller is operably configured to determine from the location identifier a local calling area associated with the wireless device and to select an access code associated with a calling area matching the local calling area associated with the wireless device.

111. The apparatus of claim 109, wherein the routing controller is operably configured to access a location field of a dialing profile associated with the wireless device when a local calling area cannot be determined from the contents of the location identifier and to determine a local calling area associated with the wireless device from the contents of the location field and to select an access code associated with a calling area matching the local calling area associated with the wireless device.

112. The apparatus of claim 103, wherein the location identifier comprises an Internet Protocol (IP) address of the wireless device in a wireless IP network.

113. The apparatus of claim 103, wherein the location identifier comprises an identifier of a wireless voice signal station in wireless communication with the wireless device.

114. The apparatus of claim 103, wherein the location identifier comprises a user-configured identifier of a location associated with the wireless device.

115. The apparatus of claim 109, wherein at least one of the access codes in the pool of access codes identifies an IP network address as a possible communications channel through which the communications can be conducted.

116. The apparatus of claim 103, wherein the access code identifies an IP network address as a possible communications channel through which the communications can be conducted, and wherein the routing controller is operably configured to enable communications between the wireless device and the destination node to be established through an IP network in response to a call received at the IP network address from the wireless device using the access code identifying the IP network address.

117. The apparatus of claim 108, wherein the routing controller is operably configured to cause the access code to be selected from a pool of access codes, and wherein at least one of the access codes in the pool of access codes identifies a telephone number as a possible communications channel through which the communications can be conducted.

118. The apparatus of claim 117, wherein the routing controller is operably configured to enable communications between the wireless device and the destination node to be established through a public switched telephone network (PSTN) in response to a call received at the telephone number from the wireless device using the access code identifying the telephone number.

119. The apparatus of claim 108, wherein the access code request message includes a caller identifier and wherein the routing controller is operably configured to associate the caller identifier included in the access code request message with an access code selected by the routing controller.

120. The apparatus of claim 119, wherein the routing controller is operably configured to facilitate communications between the wireless device and the destination node in response to the access code used by the wireless device only if the caller identifier associated with the access code used by the wireless device to establish communications with the destination node identifies the wireless device.

121. The apparatus of claim 119, wherein the routing controller is operably configured to associate the destination node identifier included in the access code request message with the selected access code.

122. The apparatus of claim 121, wherein the routing controller is operably configured to associate the caller identifier and the destination node identifier with the selected access code only when:
 a) the access code is not already associated with another destination node identifier; or
 b) the access code is already associated with a destination node identifier, and a timeout value associated with the another destination node identifier has expired.

123. The apparatus of claim 122, wherein the routing controller is operably configured to associate a timestamp with the access code, for use in determining when the usability of the access code to initiate a call to the destination node will expire, and to cause the timestamp to be included in the access code reply message.

124. The apparatus of claim 103, wherein the routing controller is operably configured to enable communications to be established between the wireless device and the destination node when the wireless device seeks to establish a call to the destination node using the access code transmitted in the access code reply message when a timestamp associated with the access code indicates that usability of the access code has not expired and to prevent the communications from being established when the timestamp indicates that the usability of the access code has expired.

125. The apparatus of claim 103, wherein the network interface comprises a non-voice network interface, and wherein codes for directing the processor circuit to transmit include codes for directing the processor circuit to cause the access code reply message to be transmitted using the non-voice network interface on a non-voice network.

126. The apparatus of claim 103, wherein the codes include codes for directing the processor circuit to cause the access code reply message to be transmitted as a Short Messaging Service (SMS) message.

127. The apparatus of claim 103, wherein the codes include codes for directing the processor circuit to cause the access code reply message to be transmitted on a voice network.

128. The apparatus of claim 127, wherein the codes include codes for directing the processor circuit to cause the access code reply message to be transmitted as a Short Messaging Service (SMS) message.

129. A non-transitory computer readable medium encoded with computer executable codes for directing a processor circuit of a wireless device to establish communications with a destination node, the codes comprising codes for directing the processor circuit to:
  receive from the wireless device an access code request message including a destination node identifier associated with the destination node and a location identifier identifying a geographical location of the wireless device;
  cause a routing controller to produce an access code comprising an Internet Protocol (IP) network address identifying a communications channel on a gateway through which communications between the wireless device and the destination node can be conducted, in response to receiving the access code request message, such that the access code is produced based on the location identifier of the access code request message received from the wireless device and such that the access code is useable by the wireless device to initiate communications with the destination node through the communications channel; and
  transmit an access code reply message including the access code to the wireless device, wherein the Internet Protocol (IP) address of the access code is based on the location identifier and is used by the wireless device to initiate communications with the destination node through the communication channel on the gateway.

130. A method of operating an apparatus for enabling a wireless device to establish communications with a destination node, the method comprising:
  receiving from the wireless device a request message including a destination node identifier associated with the destination node and a location identifier associated with a geographical location of the wireless device, wherein the location identifier comprises a first Internet Protocol (IP) address associated with the wireless device;
  in response to receiving the request message, producing an access code identifying a second Internet Protocol (IP) address associated with an IP network communication device through which communications between the wireless device and the destination node can be conducted, wherein the access code is produced based on the location identifier received from the wireless device, wherein the access code is useable by the wireless device to initiate communications with the destination node through the IP network communication device; and
  transmitting a reply message including the access code to the wireless device, wherein the second Internet Protocol (IP) address is based on the location identifier and is used by the wireless device to initiate communications with the destination node through a communication channel on the IP network communication device.

131. The method of claim 130 wherein the access code is produced based on the destination node identifier.

132. The method of claim 131 wherein the destination node identifier comprises a phone number associated with the destination node.

133. The method of claim 130 further comprising, if the destination node is a PSTN telephone on the public switched telephone network (PSTN), establishing communications from the wireless device to a communications supplier gateway operable to connect to the PSTN telephone via the public switched telephone network (PSTN).

134. The method of claim 51, wherein causing the routing controller to produce the access code further comprises:
  determining, from the location identifier, a current location of the wireless device; and
  searching an access code association database table to identify an access code associated with the current location of the wireless device but not presently associated with communications to any destination node, to produce the access code transmitted in the access code reply message.

135. The method of claim 1 wherein the access code request message is transmitted from the wireless device via a WiFi network and the access code reply message is received by the wireless device via the WiFi network.

136. The method of claim 1, wherein the destination node identifier and the location identifier are transmitted at the same time.

137. The method of claim 51, wherein the access code is based on an area code corresponding to a location identified by the location identifier.

138. The method of claim 51, wherein the access code reply message identifies an Internet Protocol (IP) network address of the communications channel through which the communications can be conducted, wherein the access code is useable by the wireless device to initiate the communications with the destination node through the communications channel.

139. The apparatus of claim 103, wherein the access code reply message identifies an Internet Protocol (IP) network address associated with the communications channel through which the communications can be conducted, wherein the Internet Protocol (IP) network address is useable by the wireless device to initiate the communications with the destination node through the communications channel.

140. The method of claim 1, further comprising:
  (a) receiving, in the access code reply message, an Internet Protocol (IP) address; and
  (b) establishing the communications between the wireless device and the destination node based on the Internet Protocol (IP) address received in the access code reply message.

141. The method of claim 1, wherein the access code received in the access code reply message does not comprise a telephone number.

* * * * *